United States Patent [19]

Munro et al.

[11] Patent Number: 5,557,528
[45] Date of Patent: Sep. 17, 1996

[54] TASK PRIORITIZATION FOR A TAPE STORAGE SYSTEM

[75] Inventors: Frederick Munro, Broomfield; Aaron Dailey; Scott Allen, both of Boulder; David Trachy, Louisville, all of Colo.

[73] Assignee: Storage Technology Corporation, Louisville, Colo.

[21] Appl. No.: 156,598

[22] Filed: Nov. 23, 1993

[51] Int. Cl.⁶ .............................. G06F 17/00; B65G 1/00
[52] U.S. Cl. ..................................... 364/478.02; 414/273
[58] Field of Search .................................. 364/479, 478, 364/513; 414/266, 267, 268, 277, 279, 281, 331; 360/92, 98.5

[56] References Cited

U.S. PATENT DOCUMENTS

| | | | |
|---|---|---|---|
| 4,425,615 | 1/1984 | Swenson et al. | 395/425 |
| 4,864,511 | 9/1989 | Moy et al. | 364/513 |
| 4,928,245 | 5/1990 | Moy et al. | 364/513 |
| 4,932,826 | 6/1990 | Moy et al. | 414/277 |
| 4,945,429 | 7/1990 | Munro et al. | 360/92 |

*Primary Examiner*—Roy N. Envall, Jr.
*Assistant Examiner*—Chuong D. Ngo
*Attorney, Agent, or Firm*—Pennie & Edmonds

[57] ABSTRACT

An automated memory cartridge system prioritizes requests for tape retrieval. The requests to transfer cartridges may be assigned a priority relating to the importance of the request. The system will recognize these requests and organize them so that higher priority requests will be executed ahead of other lower priority requests. This prioritization will be accomplished in such a manner which allows even very low priority requests to eventually be carried out.

18 Claims, 18 Drawing Sheets

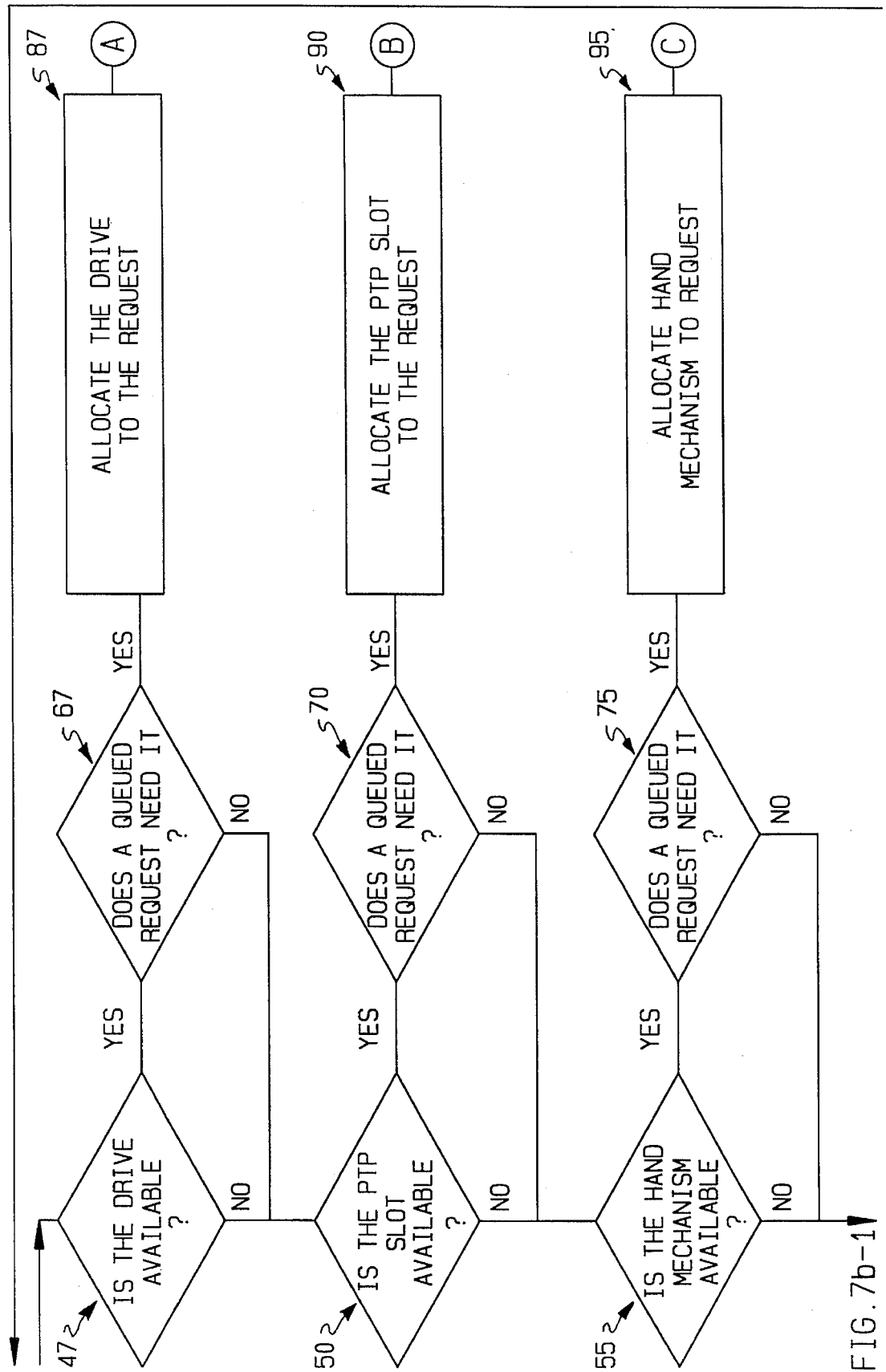

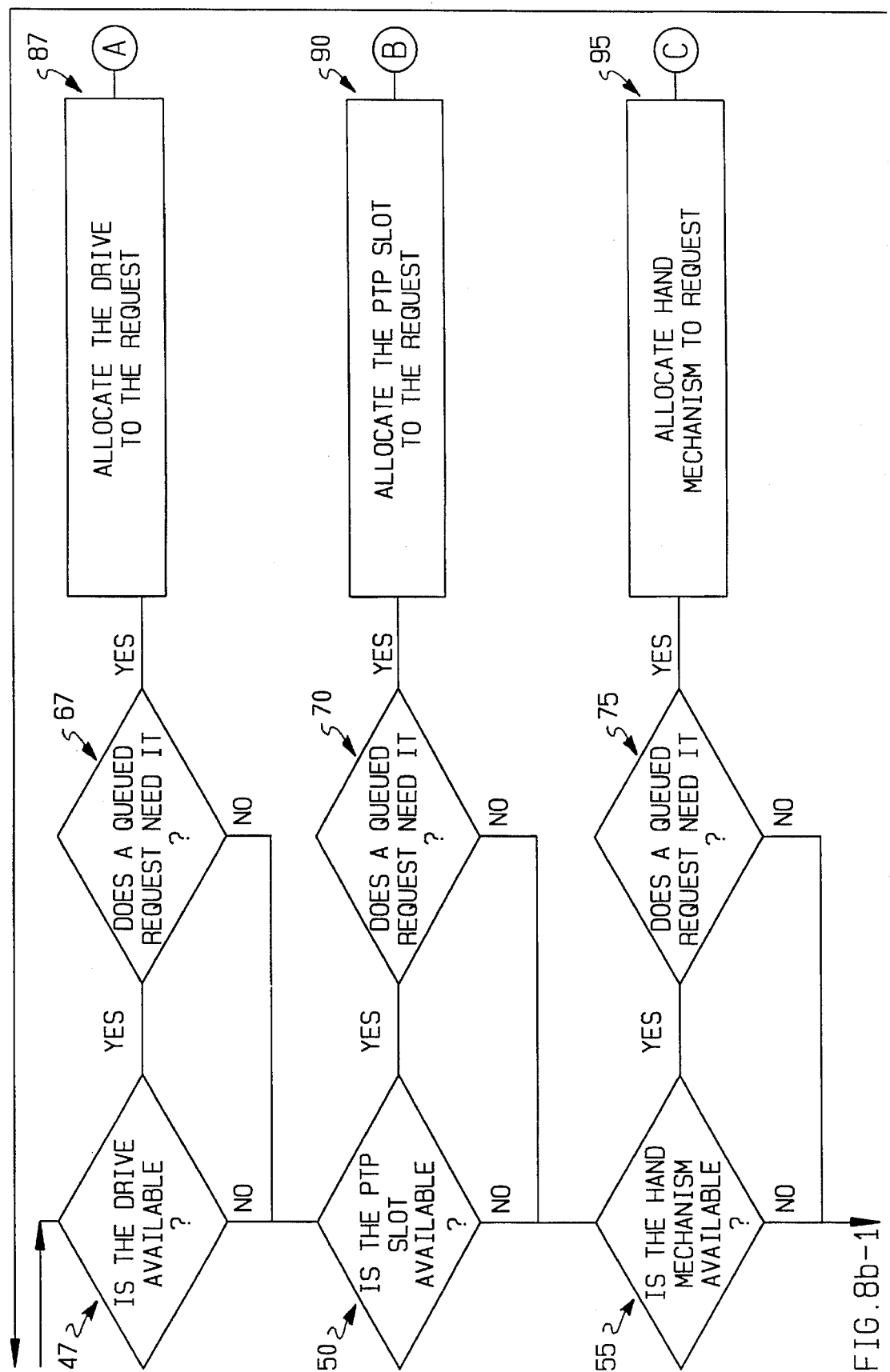

TASK PRIORITIZATION FOR A TAPE STORAGE SYSTEM

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to electronic media storage and retrieval, and in particular, to the storage and retrieval of large amounts of data contained within magnetic tape cartridges. More specifically, the invention relates to an improved method and apparatus for prioritizing requests for data storage and retrieval of magnetic tape cartridges.

2. Description of the Related Art

In recent years, one method of electronic data storage has been the use of four-by-five inch, 200 megabyte tape cartridges. In the past, the storage and retrieval of such cartridges was for the most part carried out by human operators. Such human intervention not only decreased the reliability of tape selection and replacement, but also prolonged the time between when a data request was made and when that data was retrieved by loading a specific cartridge into an available tape drive.

Recent improvements have resulted in systems utilizing tape cartridges that incorporate magazine type automatic loaders which reduce the time that jobs wait for cartridges to be mounted and subsequently read. An example of an automated cartridge system (ACS) is taught by U.S. Pat. Nos. 4,945,429, 4,928,245, 4,932,826 and 4,864,511, all assigned to the Storage Technology Corporation, which are incorporated by reference herein.

FIG. 1 illustrates one such automated cartridge system. The automated cartridge system is made up of at least one library controller 121 (sometimes referred to as a library management unit (LMU)) and a plurality of library storage modules (LSM) 111, 112.

Each library controller 121 provides the interface between a host computer 101, 102 and the LSMs 111, 112. The library controller 121 interprets cartridge motion requests from the host computer 101, 102, relaying instructions to the appropriate LSMs 111, 112.

FIGS. 2–4 illustrate the top view and side view of an LSM 111, 112. Each LSM 111, 112 contains a plurality of storage cells 202 to store magnetic tape cartridges and a robot arm assembly 230 for handling the magnetic tape cartridges. The robot arm assembly 230 comprises a plurality of mechanisms all operating in conjunction to provide a movable arm 321 for retrieving tape cartridges from and returning tape cartridges to their individual storage cells 202. The robot arm 321 includes one or more hand assemblies 240 which performs the actual tape retrieval from, or replacement to, the individual storage cells 202.

Tape cartridges retrieved from the individual storage cells 202 are typically loaded onto tape drives 141, 142, 143, 144 so that the data contained on the tape cartridge can be read by the host computer 101, 102. One or more tape drives 141, 142, 143, 144 are attached to each of the LSMs 111, 112. The robot arm 321 loads a tape cartridge into the tape drive 141, 142, 143, 144 with the same motion as the replacement of a tape cartridge into one of the individual storage cells 202.

As illustrated in FIG. 5, tape cartridges are entered into and ejected from LSMs 111, 112 through the use of cartridge access ports (CAP) 160.

Tape cartridges may be transferred under robotic control from one LSM 111 to another LSM 112 through devices called "pass-through-ports" (PTPs) 150. As illustrated in FIG. 6, a PTP 150 is comprised generally of a plurality of storage cells 151, 152, 153, 154, called "PTP slots" adapted for rotation by a mechanism 155, called a "PTP mechanism" for transference between LSMs 111, 112. Through use of these PTPs 150, load sharing is accomplished. Tapes may be transported through PTP slots 151, 152, 153, 154 from one LSM 111 where they might be stored to another LSM 112 where there might be unused tape drives 141, 142, 143, 144. Thus, PTPs 150 allow for a more efficient use of available tape drives 141, 142, 143, 144.

In these systems, the task of transferring a cartridge from one location to another is initiated by a cartridge motion request from the host computer 101, 102 to the library controller 121. When the library controller 121 receives the request, it determines the proper path from the cartridge source to the cartridge destination. This path possibly includes source and/or destination storage cells 202, source and/or destination tape drives 141, 142, 143, 144, source and/or destination CAPs 160, and PTP slots 151, 152, 153, 154 for inter-LSM moves. The library controller 121 "allocates" available resources to cartridge motion requests to accomplish cartridge transfers.

The task of actually transferring a cartridge from one location within an LSM 111, 112 to another consists of two operations, a get and a put. In the get operation, the robotic means 230 retrieves the cartridge from a receptacle at a first location. In the put operation, the robotic means 230 moves the cartridge to its destination and inserts it into a receptacle at a second location.

Tape cartridge transfers along a path consist of the following: (1) path allocation; (2) source get; (3) one or more intermediate puts; (4) one or more intermediate gets; (5) destination put; and (6) path deallocation.

Path allocation consists of allocating for the duration of a tape cartridge transfer all PTP slots 151, 152, 153, 154 necessary for inter-LSM moves through the path, the source and/or destination tape drive 141, 142, 143, 144 and the source and/or destination CAPs 160. If the source tape drive 141, 142, 143, 144 or the source and/or destination CAP 160 are unavailable, the cartridge motion request is rejected. If any of the necessary PTP slots 151, 152, 153, 154 or tape drives 141, 142, 143, 144 are unavailable, the cartridge motion request, as described later, waits on a queue until said slot 151, 152, 153, 154 becomes available.

A source get consists of allocating the arm 321 and hand 240 of the robot mechanism 230 within the source LSM 111, 112 to retrieve a tape cartridge from the source location, whether it be a storage cell 202, tape transport 141, 142, 143, 144 or CAP 160. After the tape cartridge has been retrieved, the arm 321 is deallocated and is free to service other requests. However, the hand 240 remains allocated to the present request.

Intermediate puts and gets are repeated for intermediate LSMs 111, 112 along the selected path. An intermediate put always follows either a source get or intermediate get operation and, therefore, will have a hand 240 already allocated to the request. The intermediate put delivers a cartridge to a PTP slot 151, 152, 153, 154 in an LSM 111, 112. The intermediate put consists of a two step process. First, the PTP mechanism 155 in the intermediate LSM 111, 112 is allocated to the request to receive a cartridge and, second, the arm mechanism 321 within the intermediate LSM 111, 112 is allocated to move the cartridge to and insert it into the PTP slot 151, 152, 153, 154 in that LSM 111, 112. The arm 321, hand 240 and PTP mechanism 155 are deallocated upon completion of the intermediate put.

The intermediate get retrieves a cartridge from a PTP slot 151, 152, 153, 154. The intermediate get consists of a three step process. First, a hand 240 in the intermediate LSM 111, 112 is allocated to the request to retrieve the cartridge from a PTP slot 151, 152, 153, 154. Second, the PTP mechanism 155 is allocated to position the PTP slot 151, 152, 153, 154 in the intermediate PTP 150 for transference of the cartridge. Finally, the arm mechanism 321 within the intermediate LSM 111, 112 is allocated to retrieve a cartridge from the PTP slot 151, 152, 153, 154. The arm 321 and PTP mechanism 155 are deallocated upon completion of the intermediate get. The hand 240 remains allocated to the request.

Destination puts are similar to intermediate puts in that they always follow either a source get or intermediate get operation and, therefore, will have a hand 240 already allocated to the request. The destination put consists of allocating an arm mechanism 321 within the destination LSM 111, 112 to move a cartridge to and insert it into the destination storage cell 202, tape drive 141, 142, 143, 144 or CAP 160. Upon completion of the destination put, the arm 321 and hand 240 allocated to the request are deallocated.

When the tape cartridge has reached its destination location, all PTP slots 151, 152, 153, 154 for inter-LSM moves through the path, the source and/or destination tape drives 141, 142, 143, 144 and the source and/or destination CAPs 160 are deallocated.

As described above, the library controller 121 allocates available resources to cartridge motion requests to accomplish cartridge transfers. However, because the library controller 121 may be asked to execute a plurality of cartridge motion requests at any one time, cartridge motion requests compete for available resources. The library controller 121 manages the competition for available resources by allocating the available resources to the cartridge motion requests on a first-come first-served basis. Cartridge motion requests that request resources first are granted them first. A plurality of queues are implemented to handle the allocation of available resources: a PTP slot queue, a PTP mechanism queue, a drive queue, a hand queue and an arm queue.

When a new cartridge request is received, it is examined to determine if its destination is a tape drive 141, 142, 143, 144 and, if so, if the destination tape drive 141, 142, 143, 144 is available. If the destination tape drive 141, 142, 143, 144 is available, the drive is allocated to the request and processing of the request continues. If the drive 141, 142, 143, 144 is not available, the request is placed in a drive queue. The library controller 121 determines if a tape drive 141, 142, 143, 144 has become available. If a drive 141, 142, 143, 144 becomes available, the library controller 121 scans the drive queue from the oldest entry to the newest entry to determine if any requests in the drive queue need the available tape drive 141, 142, 143, 144. The available tape drive 141, 142, 143, 144 is allocated to the first request in the queue waiting on that tape drive 141, 142, 143, 144.

If the source location and the destination location are in different LSMs 111, 112, the library controller 121 determines if the necessary PTP slots 151, 152, 153, 154 are available. If the necessary PTP slots 151, 152, 153, 154 are available, the PTP slots 151, 152, 153, 154 are allocated to the request and the path for that particular request is granted, i.e., path allocation. Otherwise, the cartridge motion request is queued on the end of the PTP slot queue, implemented in the library controller's 121 computer memory.

Each time a PTP slot 151, 152, 153, 154 becomes available, the PTP slot queue is scanned from the oldest entry to the newest entry to determine which cartridge motion requests in the queue are waiting on that PTP slot 151, 152, 153, 154. The first request found for which all necessary PTP slots 151, 152, 153, 154 are available is granted the path and the necessary PTP slots 151, 152, 153, 154 are allocated to it, i.e., path allocation.

Once a path has been allocated to the cartridge motion request, the tape cartridge is transferred along the granted path through a succession of gets (i.e., a source get and a series of intermediate gets) and puts (i.e., a series of intermediate puts and a destination put).

The allocation of available resources to complete a get is as follows. The cartridge motion request is entered into the hand queue, organized from the oldest entry to the newest, to wait until a hand 240 becomes available. When a hand 240 becomes available, the hand queue is scanned from the oldest entry to the newest entry to determine which request in the queue is waiting on the available hand 240. The available hand 240 is allocated to the first request in the hand queue needing that hand 240. If a transfer between LSMs 111, 112 is involved, the cartridge motion request is entered into the PTP mechanism queue, organized from the oldest entry to the newest, to wait until a PTP mechanism 155 becomes available. When a PTP mechanism 155 becomes available, the PTP mechanism queue is scanned from the oldest entry to the newest entry to determine which request in the queue is waiting on the available PTP mechanism 155. The available PTP mechanism 155 is allocated to the first request in the PTP mechanism queue needing that hand 240. The request is then entered into an arm queue to wait until an arm 321 becomes available. When an arm 321 becomes available the arm queue is scanned from the oldest entry to the newest entry to determine which request in the arm queue is waiting on the available arm 321. The available arm 321 is assigned to the first request in the arm queue needing that arm 321. The request is then satisfied by moving the robotic arm 321 so as to move the hand 240 to the location of the receptacle containing the cartridge that is sought and then using the hand 240 to remove the cartridge from that receptacle.

At this point the get is complete. The arm 321 and PTP mechanism 155 are released for reallocation to the next request in the arm queue needing that arm 321 and the next request in the PTP mechanism queue needing that PTP mechanism 155. The hand 240 retains the cartridge it has retrieved and accordingly cannot be released. The request is then returned to the back of the arm queue to wait for an available arm 321 so it that it can complete its transfer through a put operation.

The put operation is essentially the same as that described in the previous paragraph. Upon completion of the get, the request is returned to the arm queue and, if necessary, the PTP mechanism queue, each queue being organized from the oldest entry to the newest, to wait until an arm 321 and PTP mechanism 155 necessary for the put become available. When a PTP mechanism 155 becomes available, the PTP mechanism queue is scanned from the oldest entry to the newest entry to determine which request in the queue is waiting on the available PTP mechanism 155. The available PTP mechanism 155 is allocated to the first request in the PTP mechanism queue needing that hand 240. When an arm 321 becomes available, the arm queue is scanned from the oldest entry to the newest entry to determine which request in the queue is waiting on the available arm 321. The available arm 321 is allocated to the first request in the arm queue needing that arm 321. When an arm 321 is allocated to the request, the arm 321 is moved so as to move the hand 240 and the cartridge contained therein to the receptacle at the destination location. The hand 240 then inserts the cartridge into the receptacle whereupon the put is complete. The PTP mechanism 155, arm mechanism 321 and hand 240 are then released for reallocation to the next request in the PTP mechanism queue, arm queue and hand queue, respectively.

In the operations described above, there exists one resource queue for each resource, i.e., PTP mechanism 155, drive 141, 142, 143, 144, hand 240 and arm 321, for the entire automatic cartridge system. Each time a resource becomes available, the appropriate queue is scanned from the oldest entry to the newest entry to determine which request in the queue is waiting on the available resource.

In an alternative implementation, there exists one resource queue for each resource for each LSM 111, 112 in the automated cartridge system. Each time a resource become available in an LSM 111, 112, it is allocated to the first element on the queue (in a first-come, first serve implementation, the first entry on the queue will always be the oldest request). This implementation eliminates the need to scan the queue to determine which request in the queue is waiting on the available resource.

As mentioned above, in these automated cartridge systems, cartridge requests are performed only on a first-come first-served basis. That is, all cartridge requests are forced to compete for the available resources on an equal footing, and those that request the resources first are granted them first. While this method of performing transfers operates as described, experience has shown that its performance could be improved. The operators of these systems are unable to modify the order in which the library controller 121 performs these requests. This prevents operators from prioritizing the requests, that is, compelling the ACS to perform an important cartridge request first, although they may have been sent to the system subsequent to less important cartridge transfer requests.

Therefore, there is a need for a method and apparatus for prioritizing requests for tape retrieval within an automated cartridge system (ACS).

SUMMARY OF THE INVENTION

In accordance with the present invention, there is provided an ACS which prioritizes requests for tape retrieval. The cartridge requests may be assigned a priority relating to the urgency of the request. The ACS will recognize these requests and organize them so that higher priority requests will be executed ahead of other lower priority requests.

It is another object of the present invention to carry out the prioritization in such a manner that even low priority requests will eventually be executed. To avoid the problem of lower priority jobs being held off indefinitely by a stream of incoming jobs with higher priorities, each time a mechanism is granted to a request, all lower priority requests waiting for that mechanism have their priority incremented by a predetermined amount.

It is another object of the present invention to provide the capability to execute certain requests only when no other requests are pending in the system. In accordance with this object of the invention, a special priority is assigned to these requests that inhibit their execution until no other requests are pending in the system.

It is another object of the present invention to provide the capability to execute certain requests before all current requests pending in the system. In accordance with this object of the invention, a super priority is assigned to these requests that is greater than any priority that may be assigned by the system.

BRIEF DESCRIPTION OF THE DRAWINGS

These and other objects, features and advantages of the inventions will be more readily apparent from the following detailed description of the invention in which:

FIGS. 7*a*-1, 7*a*-2, 7*b*-1 and 7*b*-2 are flowcharts of an embodiment of the invention which provides for task optimization;

FIGS. 8*a*-1, 8*a*-2, 8*b*-1 and 8*b*-2 are flowcharts of an alternative embodiment of the invention illustrating incrementation of priorities of request in a queue; and FIGS. 9*a*-1, 9*a*-2, 9*b*-1 and 9*b*-2 are flowcharts of an alternative embodiment of the invention illustrating incrementation of priorities of requests not selected for execution.

DETAILED DESCRIPTION OF THE INVENTION

Figure 1:
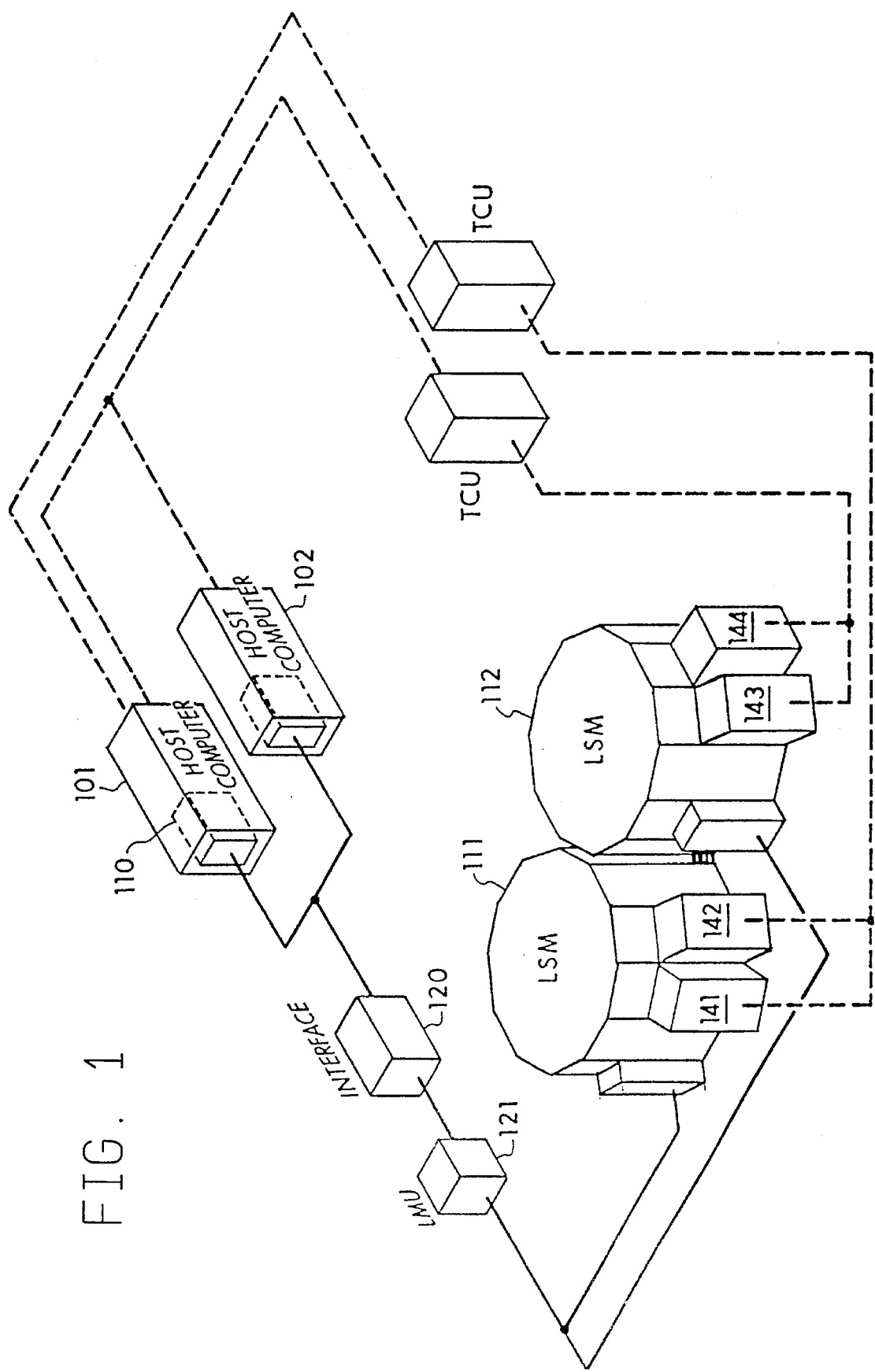
FIG. 1 illustrates the automated magnetic tape cartridge library system in block diagram form.
Figure 2:
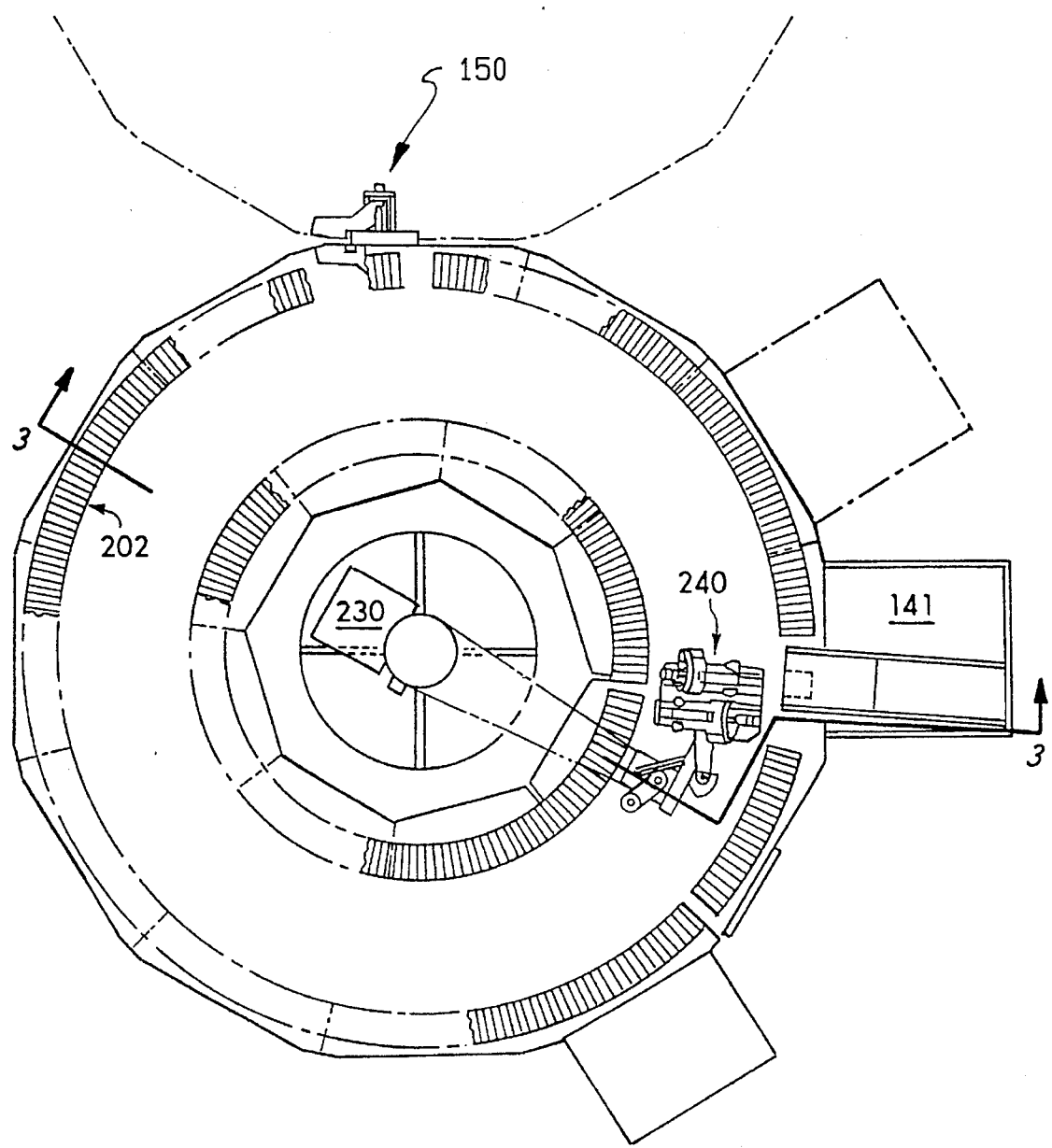
FIG. 2 illustrates a top view of a library module.
Figure 3:
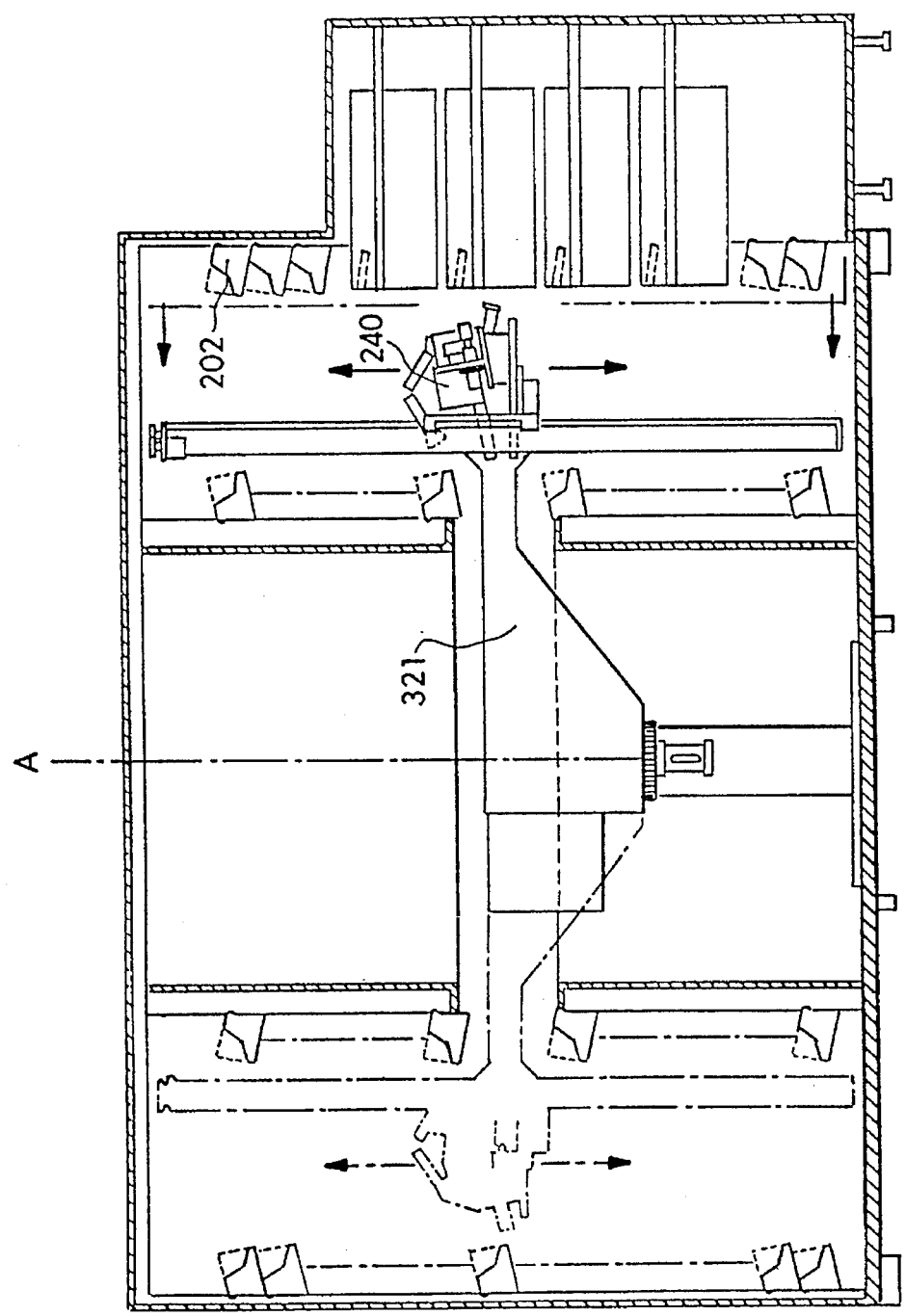
FIG. 3 illustrates a cut away view of a library module with its associated robot arm mechanism and tape cartridge storage cell array.
Figure 4:
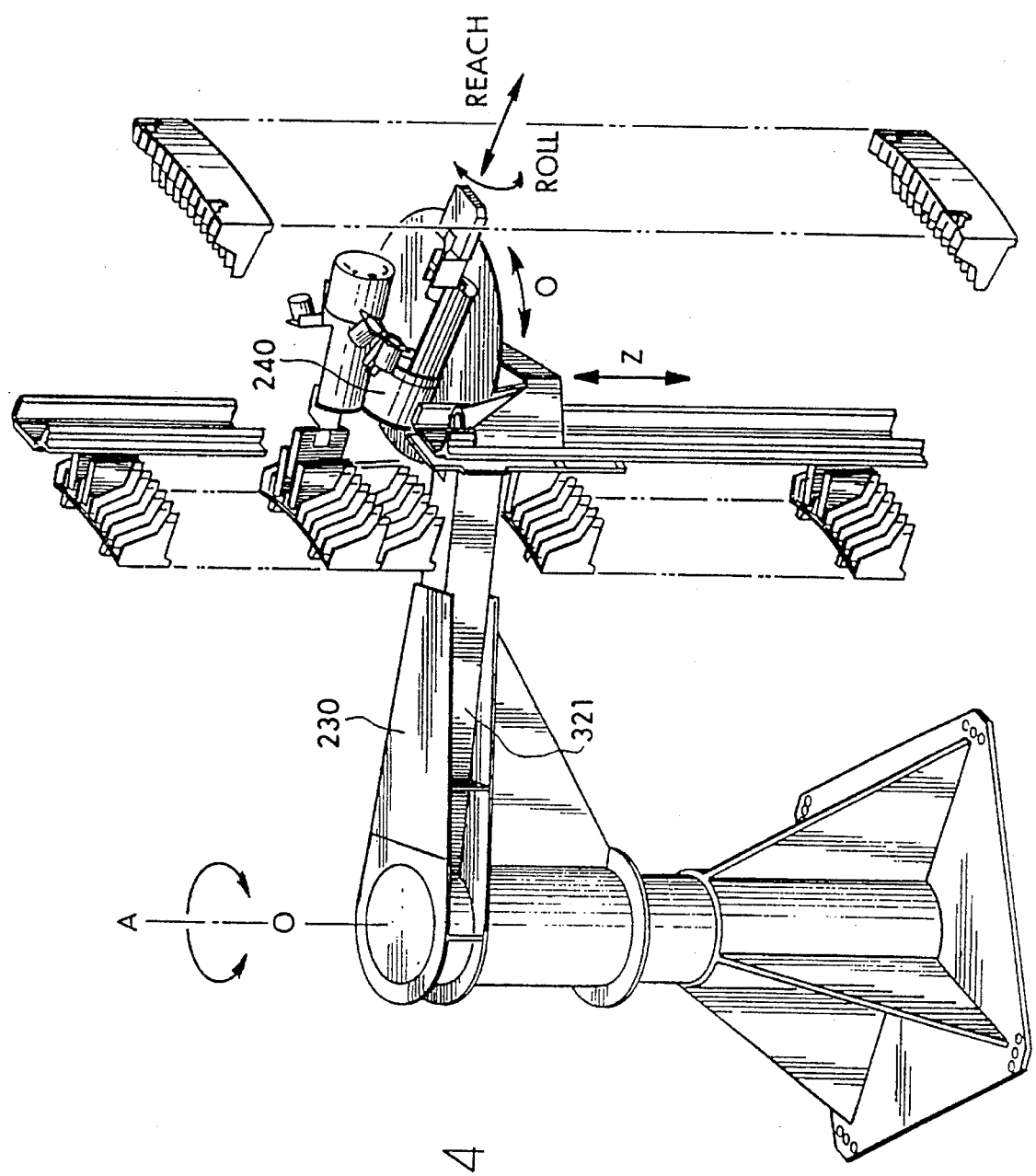
FIG. 4 illustrates a perspective view of the robot arm mechanism.
Figure 5:
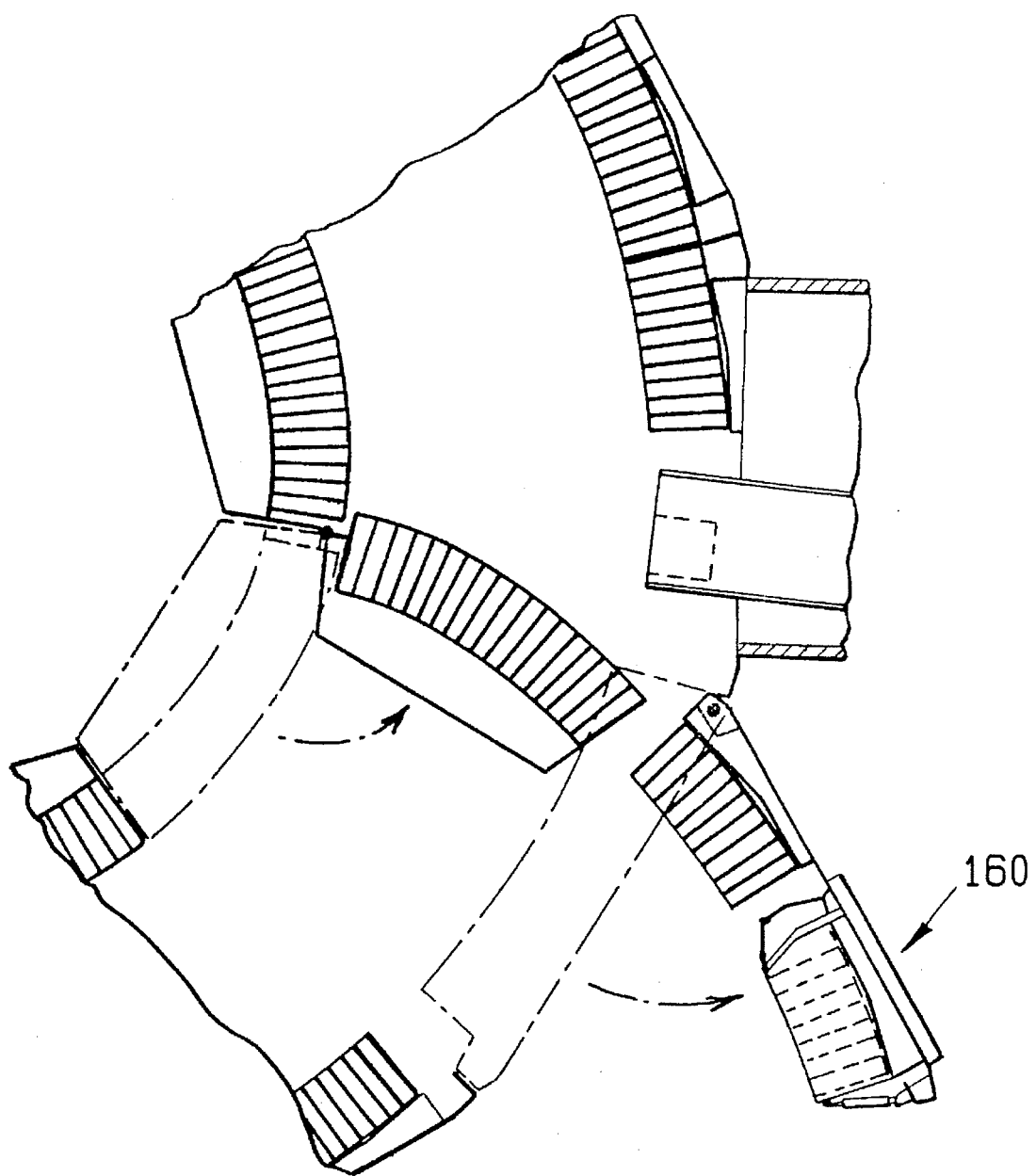
FIG. 5 illustrates in plan view the access doors and cartridge access port shown in FIG. 2.
Figure 6:
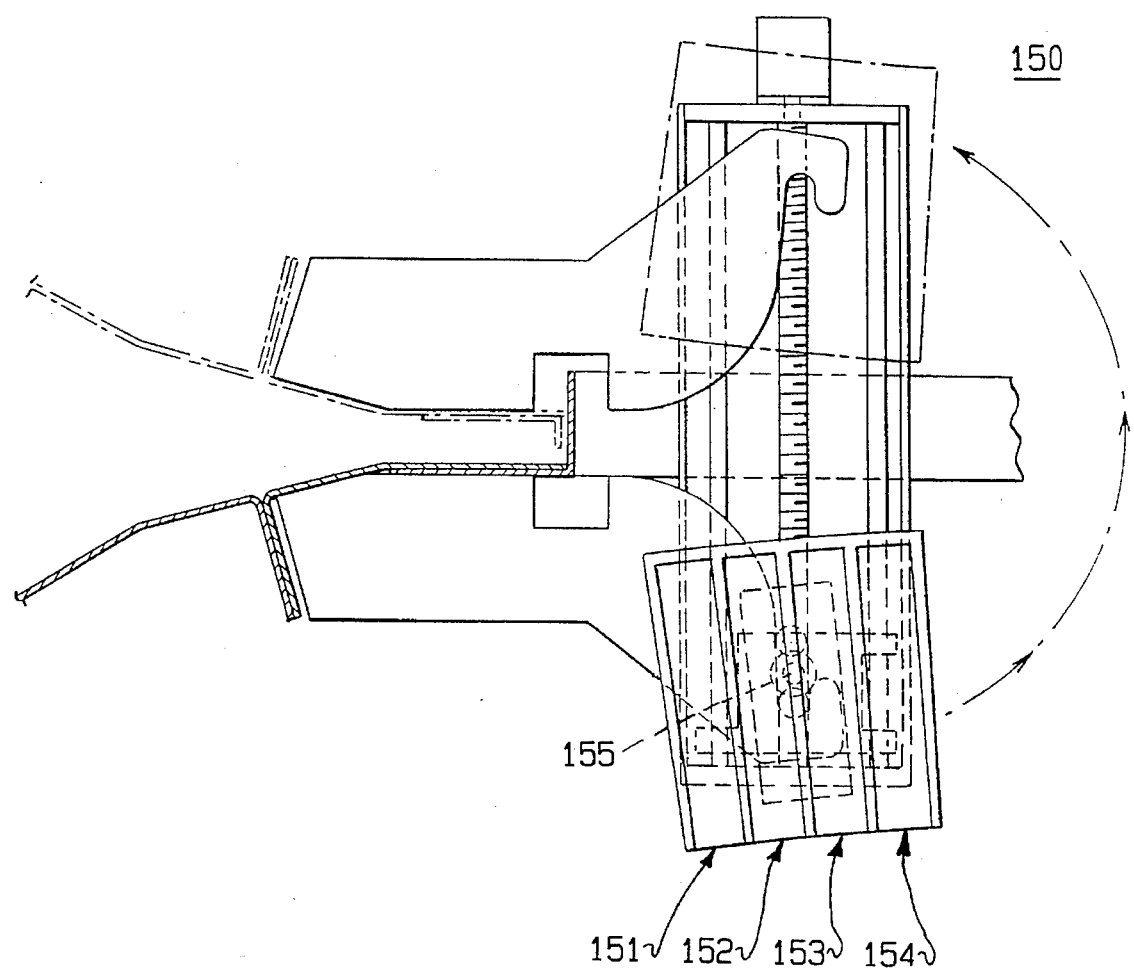
FIG. 6 illustrates in detail the pass through port shown in FIG. 2.
Figures 1, 7A:
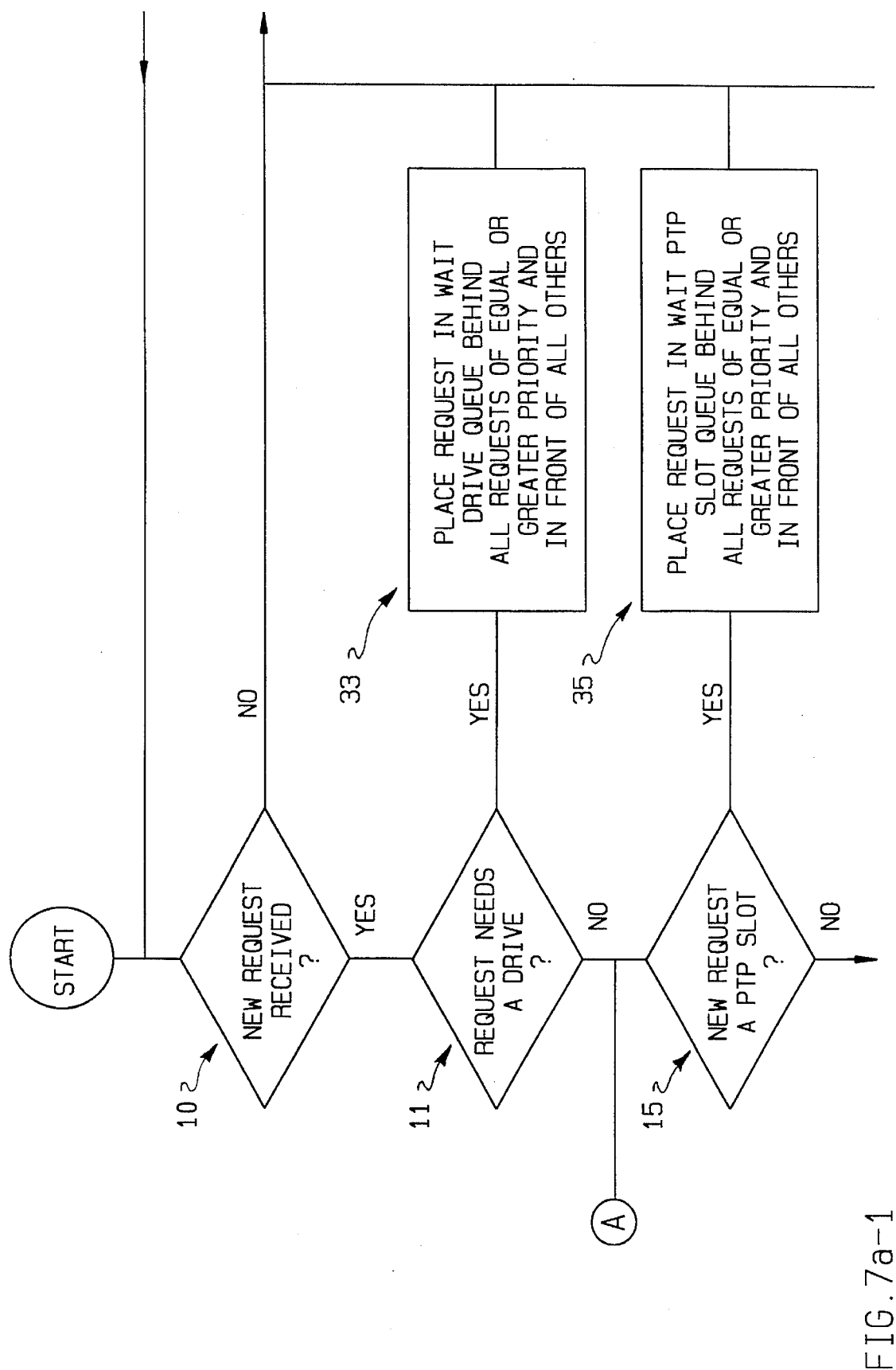
Figures 2, 7A:
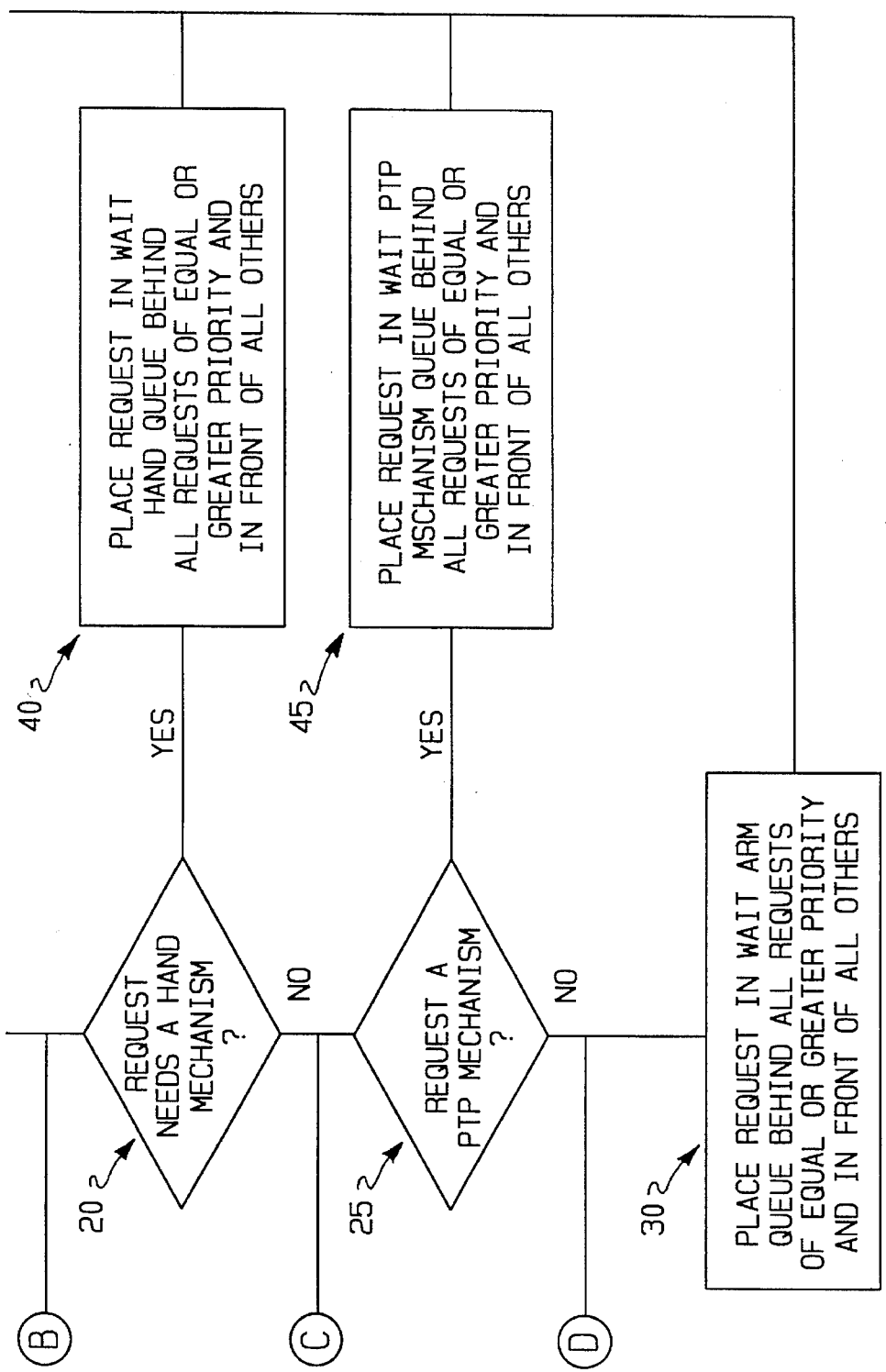
Figures 2, 7B:
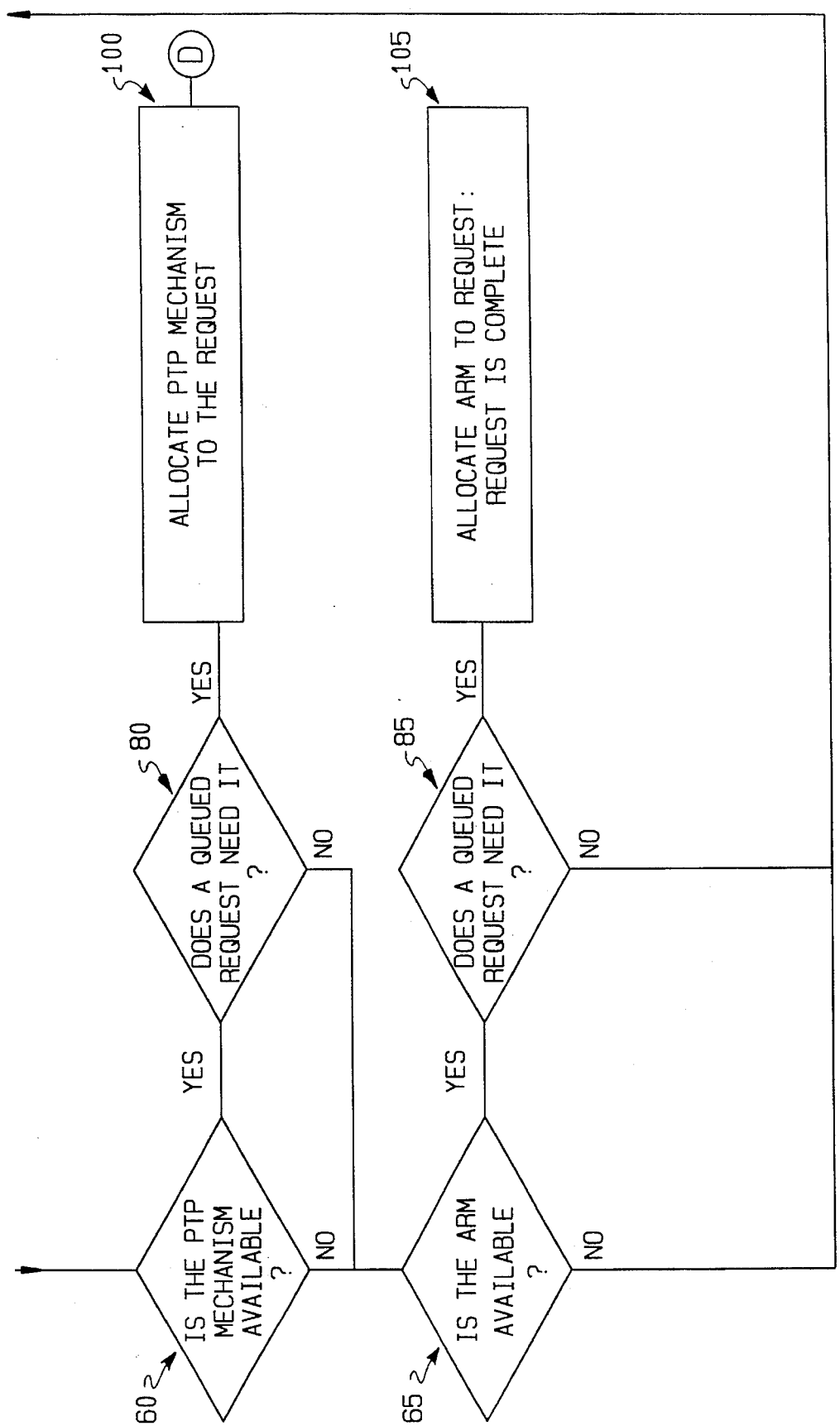

FIGS. 7*a*-1, 7*a*-2, 7*b*-1 and 7*b*-2 are an embodiment of the invention for task prioritization in an ACS which may have a plurality of LSMs 111, 112 inter-connected by PTP mechanisms 155. In accordance with the invention, task prioritization is achieved by assigning a priority to each cartridge request. The priority of each request illustratively is a value from 0 to 99 with 99 being highest.

When a new cartridge request is received (step 10), it is examined to determine if its destination is a tape drive 141, 142, 143, 144 (step 11) and, if so, if the destination tape drive 141, 142, 143, 144 is available. If the destination drive 141, 142, 143, 144 is available, the drive 141, 142, 143, 144 is allocated to the request and processing of the request continues at step 15. If the drive 141, 142, 143, 144 is not available, the request is placed in a drive queue behind all requests of equal or greater priority and in front of all others (step 33). At step 47, the library controller 121 determines if a drive 141, 142, 143, 144 has become available. If a tape drive 141, 142, 143, 144 is now available, the library controller 121 determines if any requests in the drive queue need the available tape drive 141, 142, 143, 144 by scanning the drive queue from the highest priority request to the lowest priority request (step 67). The available tape drive 141, 142, 143, 144 is allocated to the first request in the queue waiting on that tape drive 141, 142, 143, 144 (step 87).

Figures 1, 8A:
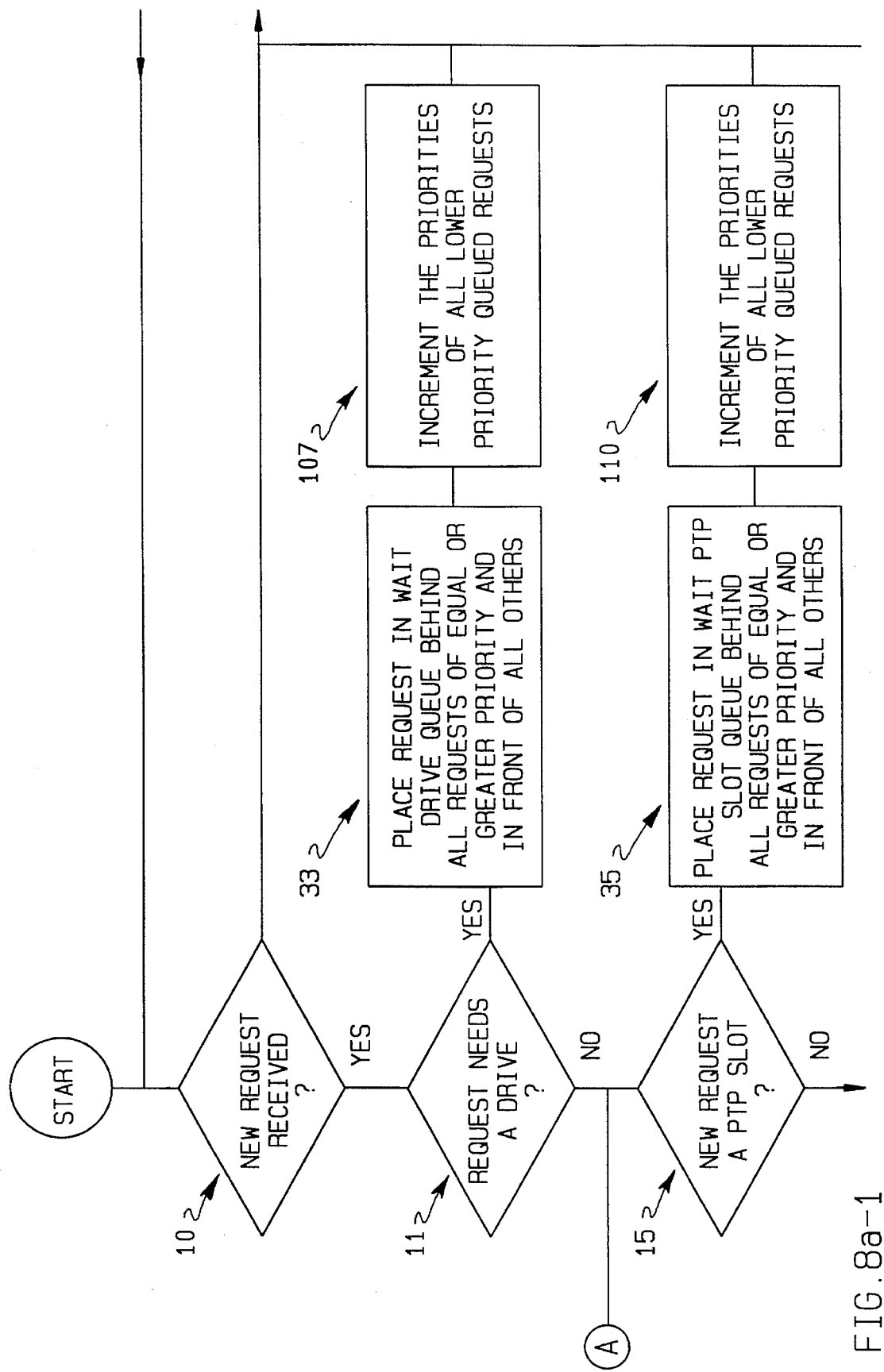
Figures 2, 8A:
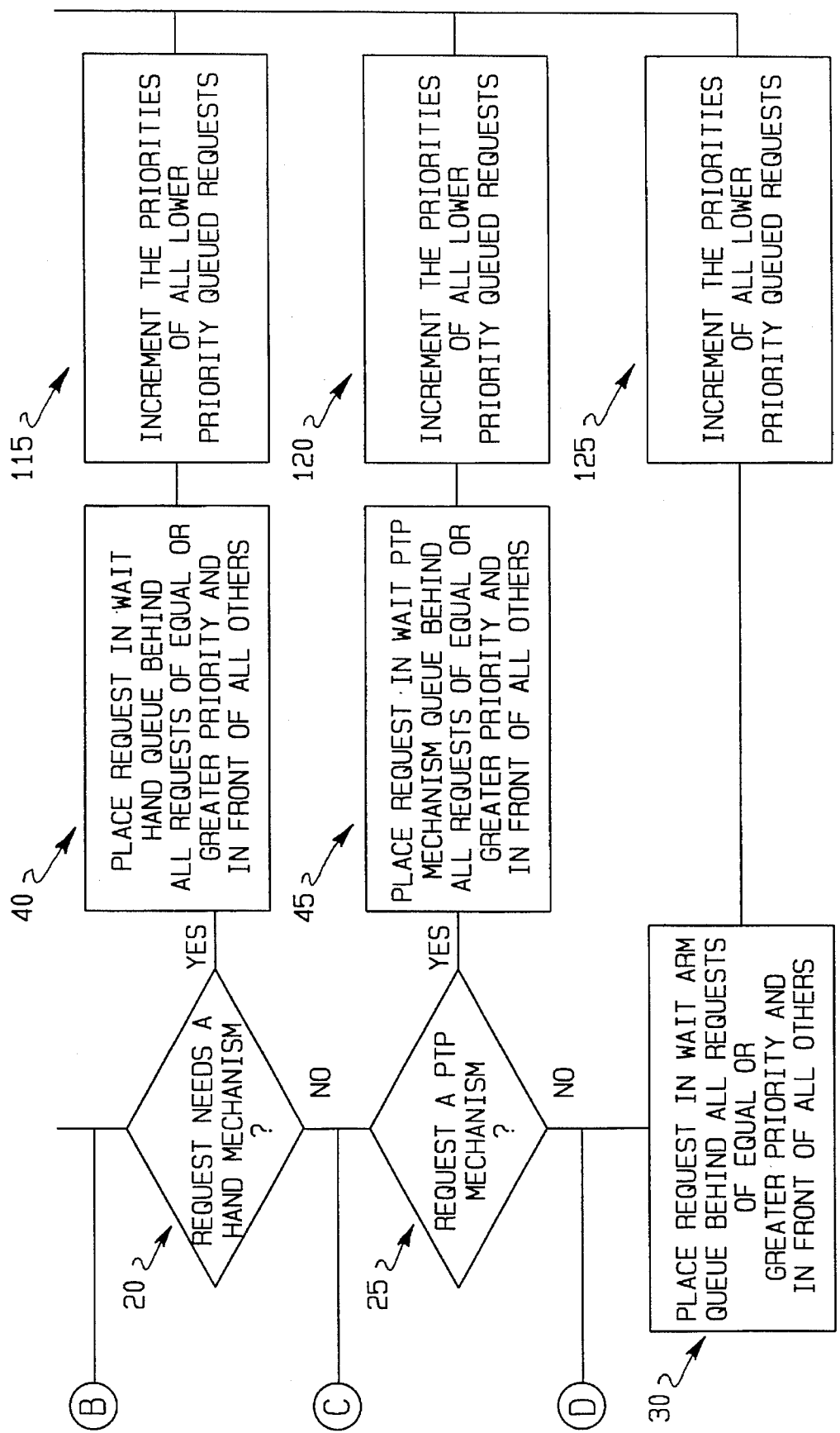
Figures 2, 8B:
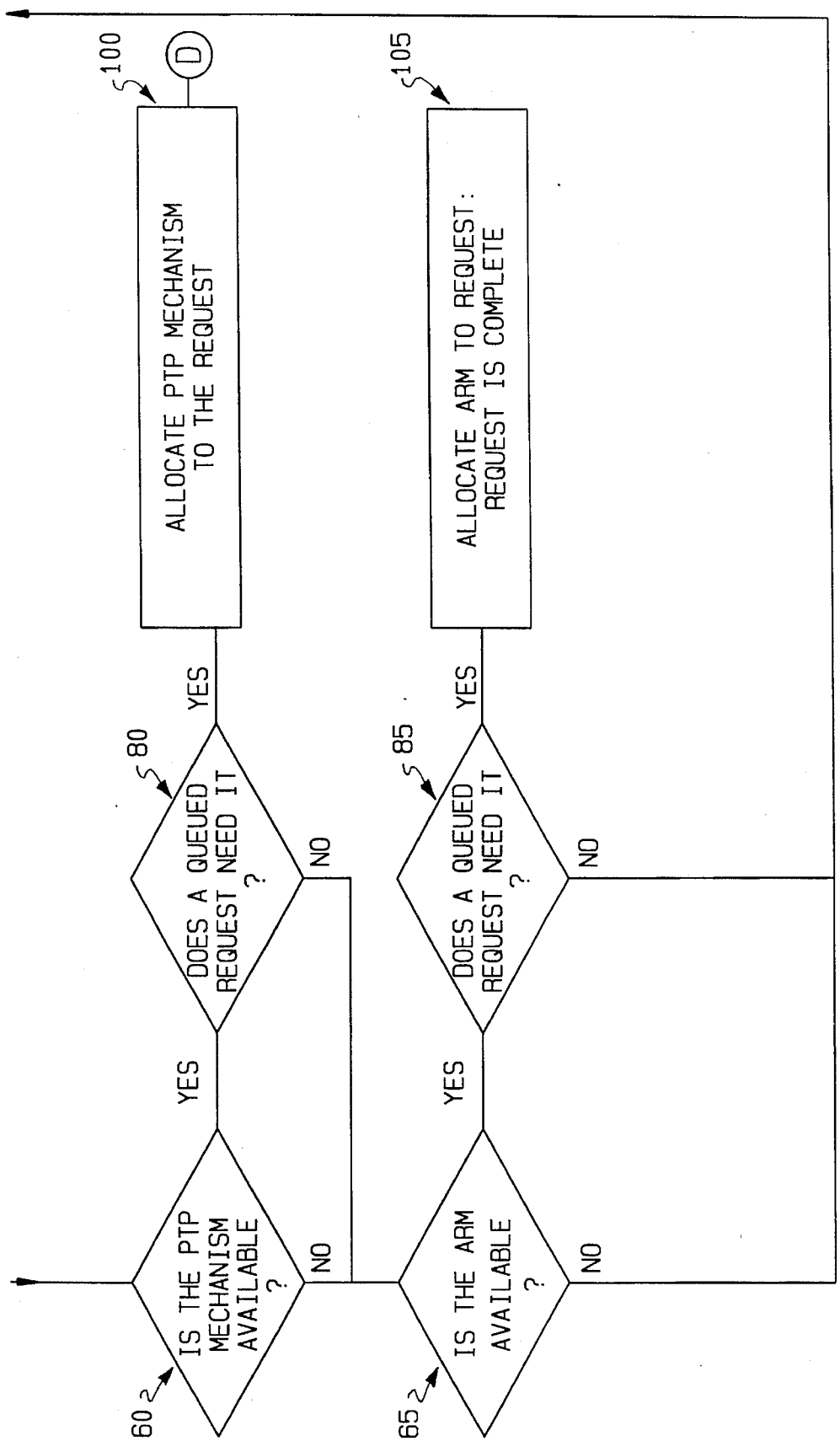

In alternative embodiment shown in FIGS. 8a-1, 8a-2, 8b-1 and 8b-2, to avoid the problem of lower priority requests being held off indefinitely, after the request is placed in the drive queue behind all requests of equal or greater priority and in front of all others (step 33), the library controller 121 increments the priority of all requests in the drive queue of priority lower than the newly entered request (step 107).

Figures 1, 9A:
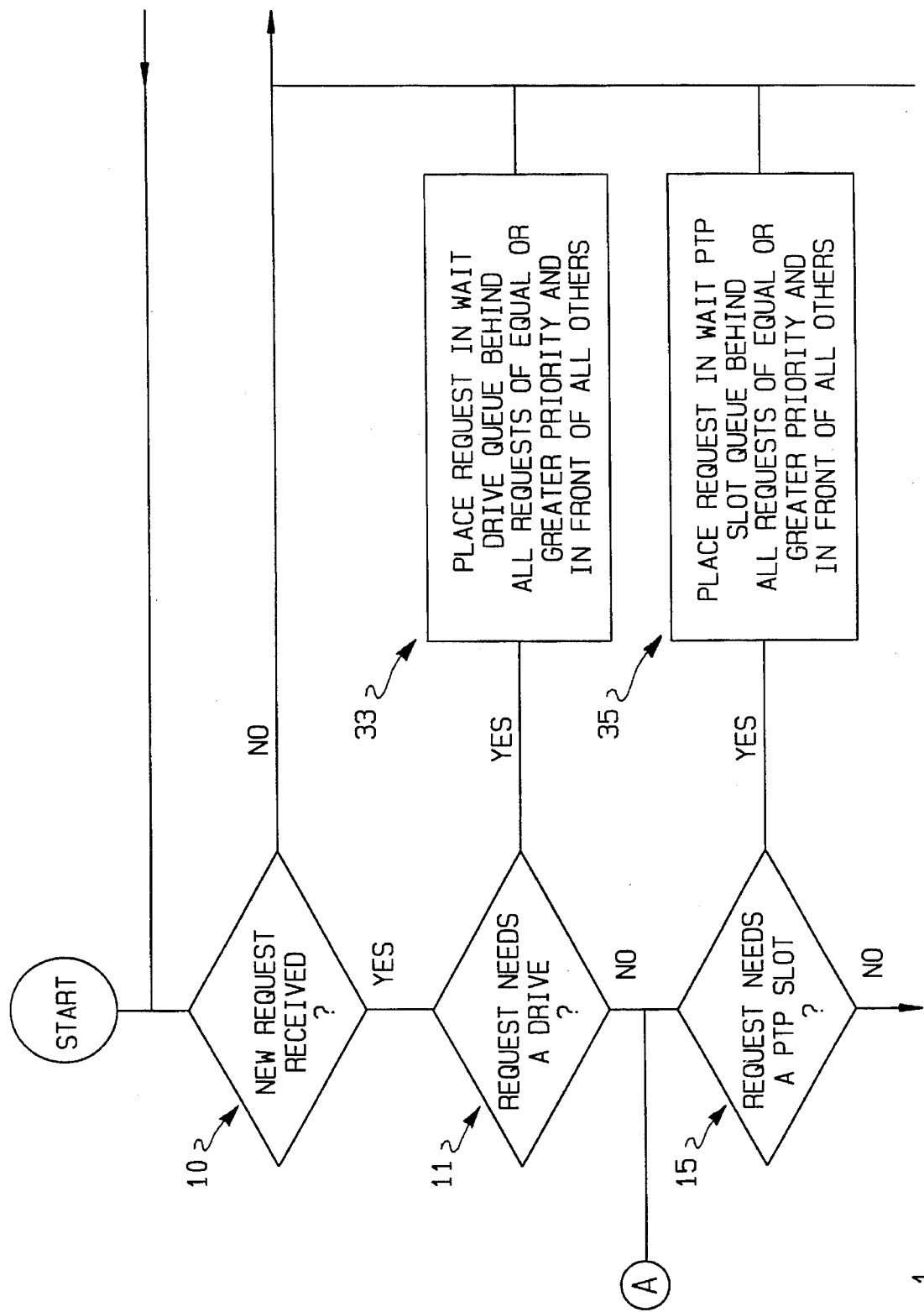
Figures 2, 9A:
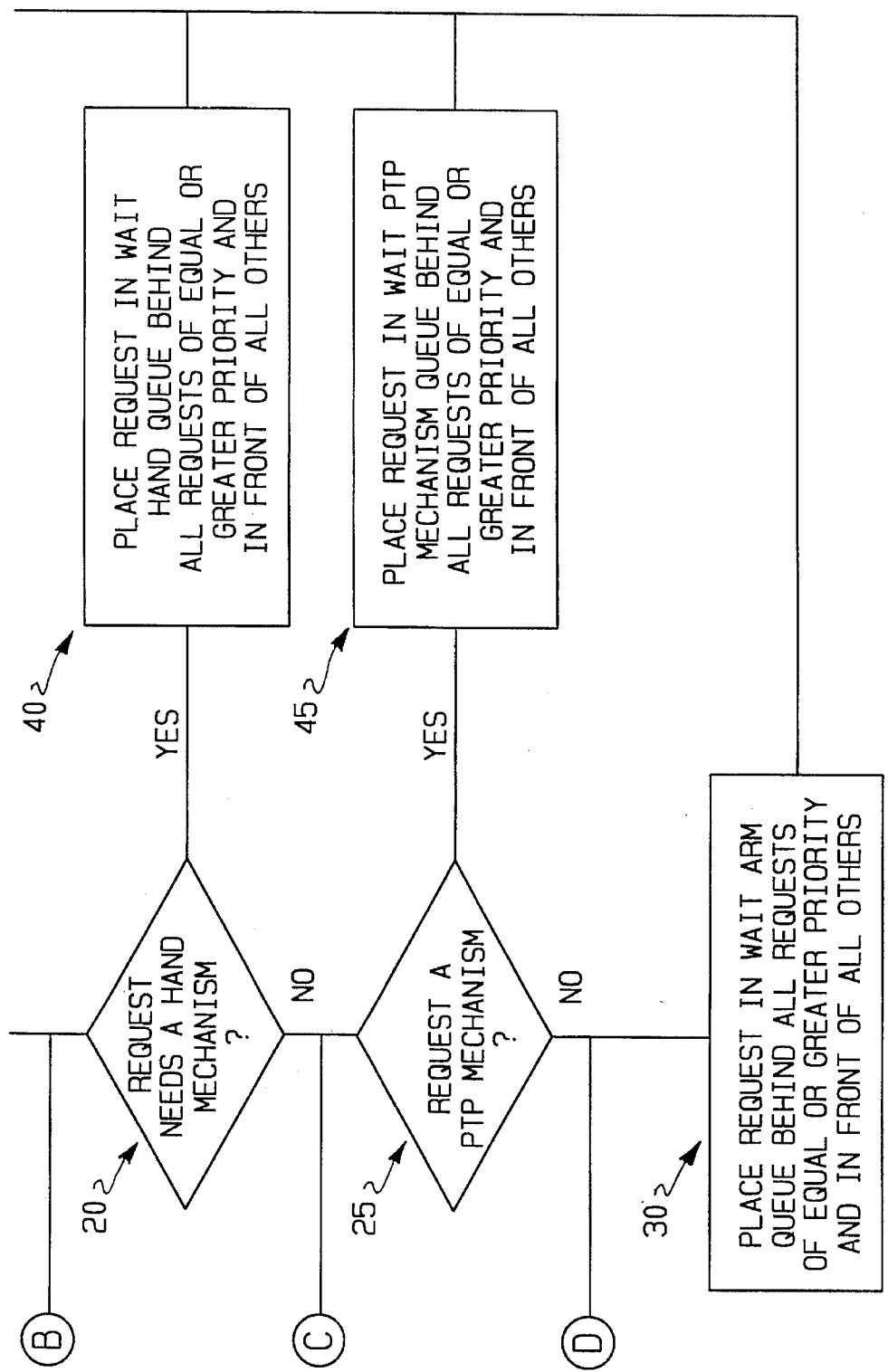
Figures 1, 9B:
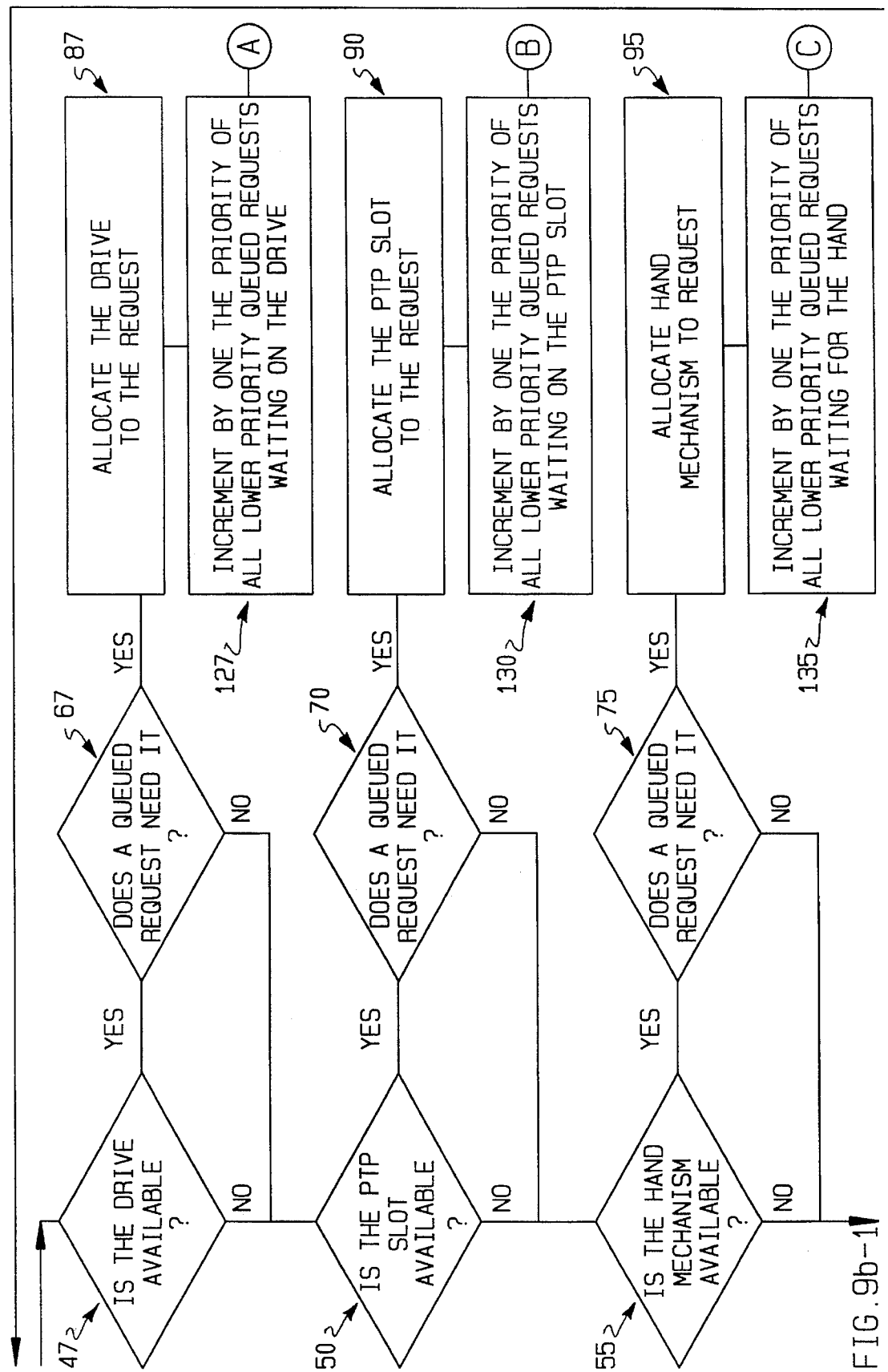
Figures 2, 9B:
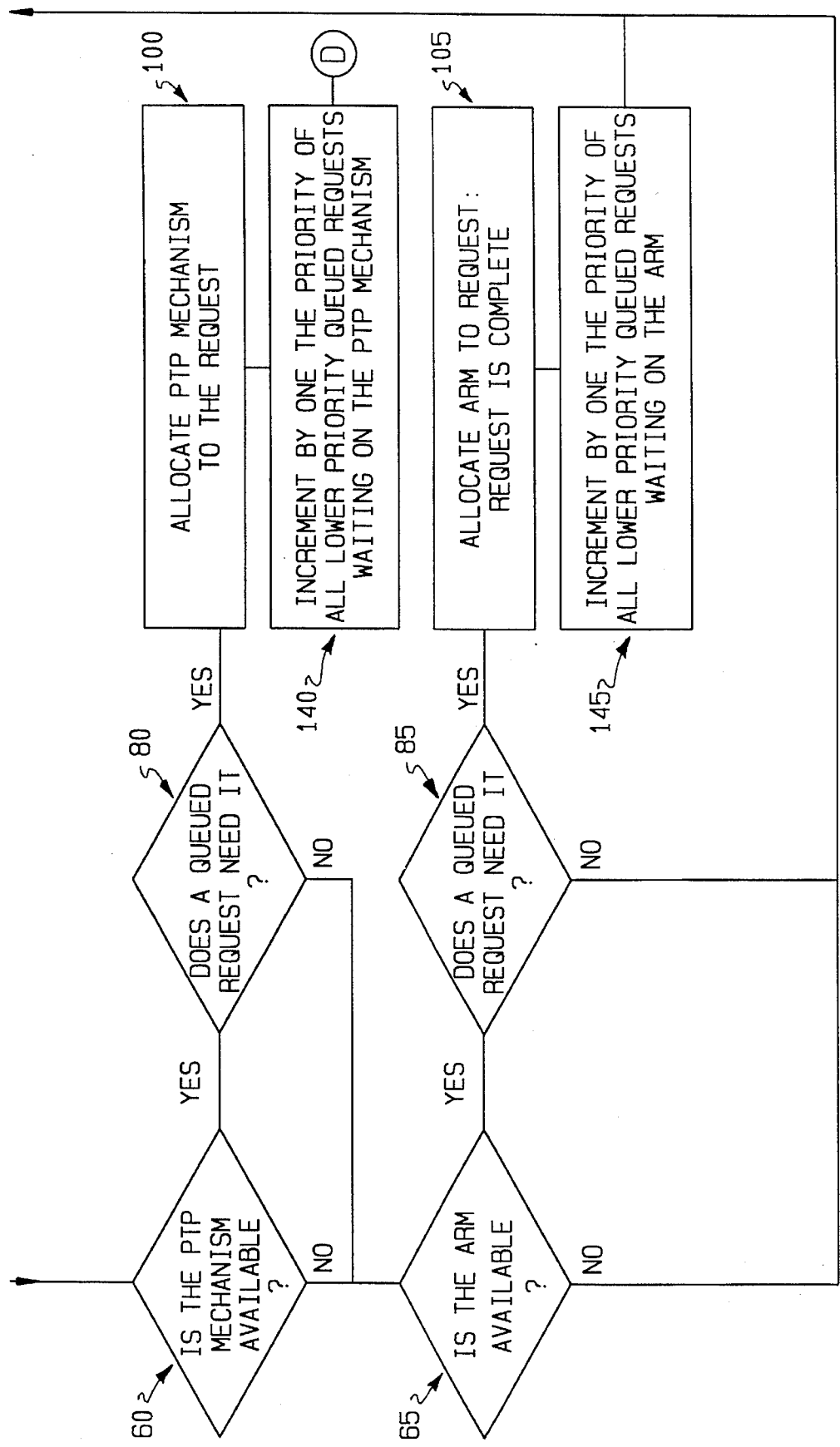

A further alternative embodiment is shown in FIGS. 9a-1, 9a-2, 9b-1 and 9b-2. Rather than increasing the priority after a new request has been entered in the drive queue of all requests in the hand queue with a priority lower than the newly entered request, to avoid the problem of lower priority requests being held off indefinitely, the library controller 121 increments after allocation of a drive 141, 142, 143, 144 the priority of all lower priority requests in the drive queue waiting for the allocated drive 141, 142, 143, 144 (step 127).

Referring back to FIGS. 7a-1, 7a-2, 7b-1 and 7b-2, after the destination drive 141, 142, 143, 144 has been allocated to the request, the request is examined to determine if a PTP slot 151, 152, 153, 154 is needed (step 15). All requests which need a PTP slot 151, 152, 153, 154 are placed in a PTP slot queue behind all requests of equal or greater priority and in front of lower priority requests (step 35). If PTP slots 151, 152, 153, 154 are available, the library controller 121 determines if any requests in the PTP slot queue need the available PTP slot 151, 152, 153, 154 by scanning the PTP slot queue from the highest priority request to the lowest priority request (step 70). When a request in the PTP slot queue is found for which all necessary PTP slots 151, 152, 153, 154 are available, the request is granted the path, i.e., the necessary PTP slots 151, 152, 153, 154 are allocated to it (step 90).

Referring again to FIGS. 8a-1, 8a-2, 8b-1 and 8b-2, to avoid the problem of lower priority requests being held off indefinitely, the library controller 121 increments the priority of all requests in the PTP slot queue of priority lower than the newly entered request (step 110). At step 50 the library controller 121 determines if any PTP slots 151, 152, 153, 154 are available.

In the further alternative embodiment shown in FIGS. 9a-1, 8a-2, 9b-1 and 9b-2, rather than increasing after a new request has been entered in the PTP slot queue the priority of all requests in the PTP slot queue with a priority lower than the newly entered request, to avoid the problem of lower priority requests being held off indefinitely, the library controller 121 increments after allocation of the PTP slots 151, 152, 153, 154 the priority of all lower priority requests in the PTP slot queue waiting for the allocated PTP slots 151, 152, 153, 154 (step 130).

Referring back to FIGS. 7a-1, 7a-2, 7b-1 and 7b-2, once the request is granted a path, the library controller 121 examines the request to determine if a hand 240 is needed (step 20). If a hand 240 is needed, the request is placed in a hand queue behind all requests of equal or greater priority and in front of all others (step 40). At step 55 the library controller 121 determines if a hand 240 has become available. If a hand 240 is now available, the library controller 121 determines if any requests in the hand queue need the available hand 240 by scanning the hand queue from the highest priority request to the lowest priority request (step 75). The available hand 240 is allocated to the first request in the queue waiting on that hand 240 (step 95).

As illustrated in the alternative embodiment shown in FIGS. 8a-1, 8a-2, 8b-1 and 8b-2, to avoid the problem of lower priority requests being held off indefinitely, the library controller 121 increments the priority of all requests in the hand queue of priority lower than the newly entered request (step 115).

Illustrated in the further alternative embodiment shown FIGS. 9a-1, 9a-2, 9b-1 and 9b-2, rather than increasing after a new request has been entered in the hand queue the priority of all requests in the hand queue with a priority lower than the newly entered request, to avoid the problem of lower priority requests being held off indefinitely, the library controller 121 increments after allocation of a hand 240 the priority of all lower priority requests in the hand queue waiting for the allocated hand 240 (step 135).

Referring back to FIGS. 7a and 7b, all requests which need a PTP mechanism 155 are placed in a PTP mechanism queue behind all requests of equal or greater priority and in front of all others (step 45). At step 60 the library controller 121 determines if an PTP mechanism 155 is available. If a PTP mechanism 155 is available, the library controller 121 determines if any requests in the PTP mechanism queue need the available PTP mechanism 155 by scanning the PTP mechanism queue from the highest priority request to the lowest priority request (step 80). The available PTP mechanism 155 is allocated to the first request in the queue waiting on that PTP mechanism 155 (step 100).

As illustrated in FIGS. 8a-1, 8a-2, 8b-1 and 8b-2, to avoid the problem of lower priority requests being held off indefinitely, the library controller 121 increments the priority of all requests in the PTP mechanism queue of priority lower than the newly entered request (step 120).

In the further alternative embodiment shown in FIGS. 9a-1, 9a-2, 9b-1 and 9b-2, rather than increasing after a new request has been entered in the PTP mechanism queue the priority of all requests in the PTP mechanism queue with a priority lower than the newly entered request, to avoid the problem of lower priority requests being held off indefinitely, the library controller 121 increments after allocation of a PTP mechanism 155 the priority of all lower priority requests in the PTP mechanism queue waiting for the allocated PTP mechanism 155 (step 140).

Referring again to FIGS. 7a-1, 7a-2, 7b-1 and 7b-2, all requests which need an arm 321 are placed in a wait arm queue behind all requests of equal or greater priority and in front of all others (step 30). At step 65 the library controller 121 determines if an arm 321 is available. If an arm 321 is available, the library controller 121 determines if any requests in the arm queue need the available arm 321 by scanning the arm queue from the highest priority request to the lowest priority request (step 85). The available arm 321 is allocated to the first request in the queue waiting on that arm 321 (step 105).

As illustrated in FIGS. 8a-1, 8a-2, 8b-1 and 8b-2, to avoid the problem of lower priority requests being held off indefinitely, the library controller 121 increments the priority of all requests in the arm queue of priority lower than the newly entered request (step 125).

In further alternative embodiment shown in FIGS. 9a-1, 9a-2, 9b-1 and 9b-2, rather than increasing after a new request has been entered in the arm queue the priority of all requests in the arm queue with a priority lower than the newly entered request, to avoid the problem of lower priority requests being held off indefinitely, the library controller 121 increments after allocation of an arm 321 the priority of all lower priority requests in the arm queue waiting for the allocated arm 321 (step 145).

In the operations described above, there exists one resource queue for each resource, i.e., PTP mechanism 155, drive 141, 142, 143, 144, hand 240 and arm 321, for the entire automatic cartridge system. Each time a resource becomes available, the appropriate queue is scanned from the oldest entry to the newest entry to determine which request in the queue is waiting on the available resource.

In an alternative implementation, there exists one resource queue for each resource for each LSM 111, 112 in the automated cartridge system. Each time a resource become available in an LSM 111, 112, it is allocated to the first element on the queue (with task prioritization, the first entry on the queue will have the highest priority). This implementation eliminates the need to scan the queue to determine which request in the queue is waiting on the available resource.

Another embodiment of the present invention provides the capability to execute certain requests only when no other requests are pending in the system. A special priority is assigned to these requests that inhibit their execution until no other requests are pending in the system. In accordance with this embodiment, the library controller 121 assigns a priority of 0 to those requests that are to be executed only when no other requests are pending in the system ("priority 0 requests"). The library controller 121 never increments the priority of priority 0 requests. As a result, these priority 0 request will only be executed by the system when no other requests are competing for available resources.

Another embodiment of the present invention provides the capability to execute certain requests before all current requests pending in the system. A super priority is assigned to these requests that is greater than any priority that may be assigned by the system. In accordance with this embodiment, the library controller 121 assigns a priority of 99 to those requests that are to be executed before all current requests pending in the system ("priority 99 requests"). The library controller 121 never increments the priority of a request pending in the system to a priority greater than 98. As a result, priority 99 requests are allocated available resources before all non-priority 99 requests pending in the system.

Various methods of prioritizing the cartridge requests may be used in accordance with the invention. In one example, the library controller 121 may have numerous hosts. Each host can be set up to send requests at a priority that relates to the response time required for that particular host. For instance, a host connected to customer accounts may have a higher priority attached to its requests than a host which handles cartridge requests for engineers.

In another example, priorities could be assigned on a user by user basis. For instance, the system administrator would have a higher priority attached to his requests than say a financial analyst.

In a final example, prioritization could be assigned to cartridge requests based on the type of robot motion that will be required. As an example, cartridge entries into the system would have a higher priority than cartridge removals from the system. It should also be noted that a combination of the preceding examples could also be implemented.

A computer program listing one embodiment of an implementation of task prioritization for a tape storage system is attached as an appendix hereto.

Various embodiments of the invention have been described. The descriptions are intended to be illustrative, not limitative. Thus, it will be apparent to those skilled in the art that certain modifications may be made to the invention as described without departing from the scope of the claims set out below.

APPENDIX FOR

TASK PRIORITIZATION FOR A TAPE STORAGE SYSTEM

PATENT APPLICATION

```
alc_vars.c                                                                Page 1 static char resid[]="$Header: /home/twolf/devet/alc/RCS/alc_vars.c,v 1.4 1993/05/13 1
5:53:43 aarond Exp $";
/*******************************************************************************
 *
 *              StorageTek SECRET
 *         Property of Storage Technology Corporation
 *         Do not copy or distribute unpublished work
 *
 *                    Copyright (1991)
 *              Storage Technology Corporation
 *                   All Rights Reserved
 *
 * alc_define_include_file
 *
 * This file contains global variable used throughout the allocation task
 *
 *******************************************************************************/ ifndef LAN_VARS_H
define LAN_VARS_H include "com.h"
include "alc.h"

/*-----------------------------------------------------------------------------
 * trace buffer for normal events and its index
 *----------------------------------------------------------------------------*/
struct altrc al_tbuf[ ALTRMAX ];
int al_trptr;

/*-----------------------------------------------------------------------------
 * trace buffer for bad events and its index
 *----------------------------------------------------------------------------*/
struct altrc al_bcbuf[ BCTRMAX ];
int al_bcptr;

/*-----------------------------------------------------------------------------
 * linked lists for resource requests
 *----------------------------------------------------------------------------*/
struct COM_LNK_LIST al_wtpth     = {0}; /* path wait queue       */
struct COM_LNK_LIST al_wtarm[MAXLSM] ={0}; /* arm wait queue     */
struct COM_LNK_LIST al_wthnd[MAXLSM] ={0}; /* hand wait queue    */
struct COM_LNK_LIST al_wtmch[MAXLSM] ={0}; /* PTP mech wait queue */
struct COM_LNK_LIST al_wtdrv[MAXLSM] ={0}; /* drive wait queue   */

/*-----------------------------------------------------------------------------
 * dynamic distances between LSM
 *----------------------------------------------------------------------------*/
UCHAR al_dists[ MAXLSM ][ MAXLSM ] = {0}; /* LSM to LSM distances */

/*-----------------------------------------------------------------------------
 * static distances between LSMs;
 * NOCNNECT if no available path
 *----------------------------------------------------------------------------*/
UCHAR al_stdst[ MAXLSM ][ MAXLSM ] = {0}; /* LSM/LSM dists */ struct allc_pth *al_ppath =(0); /* Pointer to prealloc path */

UCHAR al_cnect[ MAXLSM ][ MAXLSM ] = {0};/* PTP connection table */ struct allc_req *al_opndr[MAXLSM] = {0};/* offline pend requests */

BOOLEAN al_ptpdl = FALSE;       /* PTP deadlock flag T/F */
UCHAR al_dllsm = 0;             /* PTP deadlock LSM      */
UCHAR al_dlpnl = 0;             /* PTP deadlock Panel    */
```

```
alc_vars.c                                                                Page 2 endif
```

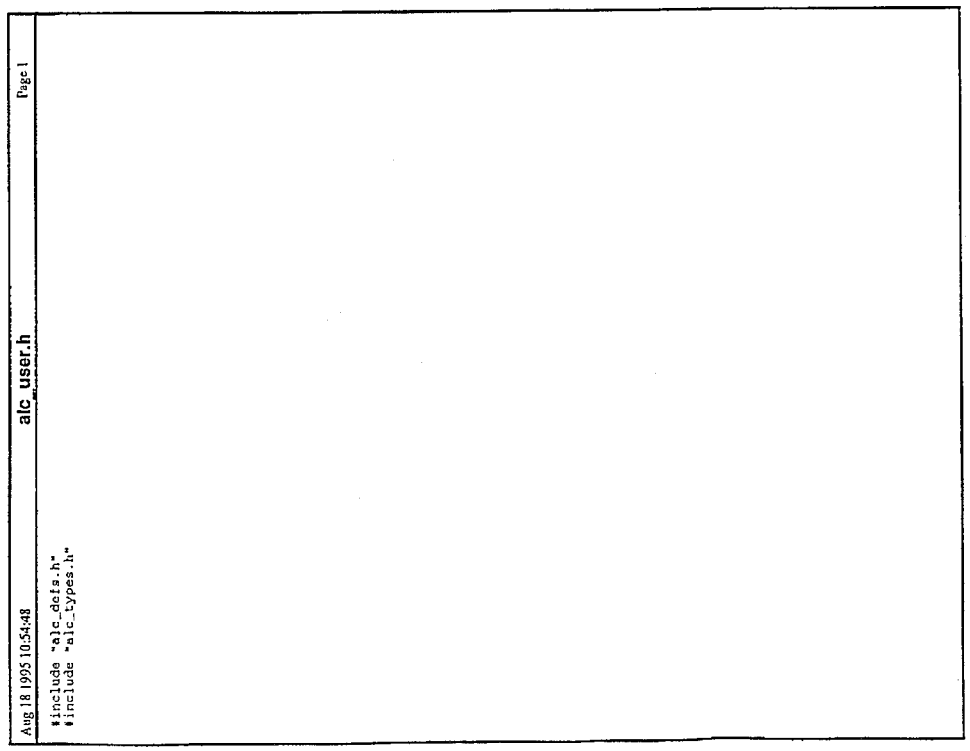

```
Aug 18 1995 10:54:48                       alc_types.h                              Page 1

/* $Header: /home/twolf/davet/alc/RCS/alc_types.h,v 1.7 1993/07/23 15:01:15 aarond Ex
p $ */
/*****************************************************************************
 *
 *                          StorageTek SECRET
 *            Property of Storage Technology Corporation
 *            Do not copy or distribute unpublished work
 *
 *                          Copyright (1991)
 *                   Storage Technology Corporation
 *                         All Rights Reserved
 *
 *      alc types include file
 *
 *      This file contains all types used in the allocation task
 *
 *****************************************************************************/ ifndef ALC_TYPES_H
define ALC_TYPES_H enum alc_allocation_requests
{
    ARQ_ARM,                /* request arm alloc                    */
    ARQ_ARHD,               /* req arm/hand alloc                   */
    ARQ_ARPM,               /* req arm/port-mech alloc              */
    ARQ_AHPM,               /* req arm/hand/port-mech               */
    ARQ_PATH,               /* req path allocation                  */
    ARQ_CAPR,               /* req CAP reserve                      */
    ARQ_CREL,               /* req CAP release                      */
    ARQ_ENTR,               /* req ENTER mode                       */
    ARQ_EJCT,               /* req EJECT mode                       */
    ARQ_CCAT,               /* req CAP for catalogue                */
    ARQ_VONL,               /* req vary Online                      */
    ARQ_VOFF,               /* req vary Offline                     */
    ARQ_FOFF,               /* req vary Offline Force               */
    ARQ_VMNT,               /* req vary maintenance                 */
    ARQ_SSWP,               /* req drive for self-swap              */
    ARQ_CLOK,               /* req CAP Lock                         */
    ARQ_CDRP                /* req drop host allegience             */
};

#define ARQ_REJ 0           /* rejection byte value                 */

/*---------------------------------------------------------------------------
 * allocation resource request structure
 * NOTE: allocation overlay this struct with alc_rep! keep in sync
 *---------------------------------------------------------------------------*/
struct alc_req                  /* Allocation request               */
{
    enum alc_allocation_requests req_typ; /* request type */
    BOOLEAN maintenance;        /* maintenance request?             */
    UCHAR prim_lsm;             /* primary LSM                      */
    UCHAR priority;             /* input priority of request        */
    UCHAR age;                  /* age                              */
    UCHAR actual_priority;      /* actual executed priority         */
    UCHAR req_task;             /* requesting task ID               */
    UCHAR qualif_0;             /* qualifiers                       */
    UCHAR qualif_1;             /* qualifiers                       */
    UCHAR qualif_2;             /* qualifiers                       */
    UCHAR qualif_3;             /* qualifiers                       */
    unsigned xptq_tim;          /* transport queueing time          */
    unsigned pthq_tim;          /* path/ptp queueing time           */
};

/*
```

```
Aug 18 1995 10:54:48                       alc_types.h                              Page 2

* Allocate Resource Response Structure
 * NOTE: this struct overlays alc_req! keep in sync
 *---------------------------------------------------------------------------*/
struct alc_rep                  /* Allocation response              */
{
    enum alc_allocation_requests req_typ; /* request type           */
    BOOLEAN maintenance;        /* maintenance request?             */
    UCHAR prim_lsm;             /* primary LSM                      */
    UCHAR priority;             /* executed priority of request     */
    UCHAR age;                  /* age                              */
    UCHAR actual_priority;      /* actual executed priority         */
    UCHAR filler;               /* to match req struct              */
    union
    {
        UCHAR extend1[4];       /* extended info bytes              */
        struct alc_pth *path_ptr; /* pointer for path response      */
    } qual;
    unsigned xptq_tim;          /* transport queueing time          */
    unsigned pthq_tim;          /* path/ptp queueing time           */
};

struct apth_ext                 /* allocate path - extended         */
{
    struct alc_req areq;        /* basic alloc request              */
    unsigned short xhost;       /* extended host ID                 */
};

/* This field is qualifier 2 for CAP reserve override               */
#define Q2_RCVR    0x01         /* recover option on host           */
#define PLC_CELL   0x00         /* path location - cell             */
#define PLC_CAP    0x40         /* path location - CAP              */
#define PLC_DRIV   0x80         /* path location - drive            */
#define PLC_MASK   0xC0         /* path location mask               */
#define PLC_DRPN   0x3C         /* path drive panel id              */
#define PLC_TAPU   0x0C         /* path drive tape unit             */
#define PLC_DRID   0x03         /* path drive id mask               */
define PLC_CPID   0x03         /* path CAP id mask                 */ define PLC_ABEG   0x40         /* internal: beg rsrc alloc         */
define PLC_AEND   0x80         /* internal: end rsrc alloc         */
define LSM_MASK   0x0F         /* internal: end rsrc alloc         */ define HAND0      0            /* ID for hand 0                    */
define HAND1      1            /* ID for hand 1                    */
define HANDNONE   0x7F         /* ID for NO HAND                   */ define PRV_ONL    ARQ_VONL     /* previous state online            */
define PRV_OFFP   ARQ_VOFF     /* prev state offline pend          */
#define PRV_OFF    ARQ_VOFF     /* prev state offline               */
define PRV_MNT    ARQ_VMNT     /* prev state maintenance           */ enum alc_resource_change_type
{
    RCT_DEAL,                   /* deallocate resource              */
    RCT_NOPR,                   /* operative to inoperative         */
    RCT_OPER,                   /* inoperative to operative         */
    RCT_REDY,                   /* Ready (LSM)                      */
    RCT_NRDY,                   /* Not Ready (LSM)                  */
    RCT_OCCD,                   /* position occupied (init)         */
    RCT_FILL,                   /* filled                           */
    RCT_EMTY,                   /* emptied                          */
    RCT_COMM,                   /* communicating (drive)            */
    RCT_NCOM,                   /* not communicating (drive)        */
    RCT_DROP,                   /* door opened (LSM)                */
    RCT_DRCL,                   /* door closed (LSM)                */
    RCT_DRAK,                   /* door open acknowledged           */
```

```
Aug 18 1995 10:54:48              alc_types.h                              Page 3

RCT_CTAC,                    /* catalog becoming active */
    RCT_CTIN                     /* catalog becoming inactive*/
};

enum alc_resource_type
{
    RST_ARM,                     /* resource type arm */
    RST_HAND,                    /* res type hand */
    RST_PTP,                     /* res type pass_thru port */
    RST_LSM,                     /* res type lsm */
    RST_PTPS,                    /* res type ptp slot */
    RST_CAPR,                    /* res type CAP (Reserve) */
    RST_CAPM,                    /* res type CAP (Enter) */
    RST_CAPJ,                    /* res type CAP (Eject) */
    RST_CAPH,                    /* res type CAP (Motion) */
    RST_DRIV,                    /* res type drive */
    RST_DOOR,                    /* res type door */
    RST_CAPC,                    /* res type CAP (Catalog) */
    RST_CAPH                     /* res type CAP (Host alleg) */
};

/*---------------------------------------------------------------
 * Allocate Resource Rejection Structure
 *--------------------------------------------------------------*/
struct alc_rej                              /* Allocation Rejection */
{
    enum alc_allocation_requests rej_byte;  /* rejection byte (ARQ_REJ) */
    enum alc_allocation_requests rej_typ;   /* request type */
    UCHAR rej_lsm;                          /* rejection LSM */
    unsigned int    rej_ecod;               /* rejection error code */
    unsigned short  rej_extn;               /* rejection extension */
};

/*---------------------------------------------------------------
 * Allocate Resource Change Descriptor
 *--------------------------------------------------------------*/
struct alc_rsc                              /* allocation resource change */
{
    enum alc_resource_change_type rsc_chng; /* resource change type */
    enum alc_resource_type rsc_typ;         /* resource type */
    UCHAR rsc_sel;                          /* resource selector */
    UCHAR rsc_lsm;                          /* resource LSM */
    UCHAR rsc_rsrv[ 2 ];                    /* RESERVED */
};

/*---------------------------------------------------------------
 * Path Allocation Structure
 *--------------------------------------------------------------*/
struct alc_pth
{
    int   part_id;                          /* partition id */
    int   blk_len;                          /* block length */
    UCHAR lsm_cnt;                          /* number of LSMs in path */
    UCHAR lsm_ids[ MAXLSM ];                /* IDs of LSMs */
    UCHAR ptp_ids[ MAXLSM - 1 ];            /* IDs of PTPs */
    UCHAR ptp_slot[ MAXLSM - 1 ];           /* slots in pass-thru ports */
    UCHAR ptp_adj[ MAXLSM - 1 ];            /* IDs of PTPs in next LSM */
};

struct alchange
{
    int   change;
    UCHAR main_lsm;
    UCHAR scnd_lsm;
```

```
Aug 18 1995 10:54:48              alc_types.h                              Page 4

UINT16 main_id;
};

/*-----------------------------------------------------------------------
 * to make the trace go to a nice even 32 bit boundary, we need to fill it
 * with the # of bytes defined below
 *----------------------------------------------------------------------*/
define ALC_TRC_FILL 3 struct altrc
{
    UCHAR id1;                              /* id1 */
    UCHAR id2;                              /* id2 */
    struct alc_req *preq;                   /* pointer to request */
    struct alc_req  areq;                   /* request */
    UCHAR filler[ALC_TRC_FILL];             /* even out to 32 byte boundary */
    unsigned int tretmp;                    /* timestamp */
};

enum alc_priority_computation
{
    Alc_Arm_Priority,
    Alc_Hand_Priority,
    Alc_Drive_Priority,
    Alc_Path_Priority,
    Alc_Mech_Priority,
    Alc_Generic_Priority
};

#endif
```

```
Aug 18 1995 10:54:48                    alc_proto.h                      Page 1

/* $Header: /home/twolf/davet/alc/RCS/alc_proto.h,v 1.5 1993/07/08 21:31:53 aarond Ex
p $ */
/*****************************************************************************
*
*                    Property of StorageTek SECRET
*                    Storage Technology Corporation
*                    Do not copy or distribute unpublished work
*
*                            Copyright (1991)
*                    Storage Technology Corporation
*                         All Rights Reserved
*
* ALC prototype include file
*
* This file contains all function prototypes used throughout the allocation task.
*
*****************************************************************************/ ifndef ALC_PROTO_H
define ALC_PROTO_H int al_aarm( UCHAR lsm,                /* LSM ID                           */
             UCHAR t_id );             /* ID of task req nrm               */ int al_acap(UCHAR lsm,                 /* CAP LSM */
            enum alc_allocation_requests rqtype, /* CAP request type */
            UCHAR cid,                 /* CAP ID */
            UCHAR t_id,                /* ID of task making request */
            UCHAR h_id,                /* ID of host with allocation */
            int recov);                /* recovery flag */ int al_adriv(UCHAR lsm,                /* Drive LSM ID                     */
             UCHAR tu_id,              /* tape unit ID                     */
             UCHAR d_id,               /* Drive ID                         */
             UCHAR t_id,               /* ID of task req drive             */
             BOOLEAN sswp_flg,         /* self_swap flag (T/F)             */
             BOOLEAN mnt_flg,          /* drive-is-destination flag        */
             BOOLEAN retry);           /* this is not the first try        */ void al_age ( struct COM_LINK *start );

al_ahand{
    UCHAR lsm,                         /* hand LSM ID                      */
    UCHAR t_id,                        /* ID of task req hand              */
    UCHAR *ahand};                     /* place to put hand ID             */ int al_apmch(UCHAR lsm0,               /* PTP LSM 0                        */
             UCHAR lsm1,               /* PTP LSM 1                        */
             UCHAR t_id,               /* ID of task req PTP mech          */
             UCHAR *mlsm,              /* place to put master LSM ID       */
             UCHAR *mpid);             /* place to put master port ID      */ void al_bctrc( UCHAR ident2,           /* second identifier */
               struct alloc_req *alreq); /* pointer to request/response */

UCHAR al_compute_new_priority( struct allc_req *req,
               enum alc_priority_computation computation_type);

void al_deall(
             UCHAR lsm);               /* ID of LSM to deall */ void al_delst( struct COM_LNK_LIST *list_ptr, /* pointer to linked list */
               struct COM_LINK *prev_ptr,  /* ptr to previous link */
               struct COM_LINK *link_ptr,  /* pointer to link */
               int p_id);              /* partition ID */
```

```
Aug 18 1995 10:54:48                    alc_proto.h                      Page 2 void al_drop(struct allc_req *request, /* ptr to orig request */
             short resrc0,             /* resrource to drop */
             short resrc1,             /* resource to drop */
             short resrc2);            /* resrource to drop */ struct COM_LINK *al_enlst(struct COM_LNK_LIST *list_ptr, /* pointer to linked list */
             int p_id,                 /* partition ID */
             struct allc_req *new_request, /* request to enqueue */
             enum alc_priority_computation compute_priority /* how to co
mpute priority */
             );

void al_fdist( void );

void al_fstds( void );

void al_infor(
             struct allc_rsc *res_chng); /* resource change descrp */ void al_init( void );

int al_lsmon( UCHAR );

int al_lsmopl UCHAR );

int al_nopth(UCHAR src_lsm,            /* source LSM ID                    */
             UCHAR dst_lsm,            /* destination LSM ID               */
             UCHAR *errlsm);           /* LSM with problem                 */ int al_paths(UCHAR src_lsm,            /* source LSM ID                    */
             UCHAR dst_lsm,            /* destination LSM ID               */
             int aged,                 /* use PREALLOC slots               */
             struct allc_pth *ret_path, /* place to put path ptr*/
             UCHAR *errlsm,            /* LSM with problem                 */
             UCHAR task); /* task ID for request */ void al_preall( void );

void al_reallocate_request( struct allc_req *request );

void al_rejct(struct allc_req *request, /* ptr to orig request */
             short rj_lsm,             /* LSM ID */
             int rj_ecode,             /* Rejection error code */
             short rj_ext);            /* Rejection extension */ void al_repth(
             struct alchange *al_chnge); /* ptr to change descriptor */ void al_reqst(
             struct allc_req *request, /* allocation request ptr */
             BOOLEAN original_request); /* original (TRUE) or reallocate (FALSE ) */ void al_resrc( void );
void al_retrn(
             struct alchange *al_chnge); /* ptr to change descriptor */ void al_rjptp(UCHAR plsm,              /* primary lsm */
              UCHAR slsm,              /* secondary lsm */
              int rejc,                /* rejection code */
              int rejx);               /* rejection code extension */ void al_rqpth(
             struct allc_req *request);            /* pointer to alloc request */ void al_rspnd(struct allc_req *request, /* ptr to orig request */
```

```
                              alc_proto.h                            Page 3

UCHAR lsm_id,         /* LSM ID                        */
        int ptr_ext0,         /* ptr to path/exten byte*/
        UCHAR ext1,           /* extension byte 1              */
        UCHAR ext2),          /* extension byte 2              */ int al_tape( UCHAR *pnl_drv,  /* panel/drive ID */
        UCHAR lsm ));         /* LSM of drive */ void al_timo( void )

void al_trace(UCHAR ident1,   /* first identifier */
        UCHAR ident2,         /* second identifier */
        struct alc_req *alreq); /* pointer to request/response */ void al_trans(
        struct alc_req *request, /* Allocation request pointer */
        UCHAR id_hand,        /* ID of hand allocated */
        UCHAR id_pnlsm,       /* ID of master of alloc PTP */
        UCHAR id_prtid)),     /* ID of port allocated */ void al_trent(UCHAR ident1,   /* first identifier */
        UCHAR ident2,         /* second identifier */
        struct alc_req *alreq, /* pointer to request/response */
        struct alrtc *tbuf,   /* trace buffer */
        int *tbindx,          /* index into trace buffer */
        int tbmxi);           /* maximum trace buf entry */ void al_tstmp( struct alc_req *request, /* allocation request */
        int fld_type ));      /* secondary LSM */ short al_utape( short tapu_drv, /* panel/drive ID */
        UCHAR lsm ));         /* LSM of drive */ void al_vary(
        struct alc_req *request); /* pointer to vary request */ endif
```

```
Aug 18 1995 10:54:48                    alc_extern.h                             Page 1

/* $Header: /home/twolf/davet/alc/RCS/alc_extern.h,v 1.2 1993/02/23 17:51:54 aarond E
xp $ */
extern struct altrc al_tbuf[ ]; /* trace buffer           */ extern char    bcstr[ ];        /* delimeter             */
extern struct altrc al_bcbuf[ ]; /* Bad comm trace        */ extern int al_trptr;            /* trace buffer pointer*/
extern int al_bcptr;            /* Bad comm trace ptr */ extern struct COM_LNK_LIST al_wtpth ; /* wait for path queue    */ extern struct COM_LNK_LIST al_wtarm[];/* wait for arm queue     */
extern struct COM_LNK_LIST al_wthnd[];/* wait for hand queue    */
extern struct COM_LNK_LIST al_wtmch[];/* wait for PTP mech que*/ extern struct COM_LNK_LIST al_wtdrv[];/* wait for drive queue   */ extern UCHAR al_dists[MAXLSM][MAXLSM]; /* LSM to LSM distances  */ extern UCHAR al_stdst[MAXLSM][MAXLSM];/* LSM/LSM dists */ extern struct alc_pth *al_ppath; /*  Pointer to prealloc path */ extern UCHAR al_cnect[MAXLSM][MAXLSM]; /* PTP connection table */ extern struct alc_req *al_opndir[]; /* offline pend requests */ extern BOOLEAN al_ptpdl,         /* PTP deadlock flag T/F */
extern UCHAR   al_dlsm;          /* PTP deadlock LSM      */
extern BOOLEAN al_dlpnl,         /* PTP deadlock Panel    */
```

```
Aug 18 1995 10:54:48                       alc_errs.h                              Page 1

/* $Header: /home/twolf/davef/alc/RCS/alc_errs.h,v 1.6 1993/04/13 21:37:32 astrond Exp
 $ */
/*****************************************************************************
 *
 *                    StorageTek SECRET
 *             Property of Storage Technology Corporation
 *             Do not copy or distribute unpublished work
 *
 *                    Copyright (1991)
 *             Storage Technology Corporation
 *                    All Rights Reserved
 *
 * FILE NAME: alc_errs.h
 *
 * FUNCTIONAL DESCRIPTION:
 *
 * This file contains the ERROR enumerations specific to the local
 * functions in this directory. This file is included by a master
 * include which creates the actual 'ERROR' enumeration. Therefore,
 * this file will only list each ERROR enumeration that it wishes
 * to add to the list. In addition, this file needs to conform to
 * a specific format to assist in the post-processing of the ERROR
 * enumeration in the creation of the ERROR text file. The ERROR
 * text file consists of up to 10 lines of 72 characters each and
 * contains a specific description of what the fault is all about.
 * This data will however be defaulted to the associated ERROR
 * enumeration label to begin with.
 *
 * The following comment box must exist preceeding each enumeration
 * in order for the post-processing tool to pick up ERROR associated
 * text:
 *
 * /*-< start_text >--------------------------------------------------
 *  * ( user provided text here -- up to 10 lines of 72 characters each )
 *  *-< end_text >----------------------------------------------------
 *   ERR_ ...
 *
 * NOTE: All ERROR enumeration must begin with ERR_ followed by the
 * unique prefix of the associated software (e.g., ERR_LAN_BAD_MSG for
 * for /lan directory software).
 *
 * NOTE: Do not specifically set a given enumeration to a value. This
 * is handled by the master include file and will hose up the post-
 * processing function if you do so.
 *
 * NOTE: End each enumeration with a comma. The master include file
 * will provide a final enumeration without a comma.
 *
 * NOTE: The first line of text is dedicated to the definition of the
 * enumeration. This definition can consist of multiple sentences as
 * long as the 72 character limitation is met. The following text lines
 * should serve to further define the enumeration.
 *
 *****************************************************************************/

/*-< start_info >----------------------------------------------------*/
* CONTINUABLE: TRUE
*--< end_info >-----------------------------------------------------*/
/*-< start_fru >-----------------------------------------------------*/
* FRU: Non-Fatal Logical Err    LOC: S/W (Event Log Requested)   CONF_%: 100
*--< end_fru >------------------------------------------------------*/
/*-< start_summary >-------------------------------------------------*/
```

```
Aug 18 1995 10:54:48                       alc_errs.h                              Page 2

* Call with Bad LSM ID
*--< end_summary >--------------------------------------------------*/
/*-< start_text >----------------------------------------------------
 * A call was made in allocation with a non existant LSM.
 * This indicates a probably logic error.
 *--< end_text >-----------------------------------------------------*/
ERR_CHNLSM, /*-< start_info >----------------------------------------------------*/
* CONTINUABLE: TRUE
*--< end_info >-----------------------------------------------------*/
/*-< start_fru >-----------------------------------------------------*/
* FRU: Non-Fatal Logical Err    LOC: S/W (Event LOG Requested)   CONF_%: 100
*--< end_fru >------------------------------------------------------*/
/*-< start_summary >-------------------------------------------------*/
* Call with Bad Resource ID
*--< end_summary >--------------------------------------------------*/
/*-< start_text >----------------------------------------------------
 * A call was made in allocation with bad resource change type.
 * This indicates a probably logic error.
 *--< end_text >-----------------------------------------------------*/
ERR_BDRCHG, /*-< start_info >----------------------------------------------------*/
* CONTINUABLE: TRUE
*--< end_info >-----------------------------------------------------*/
/*-< start_fru >-----------------------------------------------------*/
* FRU: Non-Fatal Logical Err    LOC: S/W (Event LOG Requested)   CONF_%: 100
*--< end_fru >------------------------------------------------------*/
/*-< start_summary >-------------------------------------------------*/
* no path available
*--< end_summary >--------------------------------------------------*/
/*-< start_text >----------------------------------------------------
 * No path could be find between two LSMs in allocation.
 *--< end_text >-----------------------------------------------------*/
ERR_ALPATH, /*-< start_info >----------------------------------------------------*/
* CONTINUABLE: FALSE
*--< end_info >-----------------------------------------------------*/
/*-< start_fru >-----------------------------------------------------*/
* FRU: Logical Error           LOC: S/W (LMU Dump Requested)    CONF_%: 100
*--< end_fru >------------------------------------------------------*/
/*-< start_summary >-------------------------------------------------*/
* Illegal status on msg pend
```

```
/* --< end_summary >-------------------------------------------------*/
/*--< start_text >--------------------------------------------------
 * Bad status (not timeout or ok) was received on a message pend.
 * The status is logged in the data field. This is a fatal error.
 *--< end_text >----------------------------------------------------*/
ERR_BAD_RECEIVE,
``` alc_errs.h Page 3
Aug 18 1995 10:54:48

```
/* $Header: /home/twolf/dsvet/alc/RCS/alc_defs.h,v 1.6 1993/06/07 18:03:32 anrond Exp
 $ */
/*****************************************************************
 *
 *              StorageTek SECRET
 *
 *      Property of Storage Technology Corporation
 *      Do not copy or distribute unpublished work
 *
 *              Copyright (1991)
 *          Storage Technology Corporation
 *              All Rights Reserved
 *
 *  alc define include file
 *
 *  This file contains all defines used throughout the allocation task
 *
 *****************************************************************/ ifndef ALC_DEFS_H
define ALC_DEFS_H define AGED        TRUE
define NOTAGED     FALSE define NOT_ALLC 0x7F define MAX_HHDU    32      /* max hand use for */ define TS_XPRT 0x01        /* time stamp for transport queuing */
define TS_PATH 0x02        /* time stamp for path queuing */ define ADD_PATH 0x0001
define SUB_PATH 0x0002
#define ADD_DRIV 0x0004
#define SUB_DRIV 0x0008
#define ADD_ARM  0x0010
#define SUB_ARM  0x0020
#define ADD_PTP  0x0040
#define SUB_PTP  0x0080
#define ADD_HAND 0x0100
#define SUB_HAND 0x0200
#define ADD_SLOT 0x0400
define SUB_LSM  0x0800 define ALTRMAX 128         /* number trace entries  */
define BCTRMAX 16          /* number bad com trace entries */

/*---------------------------------------------------------------
 * The following are indexes into the data field of the link lists used
 * in the allocation task. Yes, there's some overlap; the contents
 * depend on the fields depend on the the context.
 *---------------------------------------------------------------*/ define REQUEST   0         /* pointer to request */
define TIME      1         /* timeout for drive requests */
#define AHAND_ID  1         /* allocated hand ID index */
define APTP_ID   2         /* allocated port ID index */ define PRM_MSTR 0x80       /* Prime LSM is master */
define SCM_MSTR 0x40       /* Secondary LSM master */
define APTP_MSK ~( PRM_MSTR | SCM_MSTR ) /* Mask to get PTP ID */ define NO_CNECT 0x7F       /* LSMs not connected */
define NOT_MSTR 0x64       /* Not the master of PTP */

/*
 * The following defines are for priority.  The special values,
 * MAX_PRIORITY and MIN_PRIORITY will never be aged.  The value
 * MAX_NORMAL_PRIORITY is the maximum normal priority.
 */ define MAX_PRIORITY 99                     /* special maximum priority */
define MIN_PRIORITY 0                      /* special minimum priority */
#define MAX_NORMAL_PRIORITY \                /* maximum normal priority*/
    (MAX_PRIORITY-1)

#endif
```

```
/* $Header: /home/twolf/davet/alc/RCS/alc.h,v 1.2 1993/02/23 17:51:46 aarond Exp $ */
#include "alc_defs.h"
#include "alc_types.h"
#include "alc_proto.h"
```

Page 1

```
static char rcsid[]="$Header: /home/twolf/davet/alc/NCS/al_vary.c,v 1.3 1993/04/26 16
:24:26 aaron$ Exp $";                                                                 */
/*                                                                                    */
/* FUNCTION NAME:   static al_vary()                                                  */
/*                                                                                    */
/* FUNCTION TITLE:  Handle a Vary LSM Request                                         */
/*                                                                                    */
/* FUNCTIONAL DESCRIPTION:                                                            */
/*   This function receives a vary LSM request as input. It                           */
/*   places the specified LSM in the requested state and                              */
/*   notifies the requesting task, or it issues a reject to the                       */
/*   task. The request may be to vary the LSM online, offline,                        */
/*   offline pend, or to maintenance mode.                                            */
/*                                                                                    */
/* OPERATIONAL DESCRIPTION:                                                           */
/*   This function may receive a request to vary to one of four                       */
/*   states. The LSM specified may be in any of those states or                       */
/*   not ready. If the LSM is not ready any vary request is                           */
/*   rejected. If the LSM is already in the state requested a                         */
/*   vary grant is issued to the requesting task. The table                           */
/*   below indicates what transitions will be granted or                              */
/*   rejected:                                                                        */
/*                                                                                    */
/*           request                                                                  */
/*   current  |                    Offline                                            */
/*   state    | Online  Offline Pend  Func :  Diag     Maint                          */
/*   ---------|---------------------------------------------                          */
/*   Online   | grant   grant    | grant :reject |  reject                            */
/*   Offline  |                                                                       */
/*   Pend     | grant   reject   | grant :reject |  reject                            */
/*   Offline  | grant   grant    | grant : grant |  grant                             */
/*   Maint    | reject  reject   |reject : grant |  grant                             */
/*                                                                                    */
/*   NOTE: Request for online and offline-pend are                                    */
/*         not accepted from maintenance. Request for                                 */
/*         maintenance not accepted from functional                                   */
/*         software.                                                                  */
/*                                                                                    */
/*   When a request to vary an LSM online is granted, the LSM                         */
/*   'offline' and 'offline pending' bits are cleared and the                         */
/*   LSM 'online' bit is set. Allocation requests from                                */
/*   functional sources can then be accepted.                                         */
/*                                                                                    */
/*   When a request to vary an LSM to 'offline pending' is                            */
/*   granted, if the LSM 'offline' or 'offline pending' bits                          */
/*   are already set, no action is taken. If the 'online' bit                         */
/*   is on, then the LSM 'offline pending' is set. When this                          */
/*   bit is on, no new path allocations can be made which                             */
/*   involve this LSM. Transport allocations for this LSM                             */
/*   can be made. Once all allocation for this LSM has been                           */
/*   used and dropped it is placed offline (see al_retrn()).                          */
/*                                                                                    */
/*   When an offline vary request is granted for an LSM, the                          */
/*   'online' and 'offline pending' bits for that LSM are                             */
/*   cleared and 'offline' status is set. Neither functional                          */
/*   nor maintenance allocation requests will be granted.                             */
/*                                                                                    */
/*   When a request to vary an LSM to maintenance is granted,                         */
/*   the 'offline' and 'offline pending' bits are cleared and                         */
```

Page 2

```
/*   the LSM 'maintenance' bit is set. Allocation requests from                       */
/*   maintenance sources can then be accepted.                                        */
/*                                                                                    */
/*   If the transition is to 'online' or 'offline' a resource                         */
/*   change descriptor is passed to al_infor() so that waiting                        */
/*   requests may be properly handled.                                                */
/*                                                                                    */
/* PREREQUISITES:                                                                     */
/*   - the al_config table is initialized                                             */
/*                                                                                    */
/* SPECIAL CONSIDERATIONS:                                                            */
/*   (none)                                                                           */
/*                                                                                    */
/*                TYPE     NAME          RANGE/DESCRIPTION                            */
/*                ----     ----          -----------------                            */
/* PARMS IN: short *request              pointer to vary request                      */
/*                                                                                    */
/* RET VALS: void                                                                     */
/*                                                                                    */
/* EXT VARS:       gl_dcnfg              ATHS configuration table        (RW)         */
/*                 mb_dtask[]            dynamic task mailbox            (SC)         */
/*                                                                                    */
/* H/W REGS:       (none)                                                             */
/*                                                                                    */
/* FUNCTNS:        mt_post()             Sys Call - post to mailbox                   */
/*                 al_infor()            process resource state chang                 */
/*                                                                                    */
/* HISTORY:                                                                           */
/* 07/29/85   fgm  Prologue created                                                   */
/* --/--/--   fgm  Prologue reviewed                                                  */
/* 01/15/86   fgm  Code completed                                                     */
/*                                                                                    */
/********************* END OF PROLOGUE *******************/ include <com.h>
include "alc.h"
#include <cry_user.h>
#include <com_extern.h>
include <alc_extern.h> void al_vary(
             struct alloc_req *request)   /* pointer to vary request   */
{
    unsigned int rcode;                   /* rejection code            */
    UCHAR vlsm;                           /* LSM to vary               */
    int pstat;                            /* previous state of LSM     */
    struct def_lsm *rlsm;                 /* pointer to LSM status     */
    struct alchange vy_chng;              /* change descriptor for vary */
    BOOLEAN maintenance = request ->      /* maintenance:              */
    BOOLEAN wait = FALSE;                 /* if resources alloc'd on vary off, wait */

/* Initialize LSM, status pointer and reject code */
    rcode = RET_OK;
    vlsm = ( request -> prim_lsm ) & LSM_MASK;
    vy_chng.main_lsm = vlsm;
    rlsm = &( gl_dcnfg[ vlsm ].lsm );
    switch ( (rlsm -> lsm_stat) & (DCL_ONLN|DCL_OFFL|DCL_OFFP|DCL_MNT) )
    {
        /* Set the previous state indicator to show the current state */
```

```
                                                    al_vary.c                                    Page 3 case DCL_ONLN:
        pstat = PRV_ONL;
        break;
    case ( DCL_ONLN | DCL_OFFP ):
        pstat = PRV_OFFP;
        break;
    case DCL_MNT:
        pstat = PRV_MNT;
        break;
    case DCL_OFFL:
    default:
        pstat = PRV_OFF;
        break;
    }

/*------------------------------------------------------------------*
 *  Split out according to type of Vary requested                   *
 *------------------------------------------------------------------*/
    switch ( (unsigned short) request -> req_typ )
    {
    case ARQ_VONL:
        /*----------------------------------------------------------*
         * Vary Online if the LSM is ready (already know not in     *
         * maintenance)                                             *
         *----------------------------------------------------------*/
        if ( !( rlsm -> lsm_stat & DCL_RDY ) )
        {
            rcode = R_ALNRDY;
            break;
        }
        /*----------------------------------------------------------*
         * If an Offline was pending reject that request as         *
         * overridden                                               *
         *----------------------------------------------------------*/
        if ( pstat == PRV_OFFP )
        {
            al_reject( al_opndr[vlsm], vlsm, R_ALCOVR, 0 );
        }
        /*----------------------------------------------------------*
         * If not already online recalculate distances and          *
         * reconsider path requests                                 *
         *----------------------------------------------------------*/
        if ( pstat != PRV_ONL )
        {
            rlsm -> lsm_stat |= DCL_ONLN;
            rlsm -> lsm_stat &= ~( DCL_OFFL | DCL_OFFP );
            rlsm -> cat_cnt = 0;
            vy_chng.change = ADD_PATH;
            al_fdist();
            al_repth( &vy_chng );
        }
        break;

case ARQ_VOFF:
        /*----------------------------------------------------------*
         * Vary Offline Pending                                     *
         *----------------------------------------------------------*/
        if ( pstat == PRV_OFFP )
        {
            /*
```

```
                                                    al_vary.c                                    Page 4

* if already pending, reject new req                  */
            rcode = R_ALOFFP;
        }
        if ( pstat == PRV_ONL )
        {
            /*------------------------------------------------------*
             * if online, set pending bit; recalculate distances    *
             *------------------------------------------------------*/
            rlsm -> lsm_stat |= DCL_OFFP;
            al_fdist();
            if ( qu_anyal( vlsm, NO ) == YES )
            {
                /*--------------------------------------------------*
                 * if any part of LSM is allocated, set to wait on  *
                 * full deallocation before going offline           *
                 *--------------------------------------------------*/
                al_opndr[vlsm] = request;
                wait = TRUE;
                vy_chng.change = SUB_PATH;
                al_repth( &vy_chng );
            }
            else
            {
                /*--------------------------------------------------*
                 * otherwise just take it offline and grant request *
                 *--------------------------------------------------*/
                rlsm -> lsm_stat |= DCL_OFFL;
                rlsm -> lsm_stat &= ~(DCL_OFFP|DCL_ONLN);
            }
        }
        break;

case ARQ_FOFF:
        /*----------------------------------------------------------*
         * Vary Offline Force - from functional code                *
         *----------------------------------------------------------*/
        rlsm -> lsm_stat |= DCL_OFFL;
        rlsm -> cat_cnt = 0;
        if ( !maintenance )
        {
            rlsm -> lsm_stat &= ~( DCL_ONLN | DCL_OFFP | DCL_MNT );
            vy_chng.change = ( SUB_PATH | SUB_LSM );
        }
        if ( pstat == PRV_OFFP )
        {
            /*------------------------------------------------------*
             * Reject an outstanding offline Pend request           *
             *------------------------------------------------------*/
            al_reject( al_opndr[vlsm], vlsm, R_ALCOVR, 0 );
        }
        else
        {
            /*------------------------------------------------------*
             * If not pending offline cancel the effected trans reqs*
             *------------------------------------------------------*/
            if ( pstat != PRV_OFF )
            {
                al_retrn( &vy_chng );
            }
        }
        if ( pstat != PRV_OFF )
        {
```

```
Aug 18 1995 10:54:48                    al_vary.c                           Page 5

/*----------------------------------------------------------------
                * If it was not yet offline then cancel involved reqs
                * and deallocate all resources
                *---------------------------------------------------------------*/
               al_fdist();
               al_repth( &vy_chng );
            }

/*--------------------------------------------------------------------
             * Force deallocation of all elements
             *-------------------------------------------------------------------*/
            al_deall( vlsm );
         }
         else
         {
            rlsm -> lsm_stat &= -DCL_MNT;    /* maintenance request */
         }
         break;

case ARQ_VMNT:
         if (maintenance)
         {
            /*-----------------------------------------------------------------
             * Vary to Maintenance if LSM is ready and Offline
             *----------------------------------------------------------------*/
            rlsm -> lsm_stat |= DCL_MNT;
            rlsm -> lsm_stat &= -( DCL_OFFL | DCL_OFFP );
            break;
         }
         /* else fall through */
      default:
         switch( pstat )
         {
         case PRV_CNL:
            rcode = R_ALONLN;
            break;
         case PRV_OFFP:
            rcode = R_ALOFFP;
            break;
         case PRV_OFF:
            rcode = R_ALOFF;
            break;
         case PRV_MNT:
            rcode = R_ALMNT;
            break;
         }
   }

/*--------------------------------------------------------------------------
    * Send a response, rejection or take no further action
    *-------------------------------------------------------------------------*/
   if ( !wait )
   {
      if ( rcode == RET_OK )
      {
         al_rspnd( request, vlsm, pstat, 0, 0 );
      }
      else
      {
         al_rejct( request, vlsm, rcode, 0 );
      }
   } return;
}
```

```
Aug 18 1995 10:54:48                    al_utape.c                                            Page 1
static char rcsid[]="$Header: /home/twolf/davet/alc/MCS/al_utape.c,v 1.2 1993/02/23 1
7:51:06 aarond Exp $";
                    static al_utape()
/* FUNCTION NAME:
/*
/* FUNCTION TITLE:   Convert Tape Unit/Drive to Panel/Drive
/*
/* FUNCTIONAL DESCRIPTION:
/*   This function accepts a byte of the form zz00 ttyy, where
/*   tt is the tapeunit and dd is the drive. It returns the
/*   value 00pp ppdd where pppp is the panel ID of the
/*   specified tapeunit.
/*
/* OPERATIONAL DESCRIPTION:
/*   This function looks at gl_dcnfg       to transform the
/*   tapeunit into its associated panel.
/*
/* PREREQUISITES:
/*   (none)
/*
/* SPECIAL CONSIDERATIONS:
/*   (none)
/*
/*          TYPE    NAME          RANGE/DESCRIPTION
/*          ----    ----          -----------------
/* PARMS IN: short  tapu_drv      tapeunit/drive
/*           int    lsm           lsm of drive
/*
/* RET VALS: short  temp          panel/drive ID
/*
/* EXT VARS:         gl_dcnfg     ATHS configuration
/*
/* H/W REGS:         (none)
/*
/* FUNCTNS:          (none)
/*
/* HISTORY:
/*   03/22/86   fgm   Prologue created
/*   --/--/--   fgm   Prologue reviewed
/*   03/22/86   fgm   Code completed
/*
/***************** END OF PROLOGUE *************************/ include <com.h>
include "alc.h"
#include <com_extern.h>
include <alc_extern.h> short al_utape( short tapu_drv,  /* panel/drive ID  */
                UCHAR lsm )      /* LSM of drive    */
{
    short temp;                  /* temporary       */

/*--------------------------------------------------------
     * Get the panel ID; initialize the tapeunit/drive ID with drive
     *-------------------------------------------------------*/
    temp = gl_dcnfg[ lsm ].tapu[ (tapu_drv & PLC_TAPU) >> 2 ].tapu_pnl;
    temp = (tapu_drv & PLC_DRID) | ( temp << 2 );
    return( temp );
}
```

```
static char resid[]="$Header: /home/twolf/davet/alc/RCS/al_tstmp.c,v 1.2 1993/02/23 1
7:51:03 astrond Exp $";
/* FUNCTION NAME:    static al_tstmp()
**
** FUNCTION TITLE:   Time Stamp an Allocation Request
**
** FUNCTIONAL DESCRIPTION:
**    This function accepts a request and a time stamp type
**    specifier. If this is the start of a recording time it
**    begins timing the duration of the stay on a queue. If this
**    is the end of a recording time the accumulated duration is
**    stored into the specified field. The time stamp type is
**    one of: TS_XPRT (transport) or TS_PATH (path).
**
** OPERATIONAL DESCRIPTION:
**    This function looks at the specified time stamp field
**    (path or transport). It subtracts the current recorded
**    time from the current clock (dropping the least
**    significant bit and then the most significant byte) and
**    stores the value into the specified field. At the
**    beginning of a time period this value is the current clock
**    backed up by the time already accumulated in the timestamp
**    field. At the end of the time period this value is the new
**    accumulated time after the current period.
**
** PREREQUISITES:
**    (none)
**
** SPECIAL CONSIDERATIONS:
**    (none)
**
**              TYPE          NAME             RANGE/DESCRIPTION
**              ----          ----             -----------------
** PARMS IN:    struct *request                allocation request
**              int     fid_type               field type: TS_XPRT, TS_PATH
**
** RET VALS:    void    (none)
**
** EXT_VARS:            (none)
**
** H/W REGS:            (none)
**
** FUNCTNS:             mt_gtime()             get current time (clock tick)
**
** HISTORY:
** 03/23/90     fgm     Prologue created
** --/--/--     fgm     Prologue reviewed
** 03/23/90     fgm     Code completed
**
/************************* END OF PROLOGUE **************************/ include <com.h>
include "alc.h"
#include <com_extern.h>
#include "alc_extern.h"

void al_tstmp( struct alloc_req *request, /* allocation request */
               int fid_type )             /* secondary LSM */
{
    register unsigned *fptr;   /* field pointer            */

/*
    ** select the proper time stamp field
    */
    fptr = ( fid_type == TS_XPRT ) ? &( request -> xptq_tim ) :
           &( request -> pthq_tim );

/*
    ** Back up the clock by any amount already recorded
    */
    *fptr = ( sys_rtc_get_ticks() ) - *fptr;
    return;
}
```

```
Aug 18 1995 10:54:48                    al_trent.c                          Page 1 static char rcsid[]="$Header: /home/twolf/davet/alc/RCS/al_trent.c,v 1.7 1993/07/08 2
1:31:43 anrond Exp $";
/*****************************  START OF PROLOGUE  ***************************

StorageTek SECRET
                    Property of Storage Technology Corporation
                    Do not copy or distribute unpublished work Copyright (1991)
                         Storage Technology Corporation
                             All Rights Reserved FUNCTION NAME:     (local) al_trent()

FUNCTIONAL DESCRIPTION:
      This function adds one entry to the specified trace
      buffer.

RETURN VALUES:
      none
==============================================================================

OPERATIONAL DESCRIPTION:
      This function accepts two ID characters, an allocation
      package, a trace buffer specifier and index. It places the
      trace entry in the trace buffer:

0   1   2   3        b  c  d   e        f
      +---+---+-------...------+--------+------------+
      |ID1|ID2| Contents of Communic. |address |timestamp |
      |   |   |                       |of      |          |
      |   |   |                       |package |          |
      +---+---+-------...------+--------+------------+

***************************  END OF PROLOGUE  ***************************/ include "com.h"
include "alc.h"
#include "com_extern.h"
include "alc_extern.h"
include <memory.h>              /* for memset prototype */ void al_trent(UCHAR ident1,      /* first identifier           */
              UCHAR ident2,      /* second identifier          */
              struct alc_req *alreq,  /* pointer to request/response*/
              struct altrc *tbuf,     /* trace buffer */
              int *tbindx,            /* index into trace buffer */
              int tbmax)              /* maximum trace buffer entry */
{
    register struct altrc *tr_entry; /* trace entry pointer */

/*
     * Put in the identifiers
     */
    tr_entry = &tbuf[ *tbindx ];
    tr_entry -> id1 = ident1;
    tr_entry -> id2 = ident2;

/*
     * Put in the entire request/response/rejection/information buffer
     */
    tr_entry -> areq = *alreq;
```

```
Aug 18 1995 10:54:48                    al_trent.c                          Page 2 tr_entry -> preq = alreq;
    /*
     * zero out the filler
     */
    memset( tr_entry->filler, 0, ALC_TRC_FILL );

/*
     * get clock ticks
     */
    tr_entry -> trstmp = sys_rtc_get_ticks();

/*
     * Bump the trace buffer pointer
     */
    if ( (++(*tbindx)) == tbmax)
    {
        *tbindx = 0;
    };
    tr_entry = &tbuf[ *tbindx ];
    tr_entry -> id1 =
    tr_entry -> id2 = '*';

return;
}
```

```
Aug 18 1995 10:54:48                        al_trans.c                                    Page 1 static char rcsid[]="$Header: /home/twolf/davet/alc/RCS/al_trans.c,v 1.2 1993/02/23 1
7:50:56 second Exp $";
/* FUNCTION NAME:    static al_trans()                                                  */
/*                                                                                      */
/* FUNCTION TITLE:   Transport Allocation Request Handler                               */
/*                                                                                      */
/* FUNCTIONAL DESCRIPTION:                                                              */
/*    This function accepts new transport resource allocation                           */
/*    requests. They are granted, rejected or held for future                           */
/*    allocation.                                                                       */
/*                                                                                      */
/* OPERATIONAL DESCRIPTION:                                                             */
/*    This function receives a pointer to a message requesting a                        */
/*    transport resource allocation. The  gl_dcnfg                                      */
/*    configuration data structure is read to see if the                                */
/*    requested resources are currently available. Requests for                         */
/*    multiple resources are handled as if they were several                            */
/*    individual requests. Allocation must be granted for each                          */
/*    resource, from lowest to highest level of priority.                               */
/*                                                                                      */
/*    Transport allocation requests can only be granted to                              */
/*    functional requests if the LSM holding the resource is                            */
/*    'online'. Maintenance transport requests can only be                              */
/*    granted if the involved LSM is in 'maintenance' mode.                             */
/*                                                                                      */
/*    If the resources requested are operational and not already                        */
/*    allocated, those resources are marked allocated to the                            */
/*    requesting task in gl_dcnfg. The allocation grant is                              */
/*    posted to the appropriate task mailbox.                                           */
/*                                                                                      */
/*    If the resources are not operational, a resource rejection                        */
/*    is posted to the task mailbox.                                                    */
/*    If the resources requested are operational but are not                            */
/*    currently available due to prior allocations, the request                         */
/*    is placed in the appropriate wait queue for the lowest                            */
/*    level resource. Requests for hands reside in the al_wthnd                         */
/*    queue. Requests for port mechanisms go into al_wtmch. Arm                         */
/*    requests wait in al_wtarm until they are satisfied.                               */
/*                                                                                      */
/*    The three wait queues all have the same structure, that of                        */
/*    a fifo linked list. Each has a begin-list and an end-list                         */
/*    pointer. The queues are pictured in the file descriptor.                          */
/*                                                                                      */
/* PREREQUISITES:                                                                       */
/*    - the queues al_wthnd, al_wtarm and al_wtmch must be                              */
/*      initialized                                                                     */
/*                                                                                      */
/* SPECIAL CONSIDERATIONS:                                                              */
/*    (none)                                                                            */
/*                                                                                      */
/*           TYPE          NAME          RANGE/DESCRIPTION                              */
/*           ----          ----          -----------------                              */
/* PARMS IN: struct        *request      pointer to trans alloc req                     */
/*           short         id_hand       ID of hand allocated                           */
/*           short         id_pmlsm      ID of master of PTP                            */
/*           short         id_prtid      ID of port allocated                           */
/*                                                                                      */
/* RET VALS: int           RET_OK        normal return - no error                       */
/*                         E_MEM         no available memory                            */
/*                                                                                      */
/* EXT VARS:               al_wthnd      wait for hand alloc queue     (RW)             */
/*                         al_wtarm      wait for arm alloc queue      (RW)             */
/*                         al_wtmch      wait for port mech alloc q    (RW)             */
/*                         gl_dcnfg      ATHS configuration table      (RW)             */
```

```
Aug 18 1995 10:54:48                        al_trans.c                                    Page 2

/*                                                                                      */
/* H/W REGS:               mb_dtask[]    dynamic task mailbox          (SC)             */
/*                                                                                      */
/*                         (none)                                                       */
/*                                                                                      */
/* FUNCTNS:                mt_post()     Sys call - post to mailbox                     */
/*                         al_enlst()    put new link on list                           */
/*                         al_aarm()     allocate an arm                                */
/*                         al_ahand()    allocate a hand                                */
/*                         al_opmch()    allocate a port mechanism                      */
/*                                                                                      */
/* HISTORY:                                                                             */
/*   07/12/85    fgm    Prologue created                                                */
/*   07/23/85    fgm    Prologue reviewed                                               */
/*   01/15/96    fgm    Code completed                                                  */
/****************** END OF PROLOGUE ***********************/ include <ccm.h>
include "alc.h"
#include <com_extern.h>
include <alc_extern.h> void al_trans()
{
    struct alc_req *request; /* Allocation request pointer */
    UCHAR id_hand,           /* ID of hand allocated       */
    UCHAR id_pmlsm,          /* ID of master of alloc PTP  */
    UCHAR id_prtid;          /* ID of port allocated       */

UCHAR lsm =              /* LSM of interest            */
        ( request -> prim_lsm ) & LSM_MASK;

int rcode =              /* Return code storage        */
        gl_dcnfg[ lsm ].lsm.lsm_stat;
    enum alc_allocation_requests rtype = /* Type of request */
        request -> req_typ;

UCHAR t_id =             /* ID of requesting task      */
        request -> req_task;

struct COM_LINK *iptr;   /* pointer to link in wait list */
    int temp;                /* temporary value              */ if ( request -> maintenance )
    {
        /*-----------------------------------------------------*/
        * This is a Maintenance mode request
        *-----------------------------------------------------*/
        if ( ( ( rtype == ARQ_ARHD ) || ( rtype == ARQ_AHPH ) ) )
        {
            /*
             * Allocate a hand if necessary
             */
            gl_hused[ lsm ] = gl_mnthd;
            gl_lhuct[ lsm ] = MAX_HNDU;
        }
        if ( ( ( rtype == ARQ_ARPH ) || ( rtype == ARQ_AHPH ) ) &&
             ( id_pmlsm == NOT_ALLC ) )
        {
            /*-----------------------------------------------*/
            * Allocate a pass-thru port mechanism
            *-----------------------------------------------*/
            temp = request -> qualif_0;
            if ( al_cnect[ lsm ][ temp ] == NO_CNECT )
            (
```

```
/*----------------------------------------------------------------
 * if there is no pass thru-port then reject
 *----------------------------------------------------------------*/
al_rejct( request, lsm, R_ALNFTP, 0 );
return;
}
if ( al_cnect[ lsm ][ temp ] == NOT_MSTR )
{
    /*------------------------------------------------------------
     * Set the master LSM and Pass-thru port
     *------------------------------------------------------------*/
    id_pmlsm = temp;
    id_prtid = al_cnect[ temp ][ lsm ];
}
else
{
    id_pmlsm = lsm;
    id_prtid = al_cnect[ lsm ][ temp ];
}

/*----------------------------------------------------------------
 * Go ahead and give permission
 *----------------------------------------------------------------*/
al_rspnd( request, lsm, gl_mothd, id_pmlsm, id_prtid );
return;

/*----------------------------------------------------------------
 * Make sure the LSM is still online and ready
 *----------------------------------------------------------------*/
if ( (rcode & ( DCL_RDY | DCL_ONLN )) != (DCL_RDY | DCL_ONLN))
{
    al_drop( request, id_hand, id_pmlsm, id_prtid );
    al_rejct( request, lsm, (rcode & DCL_RDY) ? R_ALOFF : R_ALNRDY,
              NULL );
    return;
}

/*----------------------------------------------------------------
 * If this request wants a hand, try to get it
 *----------------------------------------------------------------*/
if ( ( ( rtype == ARQ_ARHD ) || ( rtype == ARQ_AHFM ) ) && ( id_hand == NOT_ALLC )
{
    rcode = al_ahand( lsm, t_id, &id_hand );

switch ( rcode )
    {
    case RET_OK:
        /*--------------------------------------------------------
         * Got the hand - go on for other resources
         *--------------------------------------------------------*/
        break;

case FAIL:
        /*--------------------------------------------------------
         * No hand now - put request in wait queue
         *--------------------------------------------------------*/
        lptr = al_enlst( &( al_wthnd[ lsm ] ), PRT_WD4, request,
                        Alc_Hand_Priority );
        ( lptr -> lnk_data[ AHAND_ID ] ) = NOT_ALLC;
        ( lptr -> lnk_data[ APTP_ID ] ) = NOT_ALLC;
        al_tstmp( request, TS_XPRT );
        return;

default:
```

```
/*----------------------------------------------------------------
 * No hand working - reject the request
 *----------------------------------------------------------------*/
al_rejct( request, lsm, rcode, NULL );
return;
}

/*----------------------------------------------------------------
 * If the request needs a port mechanism try to get it
 *----------------------------------------------------------------*/
if ( ( ( rtype == ARQ_ARPM ) || ( rtype == ARQ_AHPM ) ) &&
     ( id_pmlsm == NOT_ALLC ) )
{
    rcode = al_apmch( lsm, request -> qualif_0, t_id, &id_pmlsm, &id_prtid );

switch ( rcode )
    {
    case RET_OK:
        /*--------------------------------------------------------
         * Got the port mechanism - try for the arm
         *--------------------------------------------------------*/
        break;

case FAIL:
        /*--------------------------------------------------------
         * Port mechanism in use - put request on the wait queue
         * of the master lsm
         *--------------------------------------------------------*/
        lptr = al_enlst( &( al_wtmch[ id_pmlsm ] ), PRT_WD4, request,
                        Alc_Mech_Priority );
        lptr -> lnk_data[ AHAND_ID ] = id_hand;
        lptr -> lnk_data[ APTP_ID ] = NOT_ALLC;
        al_tstmp( request, TS_PATH );
        return;

default:
        /*--------------------------------------------------------
         * Port mechanism not available - reject the request
         *--------------------------------------------------------*/
        al_drop( request, id_hand, NOT_ALLC, NOT_ALLC );
        al_rejct( request, id_pmlsm, rcode, NULL );
        return;
    }
}

/*----------------------------------------------------------------
 * Need an arm - try to get it
 *----------------------------------------------------------------*/
switch ( rcode = al_aarm( lsm, t_id ) )
{
case RET_OK:
    /*------------------------------------------------------------
     * Got the arm - go give response to requestor
     *------------------------------------------------------------*/
    break;

case FAIL:
    /*------------------------------------------------------------
     * Arm is in use - put request in wait queue
     *------------------------------------------------------------*/
    lptr = al_enlst( &( al_wtarm[ lsm ] ), PRT_WD4, request,
                    Alc_Arm_Priority );
    lptr -> lnk_data[ AHAND_ID ] = id_hand;
    if ( id_prtid != NOT_ALLC )
```

```
Aug 18 1995 10:54:48                  al_trans.c                              Page 5 lptr -> lnk_data[ AFTP_ID ] =
                ( id_prtid ) (( id_pmlsm == lsm ) ? PRM_MSTR : SCD_MSTR ));
        else
            (
            lptr -> lnk_data[ AFTP_ID ] = NOT_ALLC;
            )
        al_tstmp( request, TS_XPRT );
        return;

default:
        /*-----------------------------------------------------------------
         * Arm not working - reject the request
         *----------------------------------------------------------------*/
        al_drop( request, id_hand, id_pmlsm, id_prtid );
        al_reject( request, lsm, rcode, NULL );
        return;
    )

/*--------------------------------------------------------------------
     * Grant allocation of all requested items
     *-------------------------------------------------------------------*/
    al_rspnd( request, lsm, id_hand, id_pmlsm, id_prtid );

return;
}
```

```
static char rcsid[]="$Header: /home/twolf/davet/alc/RCS/al_trace.c,v 1.4 1993/07/08 2
1:31:19 msrond Exp $*/
/*************************** START OF PROLOGUE *****************************

StorageTek SECRET
                  Property of Storage Technology Corporation
                  Do not copy or distribute unpublished work Copyright (1991)
                       Storage Technology Corporation
                            All Rights Reserved

* FUNCTION NAME:   (local) al_trace()

* FUNCTIONAL DESCRIPTION:

This function adds an allocation entry to the trace
      buffer.

* OPERATIONAL DESCRIPTION:
      This function accepts two ID characters and a pointer to
      an allocation request (or response or rejection). The ID
      characters and the contents of the request are copied to
      the current buffer entry. The buffer pointer is
      incremented by one (in a circular fashion). The buffers
      contents are:

0   1    2    3    4    5    6 - 24
      +---+---+----------------+--------------+
      |   |   |                |   package    |
      |ID1|ID2| package address|   contents   |
      +---+---+----------------+--------------+

25  26   27   28   29   30   31
      +--------------------+--------------+
      |                    |              |
      |      filler        |  timestamp   |
      +--------------------+--------------+

ID1  ID2
      ---  ---
       R    Q    Request
       R    R    Reallocation
       R    S    Response
       R    J    Rejection
       I    F    Information

*************************** END OF PROLOGUE **************************/ include "com.h"
include "alc.h"
#include "com_extern.h"
include "alc_extern.h"

void al_trace( UCHAR ident1,           /* first identifier          */
               UCHAR ident2,           /* second identifier         */
               struct alloc_req *alreq) /* pointer to request/response*/
{
    /*-------------------------------------------------------------*/
    /* Put in the entry                                            */
    /*-------------------------------------------------------------*/
    al_trent( ident1, ident2, alreq, al_tbuf, &al_trptr, ALTRMAX ));
```

```
    return;
}
```

```
/*%%%%%%%%%%%%%%%%%%%%%%%%%%%%%%%%%%%%%%%%%%%%%%%%%%%%%%%%%%%%%%%%%%%%%%%%%%%%%%
static char rcsid[]="$Header: /home/twolf/davet/alc/RCS/al_timo.c,v 1.3 1993/02/23 17
:50:48 aarond Exp $";
/* FUNCTION NAME:   static al_timo()

FUNCTION TITLE:  Handle Drive Unload Time-out

FUNCTIONAL DESCRIPTION:
       This function rejects all path requests which include
       drive destinations and whose expiration dates have passed.

OPERATIONAL DESCRIPTION:
       This function checks the first entry for each LSM on the
       drive wait queue ( al_wtdrv ). If the expiration date of
       an entry is prior to the current time, the request is
       rejected.

PREREQUISITES:
       - the queue al_wtdrv       has been initialized
       - the table gl_dcnfg       has been initialized SPECIAL CONSIDERATIONS:
       (none)

TYPE        NAME            RANGE/DESCRIPTION
                ----        ----            -----------------
   PARMS IN:    (none)

RET VALS: void  (none)

EXT VARS:    al_wtdrv                    wait on drive alloc queue     (RW)

H/W REGS:    (none)

FUNCTNS:     al_delst()                  remove link from list
                al_reject()                 reject an alloc request HISTORY:
   01/16/86    fgm    Prologue created
   --/--/--    fgm    Prologue reviewed
   01/20/86    fgm    Code completed
   08/22/88    fgm    If a dismount is in progress requeue the request
********************* END OF PROLOGUE *********************************/ include <com.h>
include "alc.h"
#include <com_extern.h>
include <alc_extern.h> void al_timo( void )
{
    UCHAR lsm;
    struct alloc_req *req;
    struct COM_LINK *lptr;
    struct COM_LINK *sptr;
    struct dcf_driv *rdrv;
    UINT32 time;
    int temp;

/*---------------------------------------------------------------------
     * set the time from the system clock
     *--------------------------------------------------------------------*/
    time = sys_rtc_get_ticks();

/*---------------------------------------------------------------------
     * Check the oldest request for each LSM for expiration
     *--------------------------------------------------------------------*/
    for ( lsm = 0; lsm < MAXLSM; ++lsm )
    {
        while ( (lptr = al_wtdrv[ lsm ].first ) != NULL )
        {
            if ((time - *(unsigned long *) (&(lptr->lnk_data[TIME]))) <
                0xFFF00000L)
            {
                /*
                 * This request has expired - if there is not an
                 * outstanding dismount then reject it
                 */
                req = ( struct alloc_req * ) ( lptr -> lnk_data[ 0 ] );
                al_delst( &al_wtdrv[ lsm ], NULL, lptr, PRT_WD4 );

temp = ( req -> qualif_2 ) & ( PLC_TAPU | PLC_DRID );
                rdrv = & ( gl_dcnfg[lsm].tapu[ ( temp & PLC_TAPU ) >> 2 ] .
                           drive[ temp & PLC_DRID ] );

if ( ( rdrv -> driv_sta & (DCD_ALLC | DCD_DMNT) ) ==
                     (DCD_ALLC | DCD_DMNT) )
                {
                    /*
                     * There is an outstanding dismount - requeue request
                     */
                    sptr = al_enlst( &(al_wtdrv[ lsm ]), PRT_WD4, req,
                                     Alc_Drive_Priority );
                    *(unsigned long *) &(sptr -> lnk_data[ TIME ]) =
                        time + DRUNL_TO;
                }
                else
                {
                    /*
                     * There is no dismount - reject the request
                     */
                    al_dropt( req, NOT_ALLC, NOT_ALLC, NOT_ALLC );
                    al_reject( req, lsm, R_ALUNTO, al_utape( req -> qualif_2, lsm )
                             );
                }
            }
            else
            {
                /*
                 * This request has not expired - break from while loop
                 */
                break;
            }                           /* end of while */
        }                               /* end of for */
    }
    return;
}
```

```
Aug 18 1995 10:54:48                    al_tape.c                          Page 1 static char rcsid[]="$Header: /home/twolf/davet/alc/RCS/al_tape.c,v 1.2 1993/02/23 17
:50:45 aatrand Exp $";
/* FUNCTION NAME:     static al_tape()
**
** FUNCTION TITLE:    Convert Panel/Drive to TapeUnit/Drive
**
** FUNCTIONAL DESCRIPTION:
**    This function accepts a pointer to a byte of the form zzxx
**    xxyy, where xxxx is the panel ID and yy is the drive ID.
**    It replaces the byte with one of the form zz00
**    ttyy, where tt is the tapeunit identifier.
**
** OPERATIONAL DESCRIPTION:
**    This function searches the drive descriptors of gl_dcnfg
**    to find a match with the panel_id. The panel ID is
**    replaced by the corresponding tapeunit ID.
**
** PREREQUISITES:
**    (none)
**
** SPECIAL CONSIDERATIONS:
**    (none)
**
**         TYPE     NAME         RANGE/DESCRIPTION
**         ----     ----         -----------------
** PARMS IN: short  *pnl_drv     panel/drive ID           (W*)
**           int    lsm          lsm of drive
**
** RET VALS: int    RET_OK       ID has been altered
**                  FAIL         this panel is not drive panel
**
** EXT VARS: (none)
**
** H/W REGS: (none)
**
** FUNCTNS:  (none)
**
** HISTORY:
** 01/07/86   fgm    Prologue created
** --/--/--   fgm    Prologue reviewed
** 01/20/86   fgm    Code completed
**
************************** END OF PROLOGUE **************************/ include <com.h>
include "alc.h"
#include <com_extern.h>
include <alc_extern.h> int al_tape( UCHAR *pnl_drv,     /* panel/drive ID       */
             UCHAR lsm )         /* LSM of drive         */
{
    struct dcf_tapu *tapeunit;   /* pointer to tapeunit  */
    UCHAR tapu_drv;              /* tapeunit/drive ID */
    UCHAR panel;                 /* panel ID */
    register index;              /* index */

/*-----------------------------------------------------------------*
     * Get the panel ID; initialize the tapeunit/drive ID with drive
     *-----------------------------------------------------------------*/
    panel = (( *pnl_drv & PLC_DRPN ) >> 2 );
    if ( panel > MAXEXPNL )
        return( FAIL );
```

```
Aug 18 1995 10:54:48                    al_tape.c                          Page 2 tapu_drv = ( *pnl_drv & ( PLC_DRID | PLC_MASK ) );

/*-----------------------------------------------------------------*
     * Find the matching panel
     *-----------------------------------------------------------------*/
    for ( index = 0; index < MAXTAPU; ++index )
    {
        tapeunit = &gl_dcnfg[ lsm ].tapu[ index ];
        if ( panel == (tapeunit -> tapu_pnl) )
        {
            *pnl_drv = ((index << 2) | tapu_drv );
            return( RET_OK );
        }
    }
    /*-----------------------------------------------------------------*
     * Return failure
     *-----------------------------------------------------------------*/
    return ( FAIL );
}
```

```
Aug 18 1995 10:54:48                        al_rspnd.c                              Page 1 static char resid[]="$Header: /home/twolf/davet/alc/RCS/al_rspnd.c,v 1.2 1993/02/23 1
7:50:41 aarond Exp $";
/*  FUNCTION NAME:      static al_rspnd()
**
**  FUNCTION TITLE:     Respond to an Allocation Request
**
**  FUNCTIONAL DESCRIPTION:
**       This function accepts a pointer to an Allocation Request,
**       a primary LSM ID and three extension bytes. If the request
**       was for a path, the third parameter will be a pointer to
**       the path structure. Otherwise the third through fifth
**       parameters are extension bytes. This response is packaged
**       and sent to the requesting task.
**
**  OPERATIONAL DESCRIPTION:
**       This function accepts a request, a parameter which is an
**       LSM ID. The third parameter is a pointer to a path
**       structure if the request is for a path allocation.
**       Otherwise it is the first of up to three extension bytes.
**
**       The response is built up in the original request package.
**       It is then posted to requesting task.
**
**  PREREQUISITES:
**       - a request has been received which has been filled
**
**  SPECIAL CONSIDERATIONS:
**       (none)
**
**  PARMS IN:   TYPE              NAME            RANGE/DESCRIPTION
**              ----              ----            -----------------
**              struct *request                   the allocation request ptr
**              int               lsm_id          LSM ID
**              short             ptr_ext0        extension byte 0/path pointer
**              short             ext1            extension byte 1
**              short             ext2            extension byte 2
**
**  RET VALS:   void              (none)
**
**  EXT VARS:                     (none)
**
**  H/W REGS:                     (none)
**
**  FUNCTNS:
**
**  HISTORY:
**       01/07/85   fgm   Prologue created
**       --/--/--   fgm   Prologue reviewed
**       01/20/86   fgm   Code completed
**       10/07/87   fgm   Add handling of ARQ_SSWP
**
******************* END OF PROLOGUE **********************/ include <com.h>
include "alc.h"
#include <com_extern.h>
include <alc_extern.h> void al_rspnd(struct allc_req *request,   /* ptr to orig request  */
              UCHAR lsm_id,               /* LSM ID               */
              int ptr_ext0,               /* ptr to path/exten byte*/
              UCHAR ext1,                 /* extension byte 1     */
              UCHAR ext2)                 /* extension byte 2     */
```

```
Aug 18 1995 10:54:48                        al_rspnd.c                              Page 2 register struct allc_rsp *response;    /* ptr to response buffer*/
UCHAR mailbox;                         /* mailbox address       */

/*---------------------------------------------------------------*
 * Get the mailbox address:                                      *
 *---------------------------------------------------------------*/
mailbox = ( (request -> req_task) );

/*---------------------------------------------------------------*
 * Equate the response buffer to the request buffer              *
 *---------------------------------------------------------------*/
response = ( struct allc_rsp * ) request;

response -> prim_lsm = lsm_id;

/*---------------------------------------------------------------*
 * Put in the extension bytes OR put in the path pointer         *
 *---------------------------------------------------------------*/
if ( ( ( request -> req_typ ) == ARQ_PATH ) ||
     ( ( request -> req_typ ) == ARQ_SSWP ) )
{
    response -> qual.path_ptr = (struct allc_pth *) ptr_ext0;
}
else
{
    response -> qual.extend[ 0 ] = ptr_ext0;
    response -> qual.extend[ 1 ] = ext1;
    response -> qual.extend[ 2 ] = ext2;
}

/*---------------------------------------------------------------*
 * Trace the response                                            *
 *---------------------------------------------------------------*/
al_trace( 'R', 'S', (struct allc_req *)response );

/*---------------------------------------------------------------*
 * Send off the completed response                               *
 *---------------------------------------------------------------*/
sys_msg_send( mailbox, (char *)response, SYS_NORMAL );

return;
}
```

```
static char rcsid[]="$Header: /home/twolf/davet/alc/RCS/al_rqpth.c,v 1.5 1993/02/23 1
7:50:37 aaron$ Exp $";
/* FUNCTION NAME:    static al_rqpth()

FUNCTION TITLE:   Path Allocation Request Handler

FUNCTIONAL DESCRIPTION:
   This function accepts new path allocation requests. These
   are either granted, rejected or held for future
   allocation.

OPERATIONAL DESCRIPTION:
   This function receives a pointer to a message requesting a
   path allocation from one location to another. A path must
   be allocated whenever the source and destination of a
   cartridge are in different LSMs or if either the source or
   destination is a CAP or drive.

For functional requests and maintenance inline requests
   path allocations are not allowed which include LSMs that
   are not in 'online' status with no 'offline pending'.

For diagnostic offline requests path allocations are not
   allowed which include more than one LSM.

A source or destination that involves a CAP causes this
   function to call al_acap() to gain allocation for the CAP.
   If allocation is rejected, the request is rejected.

If a drive source or destination is requested, the
   al_adrv() is called. If the allocation fails, the request
   is placed on the wait for drive queue ( al_wtdrv ). If the
   allocation is rejected, the request is rejected.

If a path from one LSM to another is necessary the
   function al_paths() is called to determine if a path can
   be allocated at this time. If the resources necessary to
   allocate a path are available, those resources are
   allocated. The drives and pass-thru ports allocated are marked
   allocated to the requesting task in the gl_dcnfg
   table. The allocated path is returned to the requesting
   task in its mailbox (mb_dtask#).

If no path exists for the request (al_dists#) indicates a
   distance of NOCNECT from one LSM to the other) a path
   rejection is issued in lieu of the allocated path.

If the path requested exists, but is not currently
   available due to prior allocations, the request is placed
   in the al_wtpth pqueue to wait for resources. This queue
   has the form of a FIFO, although items may be removed from
   the middle. An item is added at the end of the queue
   (pointed to by al_ptend) so that the oldest request is
   pointed to by al_ptbeg, the queue begin pointer ( see the
   file descriptor ).

PREREQUISITES:
   - the queue al_wtpth    must have been initialized
   - the queue al_wtdrv    must have been initialized SPECIAL CONSIDERATIONS:
   (none)

TYPE    NAME            RANGE/DESCRIPTION
   ----    ----            -----------------
```

```
/* PARMS IN:  struct *request                pointer to path allocation req  */

/* RET VALS: void      (none)

/* EXT VARS:           al_wtpth              path alloc req wait queue    (RW)
                       al_wtdrv              drive alloc req wait queue   (RW)
                       gl_dcnfg              ATHS configuration table     (RW)
                       mb_dtask#             dynamic task mailbox         (SC)

/* H/W REGS:           (none)

/* FUNCTNS:            al_paths()            find LSM to LSM path
                       mt_post()             Sys Call - post to a mailbox
                       al_acap()             allocate a CAP
                       al_adrv()             allocate a drive /* HISTORY:
/* 07/10/85    fgm     Prologue created
/* 07/23/85    fgm     Prologue reviewed
/* 01/15/86    fgm     Code completed
/****************** END OF PROLOGUE ********************/ include <com.h>
include <alc.h>
#include <con_extern.h>
include <alc_extern.h> void al_rqpth(
    struct alc_req *request)    /* pointer to alloc request */
{
    struct alr_dlsm *rlsm;      /* pointer to LSM descriptor */
    UCHAR lsm;                  /* ID of LSM of interest */
    UCHAR srrlsm;               /* LSM in error */
    int temp;                   /* temporary integer variable */
    int rej_flag;               /* rejection/acceptance flag */
    struct COM_LINK *lptr;      /* pointer to a link for list */
    enum alc_allocation_requests req; /* request type */
    struct alc_pth *pptr;       /* pointer to allocate path */
    UCHAR host;                 /* ID of host owning CAP */

UCHAR src_dst;              /* source or destination selec*/
    UCHAR cid;                  /* CAP ID */
    UCHAR alc_msk;              /* allocation mask */
    UCHAR qual_sl;              /* qualifier selector */

/* Initialize general values of interest ................... */ lsm = (request -> prim_lsm) & LSM_MASK;
    req = request -> req_typ;
    rlsm = & gl_dcnfg[ lsm ];
    rej_flag = 0;
    al_ptpdl = FALSE;
    temp = gl_dcnfg[ lsm ].lsm.lsm_stat;

if ( request -> maintenance )
    {
       /*
        * This is a Maintenance request
        * ---------------------------------------------*/
        pptr = NULL;
        if ( ( req == ARQ_PATH ) || ( req == ARQ_SSWP ) )
        {
            /* No multiple LSM requests allowed
```

Page 3 — al_rqpth.c

```
                                                                    */
    if ( lsm != (request -> qualif_0) )
    {
        al_rejct( request, lsm, R_ALMRMU, 0 );
        return;
    }

/*----------------------------------------------------------------
     * create a path structure
     *---------------------------------------------------------------*/
    sys_msg_alloc( sizeof( struct allc_pth ), (char **)&pptr );
    pptr -> lsm_cnt = 1;
    pptr -> lsm_ids[ 0 ] = lsm;

/*----------------------------------------------------------------
     * Grant the maintenance request
     *---------------------------------------------------------------*/
    al_rspnd( request, lsm, (int)pptr, 0, 0 );
    return;

/*----------------------------------------------------------------
     * If LSM is in Offline Pending only allow a CAP release
     *---------------------------------------------------------------*/
    if ( temp & DCL_OFFP )
    {
        if ( ( req != ARQ_CREL ) && ( req != ARQ_CDRP ) )
        {
            al_rejct( request, lsm, R_ALOFFP, 0 );
            return;
        }
    }
    /*----------------------------------------------------------------
     * LSM must be Online and Ready for any of these requests
     * except CAP release can be done on a Not Ready machine
     *---------------------------------------------------------------*/
    if ( ( ( req == ARQ_CREL ) || ( req == ARQ_CDRP ) ) && ( ! (temp & DCL_RDY ) ) )
    {
        rej_flag = 0;
        else if ( ! (temp & DCL_RDY ) )
        {
            al_rejct( request, lsm, R_ALNRDY, 0 );
            return;
        }
        else if ( ! (temp & DCL_ONLN ) )
        {
            al_rejct( request, lsm, R_ALOFF, 0 );
            return;
        }
    }

/*----------------------------------------------------------------
     * Break out request according to its type
     *---------------------------------------------------------------*/
    switch ( req )
    {
    case ARQ_EJCT:
    case ARQ_ENTR:
    case ARQ_CAPR:
    case ARQ_CREL:
    case ARQ_CDRP:
```

Page 4 — al_rqpth.c

```
    case ARQ_CCNT:
    case ARQ_CLOK:
        host = request -> qualif_0;
        rej_flag = al_acqp( lsm, req, request -> qualif_1,
                            request -> req_task, &host, request -> qualif_2 );
        if ( rej_flag != RET_OK )
        {
            al_rejct( request, lsm, rej_flag, host );
        }
        else
        {
            al_rspnd( request, lsm, 0, 0, 0 );
        }
        break;

case ARQ_SSWP:
    case ARQ_PATH:
        /*------------------------------------------------------------
         * If there is no path reject the request
         *----------------------------------------------------------*/
        if ( al_dists[ lsm ] || request -> qualif_0 ) == NO_CHECT)
        {
            temp = al_nopth( lsm, request -> qualif_0, &strlsm );
            al_rejct( request, lsm, ctrlsm, temp, 0 );
            return;
        }

/*------------------------------------------------------------
         * For Source and destination check for CAP and Drive Reqs
         *----------------------------------------------------------*/
        for ( src_dst = 1; src_dst <= 2; ++ src_dst )
        {
            alc_msk = PLC_ABEG;
            qual_sl = request -> qualif_1;
            if ( src_dst == 2 )
            {
                alc_msk = PLC_AEND;
                qual_sl = request -> qualif_2;
                lsm = request -> qualif_0;
            }

/*--------------------------------------------------------
             * If a CAP is involved as source and/or destination try
             * to allocate them/it for motion
             *------------------------------------------------------*/
            if ( ( ( qual_sl & PLC_MASK ) == PLC_CAP ) &&
                 ( ! (request -> prim_lsm & alc_msk ) ) )
            {
                cid = qual_sl & PLC_CPID;
                host = ((struct apth_ext *) request) -> xhost;
                rej_flag = al_acop( lsm, ARQ_PATH, cid, 0, &host, 0 );
                if ( rej_flag != RET_OK )
                {
                    al_drop( request, NOT_ALLC, NOT_ALLC, NOT_ALLC );
                    al_rejct( request, lsm, rej_flag, host );
                    return;
                } request -> prim_lsm |= alc_msk;
            }

/*--------------------------------------------------------
             * If the source or destination is a drive, try to
             * allocate it
             * If this is a Self Swap - only allocate it as source
             *------------------------------------------------------*/
```

```
/*----------------------------------------------------------*/
    if ( ( src_dst == 2 ) && ( req == ARQ_SSWP ) )
        continue;
    )
    if ( ( ( qual_sl & PLC_MASK ) == PLC_DRIV ) &&
         ( !( request -> prim_lsm & alc_msk ) ) )
    {
        temp = ( qual_sl ) & ( PLC_TAPU | PLC_DRID );
        rej_flag = al_adriv( lsm, ( temp & PLC_TAPU ) >> 2,
                    temp & PLC_DRID, request -> req_task,
                    req == ARQ_SSWP, ( src_dst == 2 ), FALSE );
    } switch ( rej_flag )
    {
    case FAIL:
        /*--------------------------------------------------
         * Could not allocate - put request on wait queue
         * Note: this is only for mounts (drive as dstntn)
         *--------------------------------------------------*/
        lptr = al_enlst( &(al_wtdrv1.lsm ]), PRT_WD4, request,
                    Alc_Drive_Priority );
        *(unsigned long *) &(lptr -> lnk_data[ TIME ])) =
                    sys_rtc_get_ticks() + DRUNL_TO;
        al_tstmp( request, TS_XPRT );
        return;

case RET_OK:
        /*--------------------------------------------------
         * Allocated - go check for path allocation
         *--------------------------------------------------*/
        request -> prim_lsm |= alc_msk;
        break;

default:
        /*--------------------------------------------------
         * Rejection - reject the request
         *--------------------------------------------------*/
        al_drop( request, NOT_ALLC, NOT_ALLC, NOT_ALLC );
        al_rejct( request, lsm, rej_flag,
                  al_utape( qual_sl, lsm ));
        return;
    }
}

/*------------------------------------------------------------
 * Try to allocate path from source to destination
 *-----------------------------------------------------------*/
lsm = ( request -> prim_lsm ) & LSM_MASK;
temp = al_paths( lsm, request -> qualif_0, NOTAGED, &pptr,
                 &errlsm, request -> req_task );

switch( temp )
{
case YES:
    /*--------------------------------------------------------
     * Got a path which is allocated - report to requestor
     *--------------------------------------------------------*/
    al_rspnd( request, lsm, (int)pptr, 0, 0 );
    return;

case NO:
    /*--------------------------------------------------------
     * Not allocatable at this time - put it on wait queue
     *--------------------------------------------------------*/
```

```
    sys_msg_release( (char *) pptr );
    lptr = al_enlst( &( al_wtpth ), PRT_WD2, request,
                    Alc_Path_Priority );
    al_tstmp( request, TS_PATH );
    return;

default:
    /*-----------------------------------------
     * Path rejected - reject the request
     *-----------------------------------------*/
    al_drop( request, NOT_ALLC, NOT_ALLC, NOT_ALLC );
    if ( temp == RL_PTPDL )
    {
        al_rejct( request, al_dllsm, temp, al_dlpnl );
    }
    else
    {
        al_rejct( request, errlsm, temp, 0 );
    }
}                                           /* end of inner switch */
}                                           /* end of outer switch */
}
```

```
static char rcsid[]="$Header: /home/twolf/davet/alc/RCS/al_rjptp.c,v 1.2 1993/02/23 1
7:50:34 aarond Exp $";
/* FUNCTION NAME:    static al_rjptp()
 *
 * FUNCTION TITLE:   Reject PTP Mechanism Requests
 *
 * FUNCTIONAL DESCRIPTION:
 *   This function accepts a primary LSM, a secondary LSM, a
 *   rejection code and rejection extension. This function will
 *   reject all requests waiting on a PTP mechanism for the
 *   specified PTP.
 *
 * OPERATIONAL DESCRIPTION:
 *   This function scans the al_wtmchl queue for requests waiting
 *   on the specified PTP. Any that are found are rejected. Any
 *   allocated mechanisms are deallocated.
 *
 * PREREQUISITES:
 *   (none)
 *
 * SPECIAL CONSIDERATIONS:
 *   (none)
 *
 *           TYPE   NAME         RANGE/DESCRIPTION
 *           ----   ----         -----------------
 * PARMS IN: int    plsm         Master LSM of PTP
 *           int    slsm         Slave LSM of PTP
 *           int    rejc         rejection code
 *           int    rejx         rejection extension
 *
 * RET VALS: void   (none)
 *
 * EXT_VARS:        al_wtmch     wait for port mech queue      (RW)
 *
 * H/W REGS:        (none)
 *
 * FUNCTNS:         al_drop()    drop allocated mechs
 *                  al_delst()   remove link from linked list
 *                  al_reject()  reject a request
 *
 * HISTORY:
 * 08/08/89  fgm   Prologue created
 * -/--/--   fgm   Prologue reviewed
 * 08/08/89  fgm   Code completed
 *********************** END OF PROLOGUE ***********************/ include <com.h>
include "alc.h"
#include <com_extern.h>
#include "alc_extern.h"

void al_rjptp(UCHAR plsm,
              UCHAR slsm,
              int rejc,
              int rejx)
{
    struct COM_LINK  *lptr;     /* pointer to a link in list    */
    struct COM_LINK  *tptr;     /* temporary ptr to link        */
    struct COM_LINK  *prev;     /* pointer to previous link     */
    struct alc_req   *req;      /* pointer to allocation request */ lptr = al_wtmch[ plsm ].first;
    prev = NULL;

while ( lptr != NULL )
    {
    /*-----------------------------------------------------------
     * Scan down the wait queue and reject all waiting requests
     * for the specified LSM pair
     *-----------------------------------------------------------*/
        req = (struct alc_req *) ( lptr -> lnk_data[ 0 ] );
        if ( ( ( req -> qualif_0 == slsm ) ||
               ( (req -> prim_lsm) & LSM_MASK) == slsm ) )
        {
            tptr = lptr -> next_lnk;
            al_delst( &al_wtmchl[ plsm ], prev, lptr, PRT_WD4 );
            al_drop( req, lptr -> lnk_data[ AHAND_ID ], NOT_ALLC,
                    NOT_ALLC );
            al_rejct( req, plsm, rejc, rejx );
            lptr = tptr;
            continue;
        }
        prev = lptr;
        lptr = lptr -> next_lnk;
    }
}
```

```
static char rcsid[]="$Header: /home/twolf/davet/alc/RCS/al_retrn.c,v 1.3 1993/06/09 1
7:15:43 aarond Exp $";
/* FUNCTION NAME:  static al_retrn()

FUNCTION TITLE: Reevaluate Transport Alloc Requests

FUNCTIONAL DESCRIPTION:
  This function accepts a resource change descriptor which
  potentially effects outstanding transport allocation
  requests. This function reevaluates those requests and
  notifies the requesting task of allocation grants or
  allocation rejections if necessary.

OPERATIONAL DESCRIPTION:
  This function accepts a resource change descriptor as its
  argument. It then scans the transport resource wait queues
  (al_wtrm , al_wtmch ) for requests that may
  be effected by this resource change. Depending on the type
  of change indicated, the following actions are taken:

Type of Change              Action During Scan
  --------------              ------------------
  (a) SUB_LSM                 all requests targeted for
                              this LSM are rejected (b) SUB_ARM                 all requests for arm and
  (c) SUB_HAND                hands are rejected (d) SUB_PTP                 all requests for the pass
                              thru mechanism are rejected (e) ADD_ARM                 the oldest request for the
  (f) ADD_HAND                deallocated resource is
  (g) ADD_PTP                 granted. LSM in offline
                              pend checked for no alloc -
                              go to offline if so.

Each of the relevant queues is scanned. If more than one
  needs to be checked the scan order is: al_wthnd ,
  al_wtmch and al_wtarm. The queues are scanned from
  oldest to newest request. The actions shown above are
  executed wherever it is appropriate. If a request can be
  satisfied or rejected the allocation response is posted.
  Scanning continues until all the potentially effected
  requests have been checked.

PREREQUISITES:
  - the queue al_wthnd     has been initialized
  - the queue al_wtmch     has been initialized
  - the queue al_wtarm     has been initialized
  - the table gl_dcnfg     has been initialized SPECIAL CONSIDERATIONS:
  (none)

PARMS IN:  TYPE            NAME            RANGE/DESCRIPTION
           ----            ----            -----------------
           struct *al_chnge                resource change descriptor RET VALS:  void            (none)

EXT VARS:                  al_wthnd                        wait for hand queue          (RW)
                           al_wtmch                        wait for port mech queue     (RW)
                           al_wtarm                        wait for arm queue table     (RW)
                           gl_dcnfg                        ATHS configuration table     (RW)

H/W REGS:                  (none)

FUNCTNS:                   mt_rblok()                      Sys Call - release memory block
                           mt_post()                       Sys Call - post mailbox message HISTORY:
07/16/85  fgm  Prologue created
07/23/85  fgm  Prologue reviewed
01/15/86  fgm  Code completed
12/16/88  fgm  On LSM loss reject hand request first so dropped
               hand deallocation not propagated

******************** END OF PROLOGUE ******************************/
#include <com.h>
include "alc.h"
#include <com_extern.h>
include <alc_extern.h> void al_retrn(
    struct alchange *al_chnge) /* ptr to change descriptor    */
{
    struct COM_LINK *lptr;     /* pointer to a link in list */
    struct COM_LINK *nptr;     /* pointer to new link */
    struct COM_LINK *prev;     /* pointer to previous link */
    struct alloc_req *req;     /* pointer to allocation request */
    int rcode;                 /* return value holder */
    UCHAR plsm;                /* primary LSM */
    UINT16 rjcod;              /* rejection code */
    UCHAR temp1;               /* temporary storage */
    UCHAR temp2;               /* temporary storage */
    UCHAR temp3;               /* temporary storage */
    UCHAR temp4;               /* temporary storage */
    unsigned short change =
        al_chnge->change;      /* change type */
    UCHAR main_lsm =
        al_chnge->main_lsm;    /* primary lsm */
    UCHAR second_lsm =
        al_chnge->scnd_lsm;    /* secondary lsm */ if ( change & ADD_HAND )
    /*-------------------------------------------------------------
     * A hand was deallocated or became operative
     *-----------------------------------------------------------*/
    {
        lptr = al_wthnd[ main_lsm ].first;
        if ( lptr != NULL )
        /*-------------------------------------------------------------
         * Since someone is waiting for this hand, allocate it
         *-----------------------------------------------------------*/
        {
            req = ( struct alloc_req * ) ( lptr -> lnk_data[ 0 ] );
            al_compute_new_priority( req, ALC_Hand_Priority);
            plsm = ( req -> prim_lsm ) & LSM_MASK;
            rcode = al_ahand( plsm, req -> req_task, &temp1 );
            switch ( rcode )
            {
                case RET_OK:
                    /* Hand is allocated - take it off the wait queue and
                     * try to allocate any other resources
                     */
                    al_tstmp( req, TS_XPRT );
```

```
                                                                            al_retrn.c                                           Page 3
Aug 18 1995 10:54:48 al_delist( &al_wthnd[ plsm ], NULL, lptr, PRT_WD4 );
              al_trans( req, templ, NOT_ALLC, NOT_ALLC );
              break;

case FAIL:
         /*----------------------------------------------------------*
          * If can't allocate now then no action                     *
          *----------------------------------------------------------*/
              break;

default:
         /*----------------------------------------------------------*
          * If hand can't be used then reject the request            *
          *----------------------------------------------------------*/
              al_delist(&al_wthnd[ plsm ], NULL, lptr, PRT_WD4);
              al_reject(req, plsm, rcode, NULL);
              break;
         }
     } if ( change & ADD_PTP )
     /*--------------------------------------------------------------*
      * Have a newly available PTP                                   *
      *--------------------------------------------------------------*/
     {
         lptr = al_wtmch[ main_lsm ] . first;
         prev = NULL;
         while ( lptr != NULL )
         /*----------------------------------------------------------*
          * Scan down the wait queue for the main LSM                *
          *----------------------------------------------------------*/
         {
             req = ( struct alc_req * ) ( lptr -> lnk_data[ 0 ] );
             al_compute_new_priority( req, Alc_Mech_Priority);
             plsm = ( req -> prim_lsm ) & LSM_MASK;
             if ( ( second_lsm == req -> qualif_0 ) ||
                  ( second_lsm == plsm ) )
             {
             /*------------------------------------------------------*
              * If the LSMs both match try to allocate the PTP       *
              *------------------------------------------------------*/
                 rcode = al_apmch( plsm, req -> qualif_0,
                                   req -> req_task, &temp1, &temp2 );
                 switch ( rcode )
                 {
                 case RET_OK:
                 /*--------------------------------------------------*
                  * Good allocation - now wait for arm allocation    *
                  *--------------------------------------------------*/
                     temp3 = lptr -> lnk_data[ AHAND_ID ];
                     al_tstmp( req, TS_PATH );
                     al_delist( &al_wtmch[ temp1 ], prev, lptr, PRT_WD4 );
                     al_trans( req, temp3, temp1, temp2 );
                     lptr = NULL;
                     break;

case FAIL:
                 /*--------------------------------------------------*
                  * If not currently available then no action        *
                  *--------------------------------------------------*/
                     prev = lptr;
                     lptr = lptr -> next_lnk;
                     break;

default:
```

```
                                                                            al_retrn.c                                           Page 4
Aug 18 1995 10:54:48

/*--------------------------------------------------*
                  * PTP is unuseable - reject the request            *
                  *--------------------------------------------------*/
                     temp3 = lptr -> lnk_data[ AHAND_ID ];
                     nptr = lptr -> next_lnk;
                     al_delist( &al_wtmch[ main_lsm ], prev,
                                lptr, PRT_WD4 );
                     al_drop( req, temp3, NOT_ALLC, NOT_ALLC );
                     al_reject( req, temp1, rcode, NULL);
                     lptr = nptr;
                     break;
                 }
             }
             else
             /*------------------------------------------------------*
              * The LSMs didn't match - bump the pntrs to next entry *
              *------------------------------------------------------*/
             {
                 prev = lptr;
                 lptr = lptr -> next_lnk;
             }
         }  /* end of while loop */
     } if ( change & ADD_ARM )
     /*--------------------------------------------------------------*
      * Have a freed up arm (or new arm request w/ other resources allocated)
      *--------------------------------------------------------------*/
     {
         lptr = al_wtarm[ main_lsm ].first;
         if ( lptr != NULL )
         /*----------------------------------------------------------*
          * Try to satisfy the first request on the list             *
          *----------------------------------------------------------*/
         {
             req = ( struct alc_req * ) ( lptr -> lnk_data[ 0 ] );
             al_compute_new_priority( req, Alc_Arm_Priority);
             plsm = ( req -> prim_lsm ) & LSM_MASK;
             rcode = al_aarm( plsm, req -> req_task );
             temp2 = lptr -> lnk_data[ AHAND_ID ];
             temp1 = lptr -> lnk_data[ APTP_ID ];
             if ( temp1 == NOT_ALLC )
             {
                 temp3 = temp4 = NOT_ALLC;
             }
             else
             {
                 temp3 = ( temp1 & PRM_MSTR ) ? plsm : req -> qualif_0;
                 temp4 = ( temp1 & APTP_MSK );
             }
             /*------------------------------------------------------*
              * Take action based on code returned from arm alloc    *
              *------------------------------------------------------*/
             switch ( rcode )
             {
             case RET_OK:
             /*----------------------------------------------------------*
              * Allocated the arm - all resources now granted -          *
              * notify the requesting task and delete list entry         *
              *----------------------------------------------------------*/
                 al_tstmp( req, TS_XPRT );
                 al_delist( &al_wtarm[ plsm ], NULL, lptr, PRT_WD4 );
                 al_rspnd( req, plsm, temp2, temp3, temp4 );
                 break;
```

```
                                                    al_retrn.c                          Page 5 case FAIL:
            /*-------------------------------------------------------------------*
             * Can't allocate arm right now - no action
             *-------------------------------------------------------------------*/
            break;
        default:
            /*-------------------------------------------------------------------*
             * Arm is not useable - reject the request
             *-------------------------------------------------------------------*/
            al_delst( &al_wtarm[ (req -> prim_lsm) & LSM_MASK ],
                      NULL, lptr, PRT_WD4 );
            al_drop( req, temp2,temp3,temp4 );
            al_reject(req, plsm, rcode, NULL);
            break;
        }
    } if ( change & SUB_PTP )
    {
        /*-------------------------------------------------------------------*
         * Lost a PTP - have to reject all outstanding requests
         *-------------------------------------------------------------------*/
        al_rjctp( main_lsm, second_lsm, R_ALPTP, NULL );
    } if ( change & ( SUB_LSM | SUB_HAND | SUB_ARM ) )
    {
        /*-------------------------------------------------------------------*
         * Lost a Robot - have to reject all outstanding requests
         *-------------------------------------------------------------------*/
        if ( change & SUB_ARM )
        {
            rjcod = R_ALARM;
        }
        if ( change & SUB_HAND )
        {
            rjcod = R_ALHAND;
        }
        if ( change & SUB_LSM )
        {
            rjcod = R_ALMRDY;
        }
        /*-------------------------------------------------------------------*
         * reject all outstanding requests for PTP mechanisms
         *-------------------------------------------------------------------*/
        for ( temp1 = 0; temp1 < MAXPTP; ++temp1 )
        {
            plsm = main_lsm;
            if ( ! (gl_dcnfg[ plsm ].ptp[ temp1 ].ptp_stat & DCP_BOSS ) )
            {
                break;
            }
            if ( gl_dcnfg[ plsm ].ptp[ temp1 ].ptp_stat & DCP_EXST )
            {
                temp2 = plsm;
                temp3 = gl_dcnfg[ plsm ].ptp[ temp1 ].ptp_adj;
            }
            else
            {
                temp2 = gl_dcnfg[ plsm ].ptp[ temp1 ].ptp_adj;
                temp3 = plsm;
            }
            al_rjctp( temp2, temp3, R_ALPTP, NULL );
```

```
                                                    al_retrn.c                          Page 6

}
        /*-------------------------------------------------------------------*
         * reject all outstanding requests for a hand
         *-------------------------------------------------------------------*/
        lptr = al_wthnd[ main_lsm ].first;
        while ( lptr != NULL )
        {
            req  = ( struct alic_req * ) ( lptr -> lnk_data[ 0 ] );
            plsm = ( req -> prim_lsm ) & LSM_MASK;
            al_delst( &(al_wthnd[ plsm ]), NULL, lptr, PRT_WD4 );
            al_reject(req, plsm, rjcod, NULL);
            lptr = al_wthnd[ main_lsm ].first;
        }
        /*-------------------------------------------------------------------*
         * reject all outstanding requests for the arm
         *-------------------------------------------------------------------*/
        lptr = al_wtarm[ main_lsm ].first;
        while ( lptr != NULL )
        {
            req   = ( struct alic_req * ) ( lptr -> lnk_data[ 0 ] );
            plsm  = ( req -> prim_lsm ) & LSM_MASK;
            temp3 = lptr -> lnk_data[ AHAND_ID ];
            rcode = lptr -> lnk_data[ APTP_ID ];
            if ( rcode == NOT_ALLC )
            {
                temp4 = NOT_ALLC;
            }
            else
            {
                temp4 = (rcode & PRM_MSTR) ? plsm : req -> qualif_0;
                rcode &= APTP_MSK;
            }
            al_delst( &al_wtarm[ plsm ], NULL, lptr, PRT_WD4 );
            al_drop( req, temp3, temp4, rcode );
            al_reject(req, plsm, rjcod, NULL);
            lptr = al_wtarm[ main_lsm ].first;
        }
    }
    return;
}
```

```
static char resid[]="$Header: /home/twolf/davet/alc/RCS/al_resrc.c,v 1.10 1993/06/09
22:34:44 aarond Exp $";
/***************** START OF PROLOGUE ******************************

StorageTek SECRET
        Property of Storage Technology Corporation
        Do not copy or distribute unpublished work Copyright (1993)
            Storage Technology Corporation
                All Rights Reserved FUNCTION NAME:   (global) al_resrc()

FUNCTIONAL DESCRIPTION:
    This is the primary function of the Resource Allocation
    Task. This function initializes the data structures used
    by the Allocate Resource Task and handles the
    communications posted to the SQ_HARQ, SQ_HAI and
    SQ_REAL system queues.

OPERATIONAL DESCRIPTION:
    This function calls al_init() to initialize data
    structures. The function then pends on a bundle of three
    system queues. It is activated by messages in the Host
    Allocation Request Queue (SQ_HARQ), the Host Allocation Information
    Queue (SQ_HAI) or the LSM reallocation request queue
    (SQ_REAL). The message is read from the appropriate queue.
    Requests, both original and reallocation,
    are sent to function al_reqst() for handling and
    information is sent to function al_infor(). Once the
    handling of one message is complete, this function once
    again pends on the queue bundle.

When this function pends, it uses as a time-out the value
    of the oldest entry in the al_wtdrv queue. If the pend
    times out that request is rejected for lack of a dismount.
    The entry is removed from the al_wtdrv queue.

**************** END OF PROLOGUE *******************/ include "com.h"
include "alc.h"
#include "log_user.h"

#include "com_extern.h"
include "alc_extern.h"

void al_resrc( void )
{
    unsigned long pnd_to;          /* time-out for pend */
    unsigned long tmp_to;          /* time-out for pend */
    unsigned long cur_time;        /* current time */
    UINT32 queue_id;               /* ID of queue for succ. pend */
    char *message;                 /* message received from pend */
    STATUS ret_stat;               /* status from system calls */
    register unsigned xlsm;        /* LSM ID variable */

/*--------------------------------------------------------
    * wait for the static configuration to be loaded
    *-------------------------------------------------------*/
    sys_semaphore_obtain ( com_semaphore_config_loaded, MINUTE );
    sys_semaphore_release( com_semaphore_config_loaded );
```

```
    /*--------------------------------------------------------
    * Initialize the Allocate Resource data structures
    *-------------------------------------------------------*/
    al_init();

/*--------------------------------------------------------
    * Loop forever handling allocation requests and information
    *-------------------------------------------------------*/
    for ( EVER )
    {
        /*
        * Pend time-out is the next wait drive unload time-out
        */
        pnd_to = 0xFFFFFFFF;
        cur_time = sys_rtc_get_ticks();

for ( xlsm = 0; xlsm < MAXLSM; ++xlsm )
        {
            if ( al_wtdrv[ xlsm ].first != NULL )
            {
                tmp_to = (* ((unsigned *) &( al_wtdrv[ xlsm ].first ->
                                           lnk_data[ TIME ] ))) - cur_time;

pnd_to = _min(tmp_to, pnd_to);
            }
        } if ( pnd_to == 0xFFFFFFFF )
        {
            pnd_to = SYS_FOREVER;
        } pnd_to = _min (pnd_to, COM_TICKS_PER_SEC * 10 );

if ( pnd_to == 1 )
        {
            ++pnd_to;
        }

/*
        * Pend on the Allocate Resource queue bundle
        */
        ret_stat = sys_msg_receive( BU_ALLOC, &message,
                                    SYS_WAIT,
                                    (UINT32) pnd_to, &queue_id );

switch ( ret_stat )
        {
        case SYS_TIMEOUT:
            /*
            * If pend timed-out go handle it
            */
            altimo();
            break;

case SYS_OK:
            /*
            * Got good pend return - what queue had the entry?
            */
            switch ( queue_id )
            {
            case SQ_HARQ:
                /*
                * this was an allocate request - handle it
                */
                al_reqst( (struct alc_req *)message, TRUE );
```

```
                              break;
                          case SQ_MAI:
                              /*-----------------------------------------------
                               * this was allocation information - handle it
                               *-----------------------------------------------*/
                              al_infor( (struct allc_rsc *)message );
                              break;
                          case SQ_REAL:
                              /*-----------------------------------------------
                               * this was a reallocate request - handle it
                               *-----------------------------------------------*/
                              al_reqst( ( struct allc_req *) message, FALSE );
                              break;
                          default:
                              /*-----------------------------------------------
                               * Log an unrecognized queue ID
                               *-----------------------------------------------*/
                              log_user_lmu_error( ERR_BAD_QID );
                          }
                          break;
                      default:
                          /*-----------------------------------------------
                           * Log bad return status from the pend
                           *-----------------------------------------------*/
                          log_user_lmu_error_data( ERR_BAD_RECEIVE, (UCHAR *)&ret_stat,
                                                  sizeof( ret_stat ) );
                          sys_fatal( ERR_FAULTY_DISPOSITION );
                      }
```

```
Aug 18 1995 10:54:48                    al_reqst.c                              Page 1 static char rcsid[]="$Header: /home/twolf/davet/alc/RCS/al_reqst.c,v 1.5 1993/03/17 1
6:27:42 aarond Exp $";
/*******************************************************************************
 * FUNCTION NAME:  static al_reqst()                                            */
/*                                                                              */
/* FUNCTION TITLE: Resource Allocation Request Handler                          */
/*                                                                              */
/* FUNCTIONAL DESCRIPTION:                                                      */
/*     This function accepts new resource allocation requests.                  */
/*     Allocation requests are granted, rejected or held for                    */
/*     future allocation.                                                       */
/*                                                                              */
/* OPERATIONAL DESCRIPTION:                                                     */
/*     This function receives a pointer to an allocation request                */
/*     as its input parameter. The request may have one of                      */
/*     several different formats as shown in the file descriptor.               */
/*                                                                              */
/*     Requests of format 1,2,3 or 4 are considered transport                   */
/*     allocation requests. They are passed to al_trans() for                   */
/*     handling. Requests 5, 6 and 7 are path allocation requests               */
/*     and are handled by al_rqpth(). The remaining requests are                */
/*     are LSM vary requests and are passed to al_vary() for                    */
/*     processing.                                                              */
/*                                                                              */
/*     To avoid deadlock over resource allocation (two requests                 */
/*     which are partially filled, each waiting for resources                   */
/*     that are allocated to the other) resources are allocated                 */
/*     in a heirarchical manner. Each resource is associated with               */
/*     a level. Resources at any level cannot be allocated until                */
/*     all resources at a lower level have been allocated.                      */
/*     Resources at a given level cannot be allocated unless                    */
/*     resources at a higher level allocated to the same task                   */
/*     have been released. A level of resources and their                       */
/*     associated levels is given below.                                        */
/*                                                                              */
/*        Resource        Level                                                 */
/*        --------        -----                                                 */
/*        arm             5      (high)                                         */
/*        port mechanism  4                                                     */
/*        hand            3                                                     */
/*        port slot       2                                                     */
/*        tape drive      1      (low)                                          */
/*        CAP             1                                                     */
/*                                                                              */
/*     Allocation rejections will have the format as shown in the               */
/*     file descriptor.                                                         */
/*                                                                              */
/* PREREQUISITES:                                                               */
/*     - the data structures of this task have been initialized                 */
/*                                                                              */
/* SPECIAL CONSIDERATIONS:                                                      */
/*     (none)                                                                   */
/*                                                                              */
/*              TYPE    NAME            RANGE/DESCRIPTION                       */
/*              ----    ----            -----------------                       */
/* PARMS IN: short      *request        allocation request pointer              */
/*                                                                              */
/* RET VALS: void       (none)                                                  */
/*                                                                              */
/* EXT VARS:            (none)                                                  */
/*                                                                              */
/* H/W REGS:            (none)                                                  */
/*                                                                              */
/* FUNCTNS:             al_trans()      handle transport alloc req              */
/*                      al_rqpth()      handle path alloc req                   */
```

```
Aug 18 1995 10:54:48                    al_reqst.c                              Page 2

/*                      al_vary()       handle LSM vary request                 */
/*                                                                              */
/* HISTORY:                                                                     */
/*    07/10/85   fqm     Prologue created                                       */
/*    07/23/85   fqm     Prologue reviewed                                      */
/*    01/15/86   fqm     Code completed                                         */
/***************************  END OF PROLOGUE  *****************************/ include <com.h>
include "alc.h"
#include <com_extern.h>
include <alc_extern.h> void al_vary(
    struct alc_req *request,         /* allocation request ptr */
    BOOLEAN original_request)         /* original (TRUE) or reallocate (FALSE ) */
{
    UCHAR lsm;                        /* LSM ID */
    UCHAR lsm_st;                     /* LSM status */
    enum alc_allocation_requests req; /* request type */

/*----------------------------------------------------------------------------*/
 * Trace the request
 *----------------------------------------------------------------------------*/
    request -> xptq_tim = request -> pthq_tim = 0;
    al_trace( 'R', (original_request)? 'Q': 'R', request );

/*----------------------------------------------------------------------------*/
 * wipe out the age field for all requests
 * and initialize the final priority field
 *----------------------------------------------------------------------------*/
    request -> age = 0;
    request -> actual_priority = request -> priority;

/*----------------------------------------------------------------------------*/
 * Set LSM ID and get the current LSM status
 *----------------------------------------------------------------------------*/
    lsm = request -> prim_lsm;
    if (lsm >= MAXLSM)
    {
        al_bctrc( 'R', request );
        al_rejct( request, lsm, R_PRLSM, NULL );
        return;
    } lsm_st = gl_dcnfg[ lsm ].lsm_lsm_stat;
    req = request -> req_typ;

/*----------------------------------------------------------------------------*/
 * No requests granted if LSM does not exist
 *----------------------------------------------------------------------------*/
    if ( !( lsm_st & DCL_EXST ) )
    {
        al_bctrc( 'R', request );
        al_rejct( request, lsm, R_ALELSM, NULL );
        return;
    }

/*----------------------------------------------------------------------------*/
 * If this is a maintenance request then don't grant if Online
 *----------------------------------------------------------------------------*/
    if ( request -> maintenance )
    {
        if ( lsm_st & DCL_ONLN )
        {
            al_rejct( request, lsm, R_ALONLM, NULL );
```

```
        return;
    )
else
    {
    /*----------------------------------------------------------------*
     * If a system request don't grant if in Maintenance
     *----------------------------------------------------------------*/
    if ( lsm_st & DCL_MNT )
        {
        al_rejct( request, lsm, R_ALMNT, NULL );
        return;
        }
    }

/*----------------------------------------------------------------*
 * If this is not a vary or CAP release type request
 *----------------------------------------------------------------*/
if ( ( ( req < ARQ_VONL ) || ( req > ARQ_VMNT ) ) &&
     ( ( req != ARQ_CREL ) && ( req != ARQ_CDRP ) ) )
    {
    /*----------------------------------------------------------------*
     * No requests granted if LSM is not ready
     *----------------------------------------------------------------*/
    if ( !( lsm_st & DCL_RDY ) )
        {
        al_rejct( request, lsm, R_ALNRDY, NULL );
        return;
        }

/*----------------------------------------------------------------*
     * Normal requests not granted if LSM is Offline
     *----------------------------------------------------------------*/
    if ( lsm_st & DCL_OFFL )
        {
        al_rejct( request, lsm, R_ALOFF, NULL );
        return;
        }
    }

/*----------------------------------------------------------------*
 * Break out requests according to type
 *----------------------------------------------------------------*/
switch ( request -> req_typ )
    {
    case ARQ_ARM:
    case ARQ_ARHD:
    case ARQ_ARPM:
    case ARQ_AHPM:
        /*--------------------------------------------------------*
         * Transport Allocation Requests
         *--------------------------------------------------------*/
        if (original_request)
            al_trans( request, NOT_ALLC, NOT_ALLC, NOT_ALLC );
        else
            al_reallocate_request( request );
        break;

case ARQ_PATH:
    case ARQ_SSWP:
        /* If this has a drive request convert to tape unit/tap drv
```

```
        if ( ( request -> qualif_1 & PLC_DRIV ) &&
             ( al_tape( &(request -> qualif_1), lsm, R_ALEXST, request ->
                        qualif_1 & ~PLC_MASK ) )
            {
            al_rejct( request, lsm, R_ALEXST, request ->
                      qualif_1 & ~PLC_MASK );
            return;
            } if ( ( ( request -> qualif_2 & PLC_DRIV ) &&
             ( al_tape( &(request -> qualif_2), lsm, R_ALEXST, request -> qualif_0 ) != RET_OK ) )
            {
            al_rejct( request, lsm, R_ALEXST, request ->
                      qualif_2 & ~PLC_MASK );
            return;
            }

/*----------------------------------------------------------------*
         * Ensure that the allocation bits are turned off
         *----------------------------------------------------------------*/
        request -> prim_lsm &= ~PLC_ABEG;
        request -> prim_lsm &= ~PLC_AEND;
        /* NOTE ; flow into next case */ case ARQ_CAPR:
    case ARQ_CREL:
    case ARQ_CDRP:
    case ARQ_ENTR:
    case ARQ_EJCT:
    case ARQ_CCAT:
    case ARQ_CLOK:
        /*--------------------------------------------------------*
         * Path Allocation Requests
         *--------------------------------------------------------*/
        al_rqpth( request );
        break;

case ARQ_VONL:
    case ARQ_VOFF:
    case ARQ_POFF:
    case ARQ_VMNT:
        /*--------------------------------------------------------*
         * Vary Requests
         *--------------------------------------------------------*/
        al_vary( request );
        break;

default:
        /* Unknown Requests - reject */
        al_rejct( request, NO_LSM, R_ALUNKN, NULL );
        break;
    }
}
```

```
Aug 18 1995 10:54:48              al_repth.c                          Page 1 static char rcsid[]="$Header: /home/twolf/devet/alc/RCS/al_repth.c,v 1.3 1993/02/23 1
7:50:20 asrond Exp $";
/* FUNCTION NAME:  static al_repth()                                         */
/*                                                                           */
/* FUNCTION TITLE: Reevaluate Path Allocation Requests                       */
/*                                                                           */
/* FUNCTIONAL DESCRIPTION:                                                   */
/*     This function reads the al_chnge descriptor which                     */
/*     potentially effects outstanding path allocation requests.             */
/*     This function reevaluates those requests and notifies the             */
/*     requesting task of allocation grants or allocation                    */
/*     rejections if necessary.                                              */
/*                                                                           */
/* OPERATIONAL DESCRIPTION:                                                  */
/*     This function uses the al_chnge change descriptor as its              */
/*     input.  It then scans the al_wtdrv and al_wtpth queues                */
/*     for requests which are effected by the resource change and            */
/*     takes action as shown below:                                          */
/*                                                                           */
/*     Type of Change            Action During Scan                          */
/*     --------------            ------------------                          */
/*                                                                           */
/*     (a)  SUB_DRIV             if the resource is the                      */
/*                               destination of the request                  */
/*                               reject it                                   */
/*                                                                           */
/*     (b)  ADD_DRIV             allocate drive to request and               */
/*                               then satisfy path request or                */
/*                               place in al_wtpth  queue                    */
/*                                                                           */
/*     (c)  SUB_PATH             if distance from source to                  */
/*                               destination of the requested                */
/*                               path is NO_CNECT, reject                    */
/*                                                                           */
/*     (d)  ADD_PATH             if the effected LSM(s) meet                 */
/*                               the usefulness criterion                    */
/*                               (see below), try to satisfy                 */
/*                               request                                     */
/*                                                                           */
/*     (e)  ADD_SLOT             same a (d) above; plus check                */
/*                               for LSM pend offline - go to                */
/*                               offline if all deallocated                  */
/*                                                                           */
/* Usefulness criterion:                                                     */
/* --------------------                                                      */
/* Addition of path resources are only useful to a request if                */
/* the addition meets the following criterion:                               */
/*                                                                           */
/*     The length of a path from source to destination of                    */
/*     the request which includes the additional resource                    */
/*     should be no more than one (1) LSM longer than the                    */
/*     distance from source to destination found in the                      */
/*     al_dists distance table.                                              */
/*                                                                           */
/*     This test checks that the resource can actually be used in            */
/*     a path so that a full set of paths need not be generated              */
/*     just to find that the resource does not lie on a usable               */
/*     path.                                                                 */
/*                                                                           */
/*     If the change (a) and (b) are taken where necessary,                  */
/*     and actions (a) and (b) are taken where necessary,                    */
/*     Otherwise, the al_wtpth is scanned from oldest to newest              */
/*     request. The actions shown above are applied to the                   */
/*     requests. If this function tries to satisfy a path request            */
/*     (the resource addition met the usefulness criterion)                  */
/*     al_paths() is called to find an allocatable path. If there            */
```

```
Aug 18 1995 10:54:48              al_repth.c                          Page 2

/*     is one, it is allocated (see al_rqpth()). Otherwise, the              */
/*     scan continues until all outstanding path requests have               */
/*     been checked.                                                         */
/*                                                                           */
/*     If this function satisfies the eldest queued request,                 */
/*     al_preal() is called to preallocate a path for the next               */
/*     oldest request.                                                       */
/*                                                                           */
/* PREREQUISITES:                                                            */
/*   - the queues al_wtpth and al_wtdrv have been initialized                */
/*   - the table gl_dcnfg has been initialized                              */
/*                                                                           */
/* SPECIAL CONSIDERATIONS:                                                   */
/*   (none)                                                                  */
/*                                                                           */
/* PARMS IN: struct al_chnge                                                 */
/*                                                                           */
/*         TYPE      NAME               RANGE/DESCRIPTION                    */
/*         ----      ----               -----------------                    */
/*                                                                           */
/* RET VALS: void    (none)             change descriptor                    */
/*                                                                           */
/* EXT_VARS:         al_wtpth           ATHS configuration table   (RW)      */
/*                   al_wtdrv           wait on drive alloc queue  (RW)      */
/*                   gl_dcnfg           ATHS configuration table   (RW)      */
/*                   al_dists[]         LSM to LSM distance table  (R)       */
/*                                                                           */
/* H/W REGS:         (none)                                                  */
/*                                                                           */
/* FUNCTNS:          al_preal()         preallocate path slots               */
/*                   al_paths()         find an LSM to LSM path              */
/*                   mt_rblok()         Sys Call - release memory block      */
/*                   mt_post()          Sys Call - post mailbox message      */
/*                                                                           */
/* HISTORY:                                                                  */
/*   07/16/85   fgm   Prologue created                                       */
/*   07/23/85   fgm   Prologue reviewed                                      */
/*   01/15/86         Code completed                                         */
/*                                                                           */
/********** END OF PROLOGUE **************************/ include <com.h>
include <com_extern.h>
include <alc_extern.h> void al_repth(    struct alchange *al_chnge) /* ptr to change descriptor */
{
    UCHAR clsm;                             /* Main LSM ID             */
    UCHAR tlsm;                             /* secondary LSM ID        */
    UCHAR slsm;                             /* secondary LSM ID        */
    register int templ;                     /* temporary value         */
    int temp2;                              /* temporary value         */
    UCHAR errlsm;                           /* LSM in error            */
    int rcode;                              /* return code             */ struct COM_LINK *lptr;                  /* pointer to a link in a list  */
    struct COM_LINK *prev;                  /* pointer to previous link     */
    struct COM_LINK *tptr;                  /* temp pointer to link in list */
    struct allc_req *req;                   /* pointer to an alloc request  */
    struct allc_pth *pptr;                  /* pointer to an allocated path */
```

```
al_repth.c                                                              Page 3

* initialize the LSM for which the change occured
 */
clsm = al_chnge->main_lsm;

if ( al_chnge->change & SUB_DRIV )
{
    /*
     * There has been the loss of a drive - see if any request is
     * waiting for it
     * Note: Only requests for mounts (drive is destination) are
     *       placed in this queue
     */
    prev = NULL;
    lptr = al_wtdrv[ clsm ].first;
    while ( lptr != NULL )
    {
        req = (struct allc_req *) lptr -> lnk_data[ 0 ];
        if ( ( req -> qualif_2 & (PLC_TAPU | PLC_DRID) ) ==
                al_chnge->main_id )
        {
            /*
             * Reject request waiting on lost drive
             */
            al_delst( &al_wtdrv[ clsm ], prev, lptr, PRT_WD4 );
            al_drop( req, NOT_ALLC, NOT_ALLC, NOT_ALLC );
            al_rejct( req, clsm, R_ALNCOM,al_utape( req ->qualif_2, clsm ) );
            break;    /* out of while */
        }
        /*
         * If this wasn't the drive, try the next link
         */
        prev = lptr;
        lptr = lptr -> next_lnk;
    }
} if ( al_chnge->change & ADD_DRIV )
{
    /*
     * A drive has been deallocated - check for waiting request
     * Note: only mounts (drive is destination) are queued
     */
    prev = NULL;
    lptr = al_wtdrv[ clsm ].first;
    while ( lptr != NULL )
    {
        req = ((struct allc_req *)(lptr -> lnk_data[ 0 ] ));
        al_compute_new_priority( req, Alc_Drive_Priority);
        if ( (req -> qualif_2) & (PLC_TAPU|PLC_DRID)) ==
                al_chnge->main_id )
        {
            /*
             * Found a task waiting - try to allocate drive
             */
            rcode = al_adriv(clsm, (al_chnge->main_id)&PLC_TAPU) >> 2,
                        (al_chnge->main_id) & PLC_DRID, req -> req_task,
                        FALSE, TRUE, TRUE );
            switch( rcode )
            {
                case FAIL:
                    /*
                     * Couldn't allocate it - just wait
                     */
                    break;

case RET_OK:
```

```
al_repth.c                                                              Page 4

/*
                     * Allocated it - try for the rest of the path
                     */
                    req -> prim_lsm |= PLC_ARND;
                    al_tstmp( req, TS_XPRT );
                    al_delst( &al_wtdrv[ clsm ], prev, lptr, PRT_WD4 );
                    al_eqpth( req );
                    break;

default:
                    /*
                     * Drive not available - reject the request
                     */
                    al_delst( &al_wtdrv[ clsm ], prev, lptr, PRT_WD4 );
                    al_drop( req, NOT_ALLC, NOT_ALLC, NOT_ALLC );
                    al_rejct( req, clsm, rcode,
                            al_utape( req -> qualif_2, clsm ) );
                    break;
            }
            /*
             * This drive was found so we can exit from the loop
             */
            break;
        }
        /*
         * If we didn't find the drive try the next link
         */
        prev = lptr;
        lptr = lptr -> next_lnk;
    }
} if ( al_chnge->change & SUB_PATH )
{
    /*
     * An LSM or PTP has died - make sure all outstanding requests
     * are still possible
     */
    prev = NULL;
    lptr = al_wtpth.first;
    while ( lptr != NULL )
    {
        req = (struct allc_req *)(lptr -> lnk_data[ 0 ]);
        tlsm = ( req -> prim_lsm ) & LSM_MASK;
        slsm = req -> qualif_0;
        if ( ( al_dists[ tlsm ] [ ( slsm ) == NO_CNECT ) ||
                ( tlsm == clsm ) || ( slsm == clsm ) )
        {
            /*
             * This path is no longer possible - reject the request
             */
            tptr = lptr -> next_lnk;
            al_delst( &al_wtpth, prev, lptr, PRT_WD2 );
            al_drop( req, NOT_ALLC, NOT_ALLC, NOT_ALLC );
            rcode = al_nopth( tlsm, slsm, &errlsm );
            al_rejct( req, errlsm, rcode, NULL );

lptr = tptr;
            continue;
        }
        /*
         * Try the next request on the list as well
         */
        prev = lptr;
        lptr = lptr -> next_lnk;
    }
}
```

```
if ( al_chnge->change & ( ADD_PATH | ADD_SLOT ) )
{
    /*-------------------------------------------------------------
     * The new LSM, PTP or FTP slot is available - check path
     * requests for requests that might utilize the new resource;
     * when one is found attempt to allocate a path for it
     *-------------------------------------------------------------*/
    prev = NULL;
    lptr = al_wtpth.first;
    while ( lptr != NULL )
    {
        req = (struct alc_req * )(lptr -> lnk_data[ 0 ]);
        al_compute_new_priority( req, Alc_Path_Priority );
        tlsm = ( req -> prim_lsm ) & LSM_MASK;
        slsm = req -> qualif_0;

if ( ( templ = al_dists[ tlsm ][ clsm ] ) != NO_CNECT )
        if ( ( ( temp2 = al_dists[ clsm ][ slsm ] ) != NO_CNECT )
        if (((templ + temp2) <= (al_dists[ tlsm ][ slsm ] + 1))
        {
            /*-------------------------------------------------------
             * The change might be useful to this request -
             * try allocating the path
             *-------------------------------------------------------*/
            templ = al_paths( tlsm, slsm,
                            (prev == NULL) ? AGED : NOTAGED,
                            &pptr, &errlsm, req -> req_task );
            switch ( templ )
            {
            case YES:
                /*--------------------------------------------------
                 * path is allocated - send grant to request
                 *--------------------------------------------------*/
                tptr = lptr -> next_lnk;
                al_tstmp( req, TS_PATH );
                al_delst( &al_wtpth, prev, lptr, PRT_WD2 );
                al_rspnd ( req, tlsm, (int)pptr, NULL, NULL );
                lptr = tptr;
                continue;

case NO:
                /*--------------------------------------------------
                 * Path is still not available - no op
                 *--------------------------------------------------*/
                sys_msg_release( (char *)pptr );
                break;

default:
                /*--------------------------------------------------
                 * Path is no longer possible - reject req
                 *--------------------------------------------------*/
                tptr = lptr -> next_lnk;
                al_delst( &al_wtpth, prev, lptr, PRT_WD2 );
                al_drop( req, NOT_ALLC, NOT_ALLC, NOT_ALLC );
                al_reject( (struct alc_req *)lptr -> lnk_data[ 0 ],
                            errlsm, templ, NULL );
                lptr = tptr;
                continue;
            }
        }
        /*-----------------------------------
         * Try the next request on the list
```

```
         *-----------------------------------*/
        prev = lptr;
        lptr = lptr -> next_lnk;
    }
}
return;
}
```

```
Aug 18 1995 10:54:48                    al_rejct.c                         Page 1 static char rcsid[]="$Header: /home/twolf/davet/alc/RCS/al_rejct.c,v 1.2 1993/02/23 1
7:50:16 aarond Exp $";
/* FUNCTION NAME:     static al_rejct()
**
** FUNCTION TITLE:    Reject an Allocation Request
**
** FUNCTIONAL DESCRIPTION:
**    This function accepts a pointer to an Allocation Request,
**    an LSM ID which was responsible for the rejection (if
**    any), a rejection category, an error code and a rejection
**    extension. An Allocation Rejection is issued to the
**    requesting task.
**
** OPERATIONAL DESCRIPTION:
**    This function accepts a request, a reject category, an
**    error code and an extension modifier. The rejection sent
**    to the requesting task follows the format for rejections
**    shown in the file descriptor. The first byte is zero,
**    indicating the rejection; the second byte is the original
**    request; the third byte is the LSM which caused the proble
**    (if any); the fourth and fifth bytes contain the reject
**    category and the error code. Any extension to the reject
**    is placed in the sixth byte.
**
**    The constructed rejection is posted to the task which
**    originated the request. The rejection is created in the
**    same memory block used for the original request.
**
** PREREQUISITES:
**    - a request has been received which cannot be filled
**
** SPECIAL CONSIDERATIONS:
**    (none)
**
**              TYPE      NAME           RANGE/DESCRIPTION
**              ----      ----           -----------------
** PARMS IN:    struct    *request       the allocation request ptr
**              short     rj_lsm         the rej causing LSM(or NO_LSM)
**              int       rj_ecode       the rejection category/error
**              short     rj_ext         the rejection extension
**
** RET VALS:    void      (none)
**
** EXT VARS:              (none)
**
** H/W REGS:              (none)
**
** FUNCTNS:    mt_post()              post message to mailbox
**
** HISTORY:
** 01/07/86    fgm    Prologue created
** --/--/--    fgm    Prologue reviewed
** 01/20/86    fgm    Code completed
**
************************* END OF PROLOGUE **************************/ include <ccom.h>
include "alc.h"
#include <ccom_extern.h>
include <alc_extern.h> void al_rejct(struct alc_req *request, /* ptr to orig request */
              short rj_lsm,            /* LSM ID              */
              int rj_ecode,            /* Rejection error code */
              short rj_ext)            /* Rejection extension */
```

```
Aug 18 1995 10:54:48                    al_rejct.c                         Page 2

{
    register struct alc_rej *rejctn; /* pointer to rej buffer */
    UINT32 mailbox;                   /* mailbox address      */

/*---------------------------------------------------------------
    * Get the mailbox address of the requesting task
    *---------------------------------------------------------------*/
    mailbox = ( (UINT32) (request -> req_task) );

/*---------------------------------------------------------------
    * Equate the rejection buffer to the request buffer
    *---------------------------------------------------------------*/
    rejctn = ( struct alc_rej * ) request;

/*---------------------------------------------------------------
    * Fill in the rejection with the parameters
    *---------------------------------------------------------------*/
    rejctn -> rej_typ  = request -> req_typ & 0x0F;
    rejctn -> rej_byte = ARQ_REJ;
    rejctn -> rej_lsm  = rj_lsm;
    rejctn -> rej_ecod = rj_ecode;
    rejctn -> rej_extn = rj_ext;

/*---------------------------------------------------------------
    * Trace the rejection
    *---------------------------------------------------------------*/
    al_trace('R','J', (struct alc_req *)rejctn );

/*---------------------------------------------------------------
    * Post the rejection to the requesting task
    *---------------------------------------------------------------*/
    sys_msg_send( mailbox, (char *)rejctn, SYS_NORMAL );

return;
}
```

```
Aug 18 1995 10:54:48              al_reallocate.c                                  Page 1 static char rcsid[]="$Header: /home/twolf/davet/alc/RCS/al_reallocate.c,v 1.10 1993/0
6/30 16:27:58 davet Exp $";
/**************  START OF PROLOGUE  ****************************************
 *
 *                          StorageTek SECRET
 *                   Property of Storage Technology Corporation
 *                   Do not copy or distribute unpublished work
 *
 *                          Copyright (1991)
 *                       Storage Technology Corporation
 *                           All Rights Reserved
 *
 * FUNCTION NAME:   (local) al_reallocate_request( )
 *
 * FUNCTIONAL DESCRIPTION:
 *
 *   This function performs a reallocation request.  Reallocation is
 *   for a process which holds a resource.  On a reallocation
 *   request, the process sends a request to keep that resource.  If
 *   it is still the highest priority request, it keeps resource.  If
 *   it's not, the process is put on the appropriate wait queue, and
 *   the resource is granted to the highest priority process.
 *
 *   Some requests require a reallocation of the arm and a new
 *   request of a pass through port mechanism.  If the pass through
 *   port can be allocated immediately, and the process is still the
 *   highest priority, a response is returned immediately.  If one of
 *   these conditions is not true, the request is enqueued on the
 *   appropriate wait queue, and the resource is given to the highest
 *   priority process.
 *
 * RETURN VALUES:
 *   none
 *
 ==========================================================================
 * OPERATIONAL DESCRIPTION:
 *
 *   This function first looks at different request types.
 *   Currently only ARQ_ARHD (arm and hand), ARQ_ARPM (arm and ptp
 *   mech) and ARQ_ARM (arm) are supported.  For ARQ_ARM, the request
 *   attempts to allocate the PTP mechanism, and allocates it if
 *   immediately available. It then falls through to ARQ_ARM
 *   processing, where the priority is compared to that on the top of
 *   the queue.  If it's still the highest priority, permission is
 *   granted to continue.  Otherwise, (and if the ptp could not be
 *   immediately allocated), the request is enqueued and the new arm
 *   is rescheduled.
 *
 *   Processing for an arm and a hand is similar to just an arm,
 *   although both resources must still be the highest priority for
 *   the permission to be granted.  Otherwise both the arm and hand
 *   are released, and the resources are rescheduled.
 *
 **************  End OF PROLOGUE  ****************************************/

/* HEADER FILES included for prototypes, structures, and defines
--------------------------------------------------------------------------*/
#include "com.h"
include "alc.h"
#include "log_user.h"
```

```
Aug 18 1995 10:54:48              al_reallocate.c                                  Page 2 include "com_extern.h"
include "alc_extern.h"

void al_reallocate_request( struct alc_req *request )
{
    UCHAR lsm = request -> prim_lsm;    /* lsm id */ const enum alc_allocation_requests req = /* type of request */
        request -> req_typ;

UCHAR time_stamp_category = TS_XPRT; /* default time stamp is transport */
    /*-----------------------------------------------------------------------
     * look at the first request, if any, on the hand and arm queues
     *---------------------------------------------------------------------*/
    struct alc_req *first_arm_req = (al_wtarm[lsm].first != NULL ) ?
      ( (struct alc_req *) al_wtarm[lsm].first->lnk_data[REQUEST] ) : NULL;

struct alc_req *first_hand_req = (al_wthnd[lsm].first != NULL ) ?
      ( (struct alc_req *) al_wthnd[lsm].first->lnk_data[REQUEST] ) : NULL;

BOOLEAN remains_highest_arm_req;   /* if this is the highest priority */
    BOOLEAN remains_highest_hand_req;  /* request, these are true */ const UCHAR t_id = request -> req_task; /* task id of requesting task */
    /*-----------------------------------------------------------------------
     * If we need to reenqueue, these variable show which queue to put it on,
     * how to recompute it, and what is changed for reevaluating requests.
     *---------------------------------------------------------------------*/
    struct COM_LNK_LIST *wait_list;     /* arm wait queue */
    enum alc_priority_computation priority_comp;  /* how to compute priority */
    UINT16 change = ADD_ARM;
    UCHAR hand_id  = NOT_ALLC;
    UCHAR primary_lsm = NOT_ALLC;
    UCHAR port_id  = NOT_ALLC;

const int rcode =                   /* return code storage */
        gl_dcnfg[ lsm ].lsm.lsm_stat;

BOOLEAN enqueue = TRUE;       /* enqueue (T) or respond immediately (F) */
    /*-----------------------------------------------------------------------
     * see if this reallocation request is still the highest arm and hand
     *---------------------------------------------------------------------*/
    remains_highest_arm_req = (first_arm_req == NULL) ||
        ( request->priority >=
          al_compute_new_priority( first_arm_req, Alc_Arm_Priority ) ) ;

remains_highest_hand_req = ( first_hand_req == NULL ) ||
        ( request->priority >=
          al_compute_new_priority ( first_hand_req, Alc_Hand_Priority ) );
    /*-----------------------------------------------------------------------
     * Break out requests according to type
     *---------------------------------------------------------------------*/
    switch ( req )
    {
        case ARQ_ARHD:
          hand_id = request -> qualif.3;    /* arm and hand both need reallocation */
          /* check if we're still the highest arm and hand priority
          *---------------------------------------------------------------------*/
          if ( remains_highest_arm_req && remains_highest_hand_req )
          {
              enqueue = FALSE;
```

```
                                                                    al_reallocate.c                    Page 3
        }
        else
        {
            /*----------------------------------------------------------------
             * deallocate the hand, and prepare to enqueue
             *----------------------------------------------------------------*/
            gl_dcnfg[ lsm ].hand[hand_id].hand_sts &= ~DCA_ALLC;
            wait_list = &al_wtmch[ withnd_lsm ]; /* hand wait queue */
            priority_comp = Alc_Hand_Priority;
            change |= ADD_HAND;
        }
        break;

case ARQ_ARPM:                                  /* arm, ptp mech */
        /*--------------------------------------------------------------------
         * In this case, we need a pass through port mechanism.  If we get it,
         * and the arm's request is still the highest, we send back an immediate
         * response.  Otherwise, the request is enqueued for the ptp mech, and
         * the arm is released.
         *--------------------------------------------------------------------*/
        switch ( al_apmch( lsm, request -> qualif_0, t_id,
                           &primary_lsm, &port_id ) )
        {
        case RET_OK:
            if ( remains_highest_arm_req )
            {
                enqueue = FALSE;
            }
            else
            {
                wait_list = &al_wtmch[ lsm ];  /* arm wait queue */
                priority_comp = Alc_Arm_Priority;
                hand_id = request -> qualif_3;
                if ( port_id != NOT_ALLC )
                {
                    port_id |=
                        ( ( primary_lsm == lsm ) ? PRM_MSTR : SCN_MSTR );
                }
            }
            break;

case FAIL:
            wait_list = &al_wtmch[ primary_lsm ];  /* ptp wait queue */
            hand_id = request->qualif_3;
            port_id = NOT_ALLC;
            priority_comp = Alc_Mech_Priority;
            time_stamp_category = TS_PATH;
            break;

default:
            /*----------------------------------------------------------------
             * Port mechanism not available - reject the request
             *----------------------------------------------------------------*/
            al_drop( request, NOT_ALLC, NOT_ALLC, NOT_ALLC );
            al_reject( request, primary_lsm, tcode, NULL );
            /*----------------------------------------------------------------
             * deallocate the arm and return
             *----------------------------------------------------------------*/
            gl_dcnfg[lsm].arm.arm_stat &= ~DCA_ALLC;
            return;
        }
        break;                           /* break out of outer switch */ case ARQ_ARM:                        /* only arm */
```

```
                                                                    al_reallocate.c                    Page 4
        /*--------------------------------------------------------------------
         * check if we're the highest priority arm request
         *--------------------------------------------------------------------*/
        if ( remains_highest_arm_req )
        {
            enqueue = FALSE;
        }
        else
        {
            wait_list = &al_wtarm[ lsm ];    /* arm wait queue */
            priority_comp = Alc_Arm_Priority;
            hand_id = request -> qualif_3;
        }
        break;

default:
        /*--------------------------------------------------------------------
         * no other realloc requests are supported
         *--------------------------------------------------------------------*/
        log_user_lmu_error_data( ERR_BAD_SWITCH, (UCHAR *)&req, sizeof( UCHAR ) );
        sys_fatal( ERR_FAULTY_DISPOSITION );
        break;
    } if ( enqueue )
    {
        struct COM_LINK *lptr;            /* new list element */
        struct alchange al_chnge;         /* type of change */

/*--------------------------------------------------------------------
         * Either we did not get the ptp mech, or
         * another task at a higher priority is waiting for the arm/
         * give back the arm, put this request on the appropriate queue, and
         * reschedule
         *--------------------------------------------------------------------*/

/*--------------------------------------------------------------------
         * deallocate the arm
         *--------------------------------------------------------------------*/
        gl_dcnfg[lsm].arm.arm_stat &= ~DCA_ALLC;

/*--------------------------------------------------------------------
         * put this request on the appropriate linked list
         *--------------------------------------------------------------------*/
        lptr = al_enlist( wait_list, PRT_WD4, request, priority_comp );
        lptr -> lnk_data[ AHAND_ID ] = hand_id;
        lptr -> lnk_data[ APTP_ID ] = port_id;

al_tstmp( request, time_stamp_category );
        /*--------------------------------------------------------------------
         * reschedule with new arm
         *--------------------------------------------------------------------*/
        al_chnge.change = change;
        al_chnge.main_lsm = lsm;
        al_retrn( &al_chnge );
    }
    else
    {
        al_rspnd(request, lsm, hand_id, primary_lsm, port_id );
    }
}
```

```
static char resid[]="$Header: /home/twolf/davet/alc/RCS/al_preal.c,v 1.3 1993/02/23 1
7:50:09 earond Exp $";
/* FUNCTION NAME:   static al_preal()

/* FUNCTION TITLE:  Preallocate Path for Eldest Request

/* FUNCTIONAL DESCRIPTION:
/*    This function is called without arguments. It
/*    pre-allocates a path for the allocation request which has
/*    been in the al_wtpth queue the longest. The resources
/*    that are preallocated may be used only by the eldest
/*    request but need not be allocated immediately.

/* OPERATIONAL DESCRIPTION:
/*    This function initially scans the gl_dcnfg table and
/*    resets the preallocation status bit of all slots. The
/*    oldest allocation request is passed to the al_paths()
/*    function to determine the best path for this request.
/*    Parts of that path may already be allocated to other
/*    tasks. The path is preallocated in its entirety so that
/*    those slots which are free remain free and those slots
/*    which are now allocated become the property of the eldest
/*    job when they do become free. Slots are preallocated by
/*    setting the appropriate port descriptor slot preallocation
/*    bit in gl_dcnfg.

/* PREREQUISITES:
/*    - the gl_dcnfg  table must be initialized
/*    - the al_wtpth  queue and its pointers must be initialized /* SPECIAL CONSIDERATIONS:
/*    (none)

/*                  TYPE    NAME           RANGE/DESCRIPTION
/*                  ----    ----           -----------------
/* PARMS IN:        (none)
/* RET VALS: void   (none)
/* EXT VARS:        al_wtpth               wait path alloc queue           (R)
/*                  gl_dcnfg               port allocation table           (RW)
/* H/W REGS:        (none)
/* FUNCTNS:         al_paths()             find LSM to LSM path /* HISTORY:
/*    07/16/85  fgm  Prologue created
/*    07/23/85  fgm  Prologue reviewed
/*    01/15/86  fgm  Code completed

/**************************** END OF PROLOGUE *********************/ include <com.h>
include "alc.h"

#include <com_extern.h>
include <alc_extern.h> void al_preal( void )
{
    register int tmp1;                 /* temporary value              */
    struct allc_pth *path;             /* pointer to an allocate path  */
    struct allc_req *req;              /* pointer to allocate request  */

UCHAR errlsm;                      /* LSM in error                 */
```

```
    /*------------------------------------------------------------------
     * If there is a preallocated path clear it and drop block
     *-----------------------------------------------------------------*/
    path = al_ppath;

if ( path != NULL )
    {
        for ( tmp1 = 0; tmp1 < ((path -> lsm_cnt) - 1); ++tmp1 )
        {
            gl_dcnfg[ path -> lsm_ids[tmp1] ].ptp[path -> ptp_ids[tmp1]].
                slot[ path -> ptp_slot[ tmp1 ] ].slot_sta &= ~DCS_PREA;
            gl_dcnfg[path -> lsm_ids[tmp1+1] ].ptp[path -> ptp_adj[tmp1]].
                slot[ path -> ptp_slot[ tmp1 ] ].slot_sta &= ~DCS_PREA;
        }
        sys_msg_release( (char *)al_ppath );
        al_ppath = path = NULL;
    }

/*------------------------------------------------------------------
     * Now preallocate path for the oldest waiting request
     *-----------------------------------------------------------------*/
    while ( ( al_wtpth.first != NULL ) && ( al_ppath == NULL ))
    {
        req  = ( struct allc_req * ) al_wtpth.first -> lnk_data[ 0 ];
        tmp1 = al_paths( ( req -> prim_lsm ) & LSM_MASK,
                         ( req -> qualif_0, AGED, &al_ppath, &errlsm,
                         req -> req_task );

switch ( tmp1 )
        {
            case YES:
                /*------------------------------------------------------
                 * path is allocated - send grant to request
                 *------------------------------------------------------*/
                al_dlst( &al_wtpth, NULL, al_wtpth.first, PRT_WD2 );
                al_rspnd ( req, ( req -> prim_lsm ) & LSM_MASK,
                           (int)al_ppath, NULL, NULL );
                al_ppath = NULL;
                break;

case NO:
                /*------------------------------------------------------
                 * Path is not avail - preallocate it
                 *------------------------------------------------------*/
                path = al_ppath;
                for ( tmp1 = 0; tmp1 < ((path -> lsm_cnt)-1); ++tmp1 )
                {
                    gl_dcnfg[ path -> lsm_ids[tmp1] ].ptp[path ->
                                       ptp_ids[tmp1]].slot[ path ->
                tp_slot[ tmp1 ] ].
                                                         slot_sta != DCS_PREA;
                    gl_dcnfg[path -> lsm_ids[tmp1+1] ].ptp[path ->
                                       ptp_adj[tmp1]].slot[ path ->
                ptp_slot[ tmp1 ] ].
                                                         slot_sta != DCS_PREA;
                }
                break;

default:
                /*------------------------------------------------------
                 * Path is no longer possible - reject req
                 *------------------------------------------------------*/
                al_drop( req, NOT_ALLC, NOT_ALLC, NOT_ALLC );
                al_dlst( &al_wtpth, NULL, al_wtpth.first, PRT_WD2 );
                al_reject( req, errlsm, tmp1, NULL );
                break;
        }
    }
}
```

```
}
return;
}
```

```
Aug 18 1995 10:54:48                          al_paths.c                                      Page 1
static char rcsid[]="$Header: /home/twolf/davet/alc/RCS/al_paths.c,v 1.7 1993/06/07 1
8:01:41 asrond Exp $";
/* FUNCTION NAME:    static al_paths()

FUNCTION TITLE:   Find a Path from LSM to LSM

FUNCTIONAL DESCRIPTION:
      This function accepts as arguments a beginning LSM and an
      ending LSM. It returns a pointer to the best path that it
      could find from the first LSM to the second. This path is
      either currently allocated, or, if not, is currently
      unavailable but guaranteed to be of minimal length. A
      status byte is returned indicating which type of path is
      returned. A third argument indicates whether or not the
      request is allowed to use preallocated slots (ie, this is
      the oldest request). The fourth argument points to a
      location where a pointer to the path is to be placed.

OPERATIONAL DESCRIPTION:
      This function uses the gl_dcnfg data structure to build
      the best path from the source LSM to the destination LSM.
      It begins at the source LSM and starts to build all
      possible paths to the destination LSM. If no slot is
      available for a given path, that path is abandoned. The
      shortest available path is kept, other complete paths are
      discarded. When all paths have been explored, a pointer to
      the current shortest path is returned.

If it should happen that no path is currently available, a
      new path is created by moving as directly as possible from
      the source to destination LSM. The path contains as many
      allocatable slots as possible, but also contains some
      slots which are already allocated to other tasks. The
      status of the path indicates that it cannot currently be
      allocated.

The path has the format shown in the file descriptor.

PREREQUISITES:
      - the gl_dcnfg table has been initialized

SPECIAL CONSIDERATIONS:
      (none)

TYPE          NAME         RANGE/DESCRIPTION
              ----          ----         -----------------
   PARMS IN:  short         src_lsm      source LSM id (0-15)
              short         dst_lsm      destination LSM id (0-15)
              int           aged         AGED - use preallocated slots
                                         NOTAGED - can't use prealloc
              struct **ret_path           location to put path pointer
              int           *errlsm      LSM in error
              u shrt        task         Task ID for request RET VALS:  int           YES          path is allocatable
                            NO           not allocatable - short path
                            R_ALNONY     no possible path
                            R_ALNRDY     LSM not ready
                            R_ALMNT      LSM in maintenance mode
                            R_ALOFF      LSM OFFLINE EXT VARS:                gl_dcnfg     ATHS configuration table      (R)
                            al_dists()   LSM to LSM distance table     (R)
*/
```

```
Aug 18 1995 10:54:48                          al_paths.c                                      Page 2
/* H/W REGS:   (none)
   FUNCTNS:    mt_gblok()       System call - get memory block HISTORY:
   07/16/85  fgm  Prologue created
   07/23/85  fgm  Prologue reviewed
   01/15/86  fgm  Code completed
********************** END OF PROLOGUE ***************************/ include "com.h"
include "alc.h"
#include "cmg_user.h"
#include "com_extern.h"
include "alc_extern.h"

int al_paths(UCHAR src_lsm,
             UCHAR dst_lsm,
             int aged,
             struct alc_pth **ret_path,  /* place to put path pointer */
             UCHAR *errlsm,              /* LSM with problem */
             UCHAR task)  /* task ID for request */
{
    static struct alc_pth  *path;  /* path pointer */
    struct dcf_ptp         *ptpdscr; /* pointer to PTP descrp*/
    UCHAR clsm;                     /* current LSM in path */
    UCHAR tlsm;                     /* temporary LSM ID */
    signed int path_length;         /* path length (yes, signed) */
    UCHAR ptpx;                     /* current PTP ID */
    int cnt1;                       /* general counter */
    int stat;                       /* status */
    int fullslot;                   /* full slot count */
    int maxslot;                    /* maximum slots in PTP */ enum path_finshed
    {
        NOTDONE,        /* not done - no closer*/
        GOTPATH,        /* finished success */
        PFAIL,          /* total failure */
        ADVANCE         /* closer to goal */
    } finflag;

enum path_type
    {
        CONVRG,         /* convergent paths */
        NODIVRG,        /* nondivergent paths */
        DIRECT          /* direct path (not av)*/
    } passflag;

static BOOLEAN used[ MAXLSM ]; /* used in path flags */

/*
     * If there is no way to get there from here - FAIL
     */
    if ( al_dists[ src_lsm ] [ dst_lsm ] == NO_CNECT )
    {
        /*
         * Check to see who is at fault and why
         */
        cnt1 = al_nopth( src_lsm, dst_lsm, errlsm );
        return( cnt1 );
    }
    /*
```

```
                                                                        al_paths.c                                    Page 3

* Get a block to put the path in
 */
sys_msg_alloc( sizeof( struct allc_pth ), (char **)&path );
/*
 * if source is same as destination then ok the request
 */
if ( src_lsm == dst_lsm )
{
    path -> lsm_cnt = 1;
    path -> lsm_ids[ 0 ] = src_lsm;
    *ret_path = path;
    return( YES );
}
/*--------------------------------------------------------------------*/
/* initialize path to source LSM, do converging paths first           */
/*--------------------------------------------------------------------*/
clsm = path -> lsm_ids[ 0 ] = src_lsm;
ptpx = path -> path_length = 0;
al_ptpdl = FALSE;
finflag = NOTDONE;
passflag = CONVRG;
for ( cnt1 = 0; cnt1 < MAXLSM; ++cnt1 )
    used[ cnt1 ] = FALSE;
used[ clsm ] = TRUE;
while ( finflag == NOTDONE )
{
    /*----------------------------------------------------------------*/
    /* We are looking for an operative PTP that gets us closer        */
    /* to the destination LSM (or not farther if NONDIVRG)            */
    /*----------------------------------------------------------------*/
    ptpdsc = &( gl_dcnfg[ clsm ].ptp[ ptpx ] );
    if( ptpdsc -> ptp_stat & DCP_OPER )
    {
        tlsm = ptpdsc -> ptp_adj;
        if( ( al_dists[tlsm][dst_lsm] <
              al_dists[clsm][dst_lsm] + ( passflag == NODIVRG ) ? 1 : 0 ) ) &&
            !used[tlsm] )
        {
            fullslot = 0;
            maxslot = ( ( cmg_get_lsm_type( clsm ) == MT_TIMWF ) ||
                        ( cmg_get_lsm_type( tlsm ) == MT_TIMWF ) ) ? MAXSLOT_TW : M
AXSLOT:
            for ( cnt1 = 0; cnt1 < maxslot; ++cnt1 )
            {
                /*
                 * Closer - now find an allocatable slot ( do not care
                 * about preallocation if AGED or anything if we are
                 * going DIRECT ) BUT cannot use it for anything if it
                 * is FULL (and not allocated)
                 */
                stat = ptpdsc -> slot[ cnt1 ].slot_sta;
                if( ( ( passflag == DIRECT ) ||
                      ( !(stat & (DCS_ALLC | ( aged ? 0 : DCS_PREA ) ) ) ) ) &&
                    ( (stat & (DCS_FULL | DCS_ALLC) ) != DCS_FULL) )
                {
                    /*
                     * got a slot - check for arrival
                     */
                    used[ tlsm ] = TRUE;
                    path -> ptp_ids[ path_length ] = ptpx;
                    path -> ptp_slot[ path_length ] = cnt1;
```

```
                                                                        al_paths.c                                    Page 4 path -> ptp_adj[ path_length ] = ptpdsc -> ptp_adj;
                    path -> lsm_ids[ ++path_length ] = tlsm;
                    finflag = ( tlsm == dst_lsm ) ? GOTPATH : ADVANCE;
                    break;
                }
                else
                    if ( ( passflag == DIRECT ) &&
                         ( (stat & (DCS_FULL | DCS_ALLC)) == DCS_FULL ) )
                    {
                        /*
                         * Check for PTP full of intransit cartridges
                         */
                        ++fullslot;
                    }
            }
            if ( fullslot == maxslot )
            {
                /*
                 * We have a full pass-thru port of intransits
                 */
                al_ptpdl = TRUE;
                if( ptpdsc -> ptp_stat & DCP_BOSS )
                {
                    al_dlsm = clsm;
                    al_dlpnl = ptpdsc -> ptp_pnnl;
                }
                else
                {
                    al_dlsm = tlsm;
                    al_dlpnl = gl_dcnfg[ tlsm ].
                              ptp[ ptpdsc -> ptp_adj ].ptp_pnnl;
                }
            }
        }
    }
    if ( finflag == ADVANCE )
    {
        /*
         * If closer just move pointers to new LSM
         */
        finflag = NOTDONE;
        ptpx = 0;
        clsm = tlsm;
    }
    else
    {
        if ( finflag == NOTDONE )
        {
            /*
             * If no closer then try the next PTP to get there
             */
            while ( ++ptpx >= MAXPTP )
            {
                /*
                 * If there are no more PTPs, back up - try new LSM
                 */
                if ( --path_length < 0 )
                {
                    /*
                     * If we backed up to source we can not do it,
                     * Try the next pass with easier criteria
                     */
                    if ( ++passflag > DIRECT )
                    {
                        /*
                         * If there are no more passes, we are dead
                         */
```

```
                    finflag = PFAIL;
                    break;
                }
                else
                {
                    clsm = src_lsm;
                    used[ clsm ] = TRUE;
                    path_length = ptpx = 0;
                    break;
                }
            }
            else
            {
                /*-------------------------------------------------------------
                 * Back up to the previous LSM and try again
                 *-------------------------------------------------------------*/
                used[ clsm ] = FALSE;
                clsm = path -> lsm_ids[ path_length ];
                ptpx = path -> ptp_ids[ path_length ];
            }
        )
    } if ( finflag == PFAIL )
    {
        /*-------------------------------------------------------------
         *If unable to find path get rid of path block and report FAIL
         * Check to see who is at fault and why
         *-------------------------------------------------------------*/
        sys_msg_release((char *) path );
        if ( al_ptpdl )
            return( R_PTPDL );

cnt1 = al_nopth( src_lsm, dst_lsm, errism );
        return( cnt1 );
    }

/*-------------------------------------------------------------
     * If got a good path set its length and pointer; report whether
     * it is allocated or not
     *-------------------------------------------------------------*/
    path -> lsm_cnt = path_length + 1;
    *ret_path = path;
    if ( passflag == DIRECT )
        return( NO );

for ( cnt1=0; cnt1 < ( path -> lsm_cnt - 1 ); ++cnt1)
    {
        gl_dcnfg[path -> lsm_ids[cnt1+1]].ptp[ path -> ptp_ids[cnt1] ].
            slot[ path -> ptp_slot[ cnt1 ] ].slot_sta != DCS_ALLC;
        gl_dcnfg[ path -> lsm_ids[cnt1] ].ptp[ path -> ptp_adj[ cnt1 ]].
            slot[ path -> ptp_slot[ cnt1 ] ].slot_tsk = task;
        gl_dcnfg[path -> lsm_ids[cnt1+1]].ptp[ path -> ptp_adj[ cnt1 ]].
            slot[ path -> ptp_slot[ cnt1 ] ].slot_sta != DCS_ALLC;
        gl_dcnfg[path -> lsm_ids[cnt1+1]].ptp[ path -> ptp_adj[ cnt1 ]].
            slot[ path -> ptp_slot[ cnt1 ] ].slot_tsk = task;
    } return( YES );
}
```

```
}
```

```
Aug 18 1995 10:54:48                    al_nopth.c                           Page 1 static char rcsid[]="$Header: /home/twolf/davet/alc/RCS/al_nopth.c,v 1.4 1993/02/23 1
7:50:03 aaroond Exp $";
/* FUNCTION NAME:    static al_nopth()                                           */
/*                                                                               */
/* FUNCTION TITLE:   Find Why No Path Exists Between LSMs                        */
/*                                                                               */
/* FUNCTIONAL DESCRIPTION:                                                       */
/*   This function accepts as arguments a beginning LSM and an                   */
/*   ending LSM.  It returns an error code indicating why no                     */
/*   path is available between those LSMs.  A pointer is passed                  */
/*   to this function so that the the LSM in error may be                        */
/*   indicated.                                                                  */
/*                                                                               */
/* OPERATIONAL DESCRIPTION:                                                      */
/*   This function uses the al_stdst[] data structure to                         */
/*   attempt to build a path from the source to destination                      */
/*   LSM. When the path cannot continue due to LSM status, arm                   */
/*   or hand status, or pass-thru port status, an error is                       */
/*   returned.                                                                   */
/*                                                                               */
/* PREREQUISITES:                                                                */
/*   - the gl_dcnfg[] table has been initialized                                 */
/*   - the al_stdst[] table has been initialized                                 */
/*                                                                               */
/* SPECIAL CONSIDERATIONS:                                                       */
/*   (none)                                                                      */
/*                                                                               */
/*             TYPE      NAME           RANGE/DESCRIPTION                        */
/*             ----      ----           -----------------                        */
/* PARMS IN:   short     src_lsm        source LSM id (0-15)                     */
/*             short     dst_lsm        destination LSM id (0-15)                */
/*             int       *errism        LSM in error                             */
/*                                                                               */
/* RET VALS:   R_ALNOWY                 no possible path                         */
/*             R_ALNRDY                 LSM not ready                            */
/*             R_ALMNT                  LSM in maintenance mode                  */
/*             R_ALOFF                  LSM OFFLINE                              */
/*                                                                               */
/* EXT VARS:   gl_dcnfg                 ATHS configuration table         (R)     */
/*             al_stdst[]               LSM to LSM distance table        (R)     */
/*                                                                               */
/* H/W HKGS:   (none)                                                            */
/*                                                                               */
/* FUNCTNS:    mt_gblok()               System Call - get memory block          */
/*                                                                               */
/* HISTORY:                                                                      */
/*   05/02/88    fgm    Prologue created                                         */
/*   --/--/--    fgm    Prologue reviewed                                        */
/*   05/02/88    fgm    Code completed                                           */
/*                                                                               */
/***********************  END OF PROLOGUE  **********************************/ include <com.h>
include "alc.h"
include <log_user.h> include <com_extern.h>
include <alc_extern.h> int al_nopth(UCHAR src_lsm,             /* source LSM ID          */
             UCHAR dst_lsm,             /* destination LSM ID     */
             UCHAR *errism)             /* LSM with problem       */
{
    struct dcf_ptp *ptpdsc;             /* pointer to PTP descriptor */
```

```
Aug 18 1995 10:54:48                    al_nopth.c                           Page 2

UCHAR clsm;                         /* current LSM in path    */
    UCHAR tlsm;                         /* temporary LSM ID       */
    UCHAR ptpx;                         /* current PTP ID         */
    unsigned int stat;                  /* status holder          */

/*--- If there's no way to get there from here - FAIL -------------------*/
    if ( al_stdst[ src_lsm ] [ dst_lsm ] == NO_CNECT )
    {
        log_user_lmu_error( ERR_ALPATH );
        return( R_ALNOWY );
    }

/*--- Check the destination LSM -----------------------------------------*/
    stat = al_lsmon[ dst_lsm ];
    if ( stat != RET_OK )
    {
        *errism = dst_lsm;
        return( stat );
    }

/*--- Initialize path to source LSM -------------------------------------*/
    clsm = src_lsm;

for ( EVER )
    {
        /*--- See if this LSM is operational --------------------------------*/
        stat = al_lsmon[ clsm ];
        if ( stat != RET_OK )
        {
            *errism = clsm;
            return( stat );
        }

/*--- If this is the destination then we made it (ERROR!!!) --------*/
        if ( clsm == dst_lsm)
        {
            *errism = clsm;
            log_user_lmu_error( ERR_ALPATH );
            return( R_ALNOWY );
        }

/*--- We are looking for a PTP that gets us closer -----------------*/
        for ( ptpx = 0; ptpx < MAXPTP; ++ptpx )
        {
            ptpdsc = & ( gl_dcnfg[ clsm ].ptp[ ptpx ] );
            if ( ! (( ptpdsc -> ptp_stat ) & DCP_EXST ))
            {
                /*--- No PTP is getting us there ???? ---------------------*/
                *errism = clsm;
                log_user_lmu_error( ERR_ALPATH );
                return( R_ALNOWY );
            }
```

```
Aug 18 1995 10:54:48                    al_nopth.c                                    Page 3

/*----------------------------------------------------------------*/
        /* Check the move to the adjacent LSH                             */
        /*----------------------------------------------------------------*/
        tlsm = ptpdsc -> ptp_adj;
        if ( al_stdst[tlsm][dst_lsm] < al_stdst[clsm][dst_lsm] )
        {
            if ( ! (( ptpdsc -> ptp_stat ) & DCP_OPER ))
            {
                /*----------------------------------------------------*/
                /* PTP in path is broken - indicate error             */
                /*----------------------------------------------------*/
                if ( ( ptpdsc -> ptp_stat ) & DCP_BOSS )
                    *errlsm = clsm;
                else
                    *errlsm = tlsm;
                return( R_ALPTP );
            }
            else
            {
                /*----------------------------------------------------*/
                /* PTP is OK - next LSH becomes current LSH           */
                /*----------------------------------------------------*/
                clsm = tlsm;
                break;
            }
        }
    }                                       /* end of for loop */

/*--------------------------------------------------------------------*/
    /* Check to see that we didn't run out of Pass-thru ports             */
    /*--------------------------------------------------------------------*/
    if ( ptpx == MAXPTP )
    {
        *errlsm = clsm;
        log_user_lmu_error( ERR_ALPATH );
        return( R_ALNOWY );
    }
}                                           /* end of for( EVER ) loop */
```

```
Aug 18 1995 10:54:48                  al_lsmop.c                                Page 1 static char rcsid[]="$Header: /home/twolf/davet/alc/RCS/al_lsmop.c,v 1.5 1993/06/07 1
8:00:43 aarond Exp $";
/* FUNCTION NAME:      static al_lsmop()
 *
 * FUNCTION TITLE:     LSM Operational - Initialize Status
 *
 * FUNCTIONAL DESCRIPTION:
 *      This function accepts an LSM ID. This function makes all
 *      pieces of the LSM operational.
 *
 * OPERATIONAL DESCRIPTION:
 *      This function accepts an LSM ID which is now operational.
 *      All elements of the lsm structure (arm, hands, CAP and PTPs)
 *      are assumed to be operational.
 *
 * PREREQUISITES:
 *      - the allocation data structures are initialized
 *
 * SPECIAL CONSIDERATIONS:
 *      (none)
 *
 *             TYPE    NAME            RANGE/DESCRIPTION
 *             ----    ----            -----------------
 * PARMS IN: struct   *lsm_cnfg        configuration of LSM
 *
 * RET VALS: int       RET_OK          LSM made operational
 *                     FAIL            LSM does not exist
 *
 * EXT VARS:          (none)
 *
 * H/W REGS:          (none)
 *
 * FUNCTNS:           (none)
 *
 * HISTORY:
 * 01/07/86   fgm    Prologue created
 * --/--/--   fgm    Prologue reviewed
 * 01/20/86   fgm    Code completed
 **************** END OF PROLOGUE **************************/ include "com.h"
include "alc.h"
#include "cmg_user.h"
#include "com_extern.h"
include "alc_extern.h"

int al_lsmop(
            UCHAR lsm_id )          /*LSM which is operational  */
{
    register int count1;             /* counter variable         */
    unsigned count2;                 /* counter variable         */
    struct dcf_ptp *ptp_ptr;         /* pointer to PTP descriptor */
    UCHAR                *stat_ptr;  /* pointer to status byte    */
    struct dcf_tapu *tpu_ptr;        /* pointer to tape unit desc */
    struct alf_dlsm *lsm_cnfg;       /* pointer to LSM config     */

/*---------------------------------------------
     * Check the operational status
     *---------------------------------------------*/
    lsm_cnfg = &( gl_dcnfg[ lsm_id ] );
    if ( ! (lsm_cnfg -> lsm.lsm_stat & DCL_EXST ) )
    {
        return( FAIL );
    }
```

```
Aug 18 1995 10:54:48                  al_lsmop.c                                Page 2

/*---------------------------------------------
     * No catalogs currently active
     *---------------------------------------------*/
    lsm_cnfg -> lsm_cat_cnt = 0;

/*---------------------------------------------
     * Assume arm operational
     *---------------------------------------------*/
    lsm_cnfg -> arm.arm_stat = DCA_OPER;

/*---------------------------------------------
     * Assume hands operational
     *---------------------------------------------*/
    for ( count1 = 0; count1 < MAXHAND; ++count1 )
    {
        lsm_cnfg -> hand[ count1 ].hand_sta = DCH_OPER;
    }

/*---------------------------------------------
     * TW only has one hand; mark hand 1 inop
     *---------------------------------------------*/
    if ( cmg_get_lsm_type( lsm_id ) == MT_TIMWF )
    {
        lsm_cnfg -> hand[1].hand_sta = 0;
    }

/*---------------------------------------------
     * Assume drives are talking and not allocated
     *---------------------------------------------*/
    for ( count1 = 0; count1 < MAXTAPU; ++count1 )
    {
        tpu_ptr = &( lsm_cnfg -> tapu[ count1 ] );
        if ( tpu_ptr -> tapu_pnl != DCT_NXST )
        {
            for ( count2 = 0; count2 < MAXPDRV; ++count2 )
            {
                stat_ptr = &( tpu_ptr -> drive[ count2 ].driv_sta );
                *stat_ptr |= ( DCD_AVAL | DCD_OPER );
                *stat_ptr &= ~( DCD_ALLC );
            }
        }
        else
        {
            break;
        }
    }

/*---------------------------------------------
     * Assume CAPs are working
     *---------------------------------------------*/
    for ( count1 = 0; count1 < MAXCAP; ++count1 )
    {
        stat_ptr = &( lsm_cnfg -> cap[ count1 ].cap_stat );
        if ( *stat_ptr & DCC_EXST )
        {
            *stat_ptr &= ~( DCC_ENTR | DCC_EJCT | DCC_ALLC );
            *stat_ptr |= DCC_OPER;
        }
    }

/*---------------------------------------------
     * Assume master ports are working - slots ar empty
     *---------------------------------------------*/
    for ( count1 = 0; count1 < MAXPTP; ++count1 )
```

```
Aug 18 1995 10:54:48           al_lsmop.c            Page 3 stat_ptr = &( lsm_cnfg -> ptp[ count1 ].ptp_stat );
    if ( *stat_ptr & DCP_BOSS )
    {
        *stat_ptr |= DCP_OPER;
        ptp_ptr = &( gl_dcnfg[ lsm_cnfg->ptp[count1].ptp_adj1 ].
                      ptp[ lsm_cnfg->ptp[count1].ptp_adjp ]);
        ptp_ptr -> ptp_stat |= DCP_OPER;
        for( count2 = 0; count2 < MAXSLOT; ++count2 )
        {
            lsm_cnfg -> ptp[ count1 ].slot[ count2 ].slot_sta &=
                ~( DCS_FULL| DCS_ALLC | DCS_PREA );
            ptp_ptr -> slot[ count2 ].slot_sta &=
                ~( DCS_FULL| DCS_ALLC | DCS_PREA );
        }
    }
}

/*-------------------------------------------------------------
 * Place the LsM in operational status
 *-----------------------------------------------------------*/
lsm_cnfg -> lsm.lsm_stat |= DCL_OPER;

return( RET_OK );
}
```

```
Aug 18 1995 10:54:48                    al_lsmon.c                              Page 1 static char rcsid[]="$Header: /home/twolf/davet/alc/RCS/al_lsmon.c,v 1.2 1993/02/23 1
7:49:55 aarond Exp $";      static al_lsmon()
/* FUNCTION NAME:
/*
/* FUNCTION TITLE: Insure LSM is Online
/*
/* FUNCTIONAL DESCRIPTION:
/*   This function returns RET_OK if the LSM is online and
/*   ready or an error code otherwise.
/*
/* OPERATIONAL DESCRIPTION:
/*   This function checks the dynamic configuration for the
/*   state of the LSM and returns RET_OK if it is online and
/*   ready. If it is not, an error code indicating the LSM
/*   state is returned.
/*
/* PREREQUISITES:
/*   (none)
/*
/* SPECIAL CONSIDERATIONS:
/*   (none)
/*
/*          TYPE   NAME            RANGE/DESCRIPTION
/*          ----   ----            -----------------
/* PARMS IN: int   lsm_id          LSM identifier
/*
/* RET VALS: int   RET_OK          LSM online and ready
/*                 R_ALOFF         LSM offline
/*                 R_ALMNT         LSM in maint mode
/*                 R_ALNRDY        LSM not ready
/*                 R_ALOFFP        LSM in offline pending
/*                 R_ALHAND        Neither hand operational
/*
/* EXT VARS: struct gl_dcnfg[]     dynamic config
/*
/* H/W REGS: (none)
/*
/* FUNCTNS:  (none)
/*
/* HISTORY:
/*   05/03/88  fgm  Prologue created
/*   --/--/--  fgm  Prologue reviewed
/*   05/03/88  fgm  Code completed
/*********************  END OF PROLOGUE  *********************/
#include <com.h>
include "alc.h"
#include <com_extern.h>
include <alc_extern.h> int al_lsmon(
    unsigned UCHAR lsm_id )       /* LSM identifier          */
{
    unsigned int stat;            /* LSM status              */

/*-----------------------------------------------------*/
    /* get the status                                      */
    /*-----------------------------------------------------*/
    stat = gl_dcnfg[ lsm_id ].lsm.lsm_stat;

/*-----------------------------------------------------*/
    /* Return appropriate ending status                    */
    /*-----------------------------------------------------*/
    if ( ( stat & ( DCL_ONLN | DCL_RDY | DCL_OFFP | DCL_MNT ) ) !=
```

```
Aug 18 1995 10:54:48                    al_lsmon.c                              Page 2

( DCL_ONLN | DCL_RDY ) )
    {
        if ( ! ( stat & DCL_RDY ) )
        {
            return( R_ALNRDY );
        }
        if ( stat & DCL_OFFP )
        {
            return( R_ALOFFP );
        }
        if ( stat & DCL_MNT )
        {
            return( R_ALMNT );
        }
        return( R_ALOFF );
    }
    else
    {
        if ( ! ( ( gl_dcnfg[ lsm_id ].hand[ 0 ].hand_sta & DCH_OPER )
             && ( gl_dcnfg[ lsm_id ].hand[ 1 ].hand_sta & DCH_OPER ) ) )
        {
            return( R_ALHAND );
        }
        return( RET_OK );
    }
}
```

```
Aug 18 1995 10:54:48                          al_init.c                                              Page 1 static char rcsid[]="$Header: /home/twolf/davet/alc/RCS/al_init.c,v 1.13 1993/07/13 1
9:43:25 aarond Exp $";
/* FUNCTION NAME:   static al_init()                                                    */
/*                                                                                      */
/* FUNCTION TITLE:  Resource Allocation Task Initialization                              */
/*                                                                                      */
/* FUNCTIONAL DESCRIPTION:                                                               */
/*   The al_init() function initializes the data structures                              */
/*   used to store the information used in Resource Allocation.                          */
/*                                                                                      */
/* OPERATIONAL DESCRIPTION:                                                              */
/*   The beginning and end pointers of the queues al_wtpth ,                             */
/*   al_wtdrv , al_wthnd , al_wtmch and al_wtarm , are                                   */
/*   initialized to NULL.                                                                */
/*                                                                                      */
/*   The static configuration of the ATHS is read from the                               */
/*   disk. The structure gl_dcnfg is initialized to reflect                              */
/*   the static configuration of the ATHS. The dynamic portions                          */
/*   of the configuration are set to show all mechanisms as                              */
/*   inoperative. This structure consists of 16 LSM descriptors                          */
/*   which consist of status and mechanism descriptors as shown                          */
/*   in the file descriptor.                                                             */
/*                                                                                      */
/* PREREQUISITES:                                                                        */
/*   - the floppy disk must be functional                                                */
/*                                                                                      */
/* SPECIAL CONSIDERATIONS:                                                               */
/*   (none)                                                                              */
/*                                                                                      */
/*          TYPE      NAME          RANGE/DESCRIPTION                                    */
/*          ----      ----          -----------------                                    */
/* PARMS IN: (none)                                                                      */
/*                                                                                      */
/* RET VALS: RET_OK                 normal return - no errors                            */
/*           E_RDISK                error reading floppy disk                            */
/*           E_CONFIG               bad configuration read                               */
/*                                                                                      */
/* EXT VARS: struct al_wtpth        wait on path alloc queue           (RW)              */
/*           struct al_wthnd        wait on hand alloc queue           (RW)              */
/*           struct al_wtarm        wait on arm alloc queue            (RW)              */
/*           struct al_wtmch        wait on port mech queue            (RW)              */
/*           struct al_wtdrv        wait on drive unload queue         (RW)              */
/*           struct al_dists[]      LSM to LSM distance table          (RW)              */
/*           struct gl_dcnfg        ATHS configuration table                             */
/*                                                                                      */
/* H/W REGS: (none)                                                                      */
/*                                                                                      */
/* FUNCTNS:  (none)                                                                      */
/*                                                                                      */
/* HISTORY:  07/11/85  fgm  Prologue created                                             */
/*           07/23/85  fgm  Prologue reviewed                                            */
/*           01/15/86  fgm  Code completed                                               */
/*****************  END OF PROLOGUE  ********************/ include "com.h"
include "alc.h"
#include "cmg_user.h"
#include "com_extern.h"
include "alc_extern.h"

void al_init( void )
{
    register unsigned int lsmx;     /* general LSM ID variable     */
    register int temp;              /* general count variable      */
```

```
Aug 18 1995 10:54:48                          al_init.c                                              Page 2 int ptp_cnt;                    /* PTP panel count             */
    int drvp_cnt;                   /* drive panel count           */
    int panl;                       /* panel counter               */
    int ret_stat;                   /* return status holder        */
    struct dcf_ptp  *pptr;          /* pointer to PTP descriptor   */
    struct alf_dism *cf_ptr;        /* pointer to an LSM config    */ al_wtpth.first = al_wtpth.last = NULL;

/* Clear the trace buffer */
    al_tbuf[ 0 ].id1 = al_tbuf[ 1 ].id2 = '';

al_trptr = al_bcptr = 0;

for ( lsmx = 0; lsmx < MAXLSM ; ++lsmx )
    {
        /*
         * Initialize all the wait queues to empty
         */
        al_wtarm[ lsmx ].first = al_wtarm[ lsmx ].last = NULL;
        al_wthnd[ lsmx ].first = al_wthnd[ lsmx ].last = NULL;
        al_wtdrv[ lsmx ].first = al_wtdrv[ lsmx ].last = NULL;
        al_wtmch[ lsmx ].first = al_wtmch[ lsmx ].last = NULL;

/*
         * Set LSM to LSM distances to (can\'t get there from here)
         * Set connection matrix to NO_CNECT
         */
        for ( temp = 0; temp < MAXLSM ; ++temp )
        {
            al_dists[ lsmx ][ temp ] = NO_CNECT;
            al_cnect[ lsmx ][ temp ] = NO_CNECT;
        }
    }
    /*
     * Set preallocation to \'off\'
     */
    al_ppath = NULL;

/*
     * Initialize dynamic config from the static config
     */
    for ( lsmx = 0; lsmx < MAXLSM; ++lsmx )
    {
        cf_ptr = &( gl_dcnfg[ lsmx ] );

if ( cmg_get_lsm_type( lsmx ) == NT_NONE )
        {
            /*
             * If this LSM does not exist do not set the exist bit
             */
            cf_ptr -> lsm_lsm_stat = 0;
        }
        else
        {
            /*
             * LSM exists; set elements to inoperative
             */
            cf_ptr -> lsm.lsm_stat = DCL_EXST;
            cf_ptr -> lsm.lsm_sta1 = 0;
            cf_ptr -> lsm.lsm_sta2 = 0;
            cf_ptr -> lsm.cat_cnt  = 0;
            cf_ptr -> arm.arm_stat = 0;
            for ( temp = 0; temp < MAXHAND; ++temp )
```

```
al_init.c                                                        Page 3 cf_ptr -> hand[ temp ].hand_sta = 0;
    }
    for ( drvp_cnt = 0; drvp_cnt < MAXTAPU; ++drvp_cnt )
    {
        cf_ptr -> tapu[ drvp_cnt ].tapu_pnl = DCT_NXST;
        for ( temp = 0; temp < MAXPDRV; ++temp )
        {
            cf_ptr -> tapu[ drvp_cnt ].drive[ temp ].driv_sta = 0;
        }
    }
    cf_ptr -> cap[ 0 ].cap_stat = DCC_EXST;
    for ( temp = 1; temp < MAXCAP; ++temp )
        cf_ptr -> cap[ temp ].cap_stat = 0;

for ( temp = 0; temp < MAXPTP; ++temp )
        cf_ptr -> ptp[ temp ].ptp_stat = 0;

/*-----------------------------------------------------------------
 * Cycle through external panels
 *----------------------------------------------------------------*/
    ptp_cnt = drvp_cnt = 0;
    for ( panl = 0 ; panl < MAXEXPNL; ++panl )
    {
        UCHAR panel_type = cmg_get_panel_type( lsmx, panl );
        switch ( panel_type )
        {
        case PNL_TW_L_PTP:
        case PNL_TW_R_PTP:
        case PNL_TW_2_SLAVE:
        case PNL_PTPS:
        case PNL_PTPN:
        case PNL_PTPWR:
        case PNL_PTPWL:
            /*
             * If this is a PTP fill in the port data and
             * adjoining LSM data
             */
            pptr = &( cf_ptr -> ptp[ ptp_cnt ] );
            temp = cmg_get_adjacent_lsm( lsmx, ptp_cnt );
            if ( ( panel_type == PNL_PTPN ) ||
                 ( panel_type == PNL_TW_L_PTP ) ||
                 ( panel_type == PNL_TW_R_PTP ) )
            {
                /* this PTP panel is the master */
                pptr -> ptp_stat = DCP_EXST | DCP_BOSS;
                al_cnect( lsmx )[ temp ] = ptp_cnt;
            }
            else
            {
                /* this PTP panel is the slave */
                pptr -> ptp_stat = DCP_EXST;
                al_cnect( lsmx )[ temp ] = NOT_MSTR;
            }
            pptr -> ptp_pnl = panl;
            pptr -> ptp_adj = temp;
            for( ret_stat = 0; ret_stat < MAXPTP; ++ret_stat )
            {
                if ( cmg_get_adjacent_lsm( temp, ret_stat ) == lsmx )
                    pptr -> ptp_adjp = ret_stat;
            }
            break;
```

```
al_init.c                                                        Page 4

}
/*
 * Set all the slots to empty / not allocated
 */
        for( ret_stat = 0; ret_stat < MAXSLOT; ++ret_stat )
        {
            pptr -> slot[ ret_stat ].slot_sta = 0;
        }
        ++ptp_cnt;
        break;

case PNL_DRV:
    case PNL_DRVH:
    case PNL_WC_DRIVE:
    case PNL_TW_DRIVE:
    case PNL_WC_MT_3_DRV:
        /*
         * If this is a DRIVE panel then fill in the panel
         * IDs of the possible drives ( may exist )
         */
        cf_ptr -> tapu[ drvp_cnt ].tapu_pnl = panl;
        for ( temp = 0; temp < MAXPDRV; ++temp )
        {
            cf_ptr -> tapu[ drvp_cnt ].drive[ temp ].driv_sta = DCD_EX
ST;
        }
        ++drvp_cnt;
        break;

case PNL_MCAP:
    case PNL_WC_DOUBLE_CAP:
    case PNL_WC_4_MT_2CAP:
        /*
         * this is a door panel with 2 caps and a pcap
         */
        for ( temp = 0; temp < MAXCAP; ++temp )
        {
            cf_ptr -> cap[ temp ].cap_stat = DCC_EXST;
        }
        break;

case PNL_WC_DOOR:
    case PNL_WC_4_MT_CAP:
    case PNL_WC_4_ONE_CAP:
        /*
         * If this is a timberwolf/wolfcreek panel w/ cap &pcap
         */
        cf_ptr -> cap[ 0 ].cap_stat =
        cf_ptr -> cap[ 2 ].cap_stat = DCC_EXST;
        break;

default:
        break;
    }
}

/*-----------------------------------------------------------------
 * Make the existing resources operative; LSMs stay inoperative
 *----------------------------------------------------------------*/
for ( lsmx = 0; lsmx < MAXLSM; ++lsmx )
{
    cf_ptr = &( gl_dcnfg[ lsmx ] );
```

```
if ( cf_ptr -> lsm.lsm_stat & DCL_EXST )
{
    temp = al_lsmop( lsmx );
    cf_ptr -> lsm.lsm_stat = DCL_EXST;
}

/*----------------------------------------------------
 * Set up the static distance matrix
 *---------------------------------------------------*/
al_fstds();
}
```

```
Aug 18 1995 10:54:48                          al_infor.c                                    Page 1
static char rcsid[]="$Header: /home/twolf/davet/alc/RCS/al_infor.c,v 1.10 1993/06/07
17:59:58 gerond Exp $";
/* FUNCTION NAME:    static al_infor()                                                       */
/*                                                                                           */
/* FUNCTION TITLE:   Handle Resource Allocation Information                                  */
/*                                                                                           */
/* FUNCTIONAL DESCRIPTION:                                                                   */
/*   This function accepts information describing changes to                                 */
/*   any of the allocatable resources in the ATHS. These                                     */
/*   changes update the current dynamic configuration of the                                 */
/*   ATHS. Outstanding requests are reevaluated based on the                                 */
/*   new information.                                                                        */
/*                                                                                           */
/* OPERATIONAL DESCRIPTION:                                                                  */
/*   This function accepts resource change descriptors                                       */
/*   (res_chng). These descriptors have the format shown in                                  */
/*   the file descriptor.                                                                    */
/*                                                                                           */
/*   This function analyzes the resource change descriptor and,                              */
/*   using the new information, updates the ATHS configuration                               */
/*   table (gl_dcnfg).                                                                       */
/*                                                                                           */
/*   If a change permanently effects a path (eg. loss or gain                                */
/*   of an arm or pass-thru port) then the function al_fdist()                               */
/*   is invoked to recalculate all LSM to LSM distances.                                     */
/*                                                                                           */
/*   This function checks the resource type and the change type                              */
/*   of the resource change descriptor. Those changes effecting                              */
/*   transport resources are passed as parameters to the                                     */
/*   function al_retrn() so that outstanding transport requests                              */
/*   may be reevaluated. Similarly, changes effecting path                                   */
/*   requests are sent to al_repth() so that current path                                    */
/*   allocation requests can be reevaluated. Some changes (eg,                               */
/*   the loss of a port mechanism) effects both transport and                                */
/*   path requests, so that both al_retrn() and al_repth() are                               */
/*   invoked.                                                                                */
/*                                                                                           */
/* PREREQUISITES:                                                                            */
/*   - gl_dcnfg   must be initialized                                                        */
/*                                                                                           */
/* SPECIAL CONSIDERATIONS:                                                                   */
/*   (none)                                                                                  */
/*                                                                                           */
/*              TYPE          NAME          RANGE/DESCRIPTION                                */
/*              ----          ----          -----------------                                */
/* PARMS IN:    int           *res_chng     resource change descriptor ptr                   */
/*                                                                                           */
/* RET VALS:    void          (none)                                                         */
/*                                                                                           */
/* EXT VARS:                  gl_dcnfg      ATHS configuration table        (RW)             */
/*                                                                                           */
/* H/W REGS:                  (none)                                                         */
/*                                                                                           */
/* FUNCTNS:                   al_retrn()    reevaluate transport alloc reqs                  */
/*                            al_repth()    reevaluate path alloc requests                   */
/*                            al_fdist()    recalculate all LSM/LSM dists                    */
/*                                                                                           */
/* HISTORY:                                                                                  */
/* 07/16/85    fgm   Prologue created                                                        */
/* 07/23/85    fgm   Prologue reviewed                                                       */
/* 01/15/86    fgm   Code completed                                                          */
/*********************   END OF PROLOGUE   **************************/
#include "com.h"
include "alc.h"
```

```
Aug 18 1995 10:54:48                          al_infor.c                                    Page 2
#include "log_user.h"
#include "cmg_user.h"

#include "com_extern.h"
include "alc_extern.h"

void al_infor(
             struct alloc_rsc *res_chng) /* resource change descrp */
{
  enum alc_resource_change_type chg_type;  /* type of change         */
  struct COM_LNK_LIST *tmp_list;           /* pointer to link list   */
  BOOLEAN l_online;                        /* LSM online indicator   */
  int temp2;                               /* temporary holding value*/
  int temp3;                               /* temporary holding value*/
  UCHAR rlsm;                              /* Resource LSM           */
  UCHAR rsel;                              /* Resource selector      */
  struct alchange al_chnge;                /* change descriptor      */
  struct dcf_ptp *optp;                    /* ptr to other PTP info  */
  int loc_flag;                            /* local flag word        */
  struct alr_dlsm *lsmcfg;                 /* specific LSM config pntr*/ define BAD_RCHG  0x0001                 /* bad resc. chng. descrpt */
  #define NEW_TRAN  0x0002                 /* need new transport analy.*/
  #define NEW_PATH  0x0004                 /* need new path analysis  */
  #define NEW_DIST  0x0008                 /* need new LSM dist calc  */

/*-------------------------------------------------------------------*/
  /* Trace the informational                                           */
  /*-------------------------------------------------------------------*/
  al_trace('I', 'F', (struct alloc_req *)res_chng );

/*-------------------------------------------------------------------*/
  /* Clear flags; set the change type variable                         */
  /*-------------------------------------------------------------------*/
  loc_flag = 0;
  chg_type = res_chng -> rsc_chng;
  al_chnge.change = 0;
  rlsm = al_chnge.main_lsm = res_chng -> rsc_lsm;
  lsmcfg = &gl_dcnfg[ rlsm ];
  rsel = res_chng -> rsc_sel;
  l_online = (gl_dcnfg[rlsm].lsm.lsm_stat & DCL_ONLN) ? TRUE : FALSE;

/*-------------------------------------------------------------------*/
  /* Make sure that the LSM exists                                     */
  /*-------------------------------------------------------------------*/
  if ( ( ( rlsm >= MAXLSM ) ||
       ( !( gl_dcnfg[rlsm].lsm.lsm_stat & DCL_EXST) ) )
  {
    al_bctrc( 'I', (struct alloc_req *)res_chng );
    sys_msg_release( (char *)res_chng );
    log_user_errof( ERR_CHNLSM );
    return;
  }

/*-------------------------------------------------------------------*/
  /* Split out info according to type                                  */
  /*-------------------------------------------------------------------*/
  switch ( res_chng -> rsc_typ )
  {
    case RST_LSM:
      /*
       * Change to the LSM as a whole
       */
      register struct dcf_lsm *temp;
```

```
Aug 18 1995 10:54:48                    al_infor.c                    Page 3 temp = &( gl_dcnfg[ rlsm ].lsm );

switch ( chg_type )
    {
    case RCT_OPER:
        /*
         * LSM goes operative - set all elements operative
         * (save only the MAINT and EXIST status bits)
         *---------------------------------------------------*/
        temp -> lsm_stat &= ( DCL_MNT | DCL_EXST );
        temp2 = al_lsmop( rlsm );
        break;

case RCT_NOPR:
        /*
         * LSM goes inoperative - handle as Not Ready but
         * clean out Oper status and Door Open status
         *---------------------------------------------------*/
        temp -> lsm_stat &= ~(DCL_OPER | DCL_DROP);
        /* NOTE: fall through to handle as a NOT READY   */ case RCT_NRDY:
        /*
         * LSM Not Ready
         *---------------------------------------------------*/
        if ( ( temp -> lsm_stat ) & DCL_OFFP )
        {
            /*
             * If in Offline-Pend then go complete offline
             *-----------------------------------------------*/
            al_rspnd( al_opndr( rlsm ), rlsm, PRV_ONL, 0, 0 );
        }
        temp -> lsm_stat &= ~(DCL_RDY | DCL_ONLN | DCL_OFFP | DCL_OFFL );

/*
         * If not in maint mode put this LsM offline
         *---------------------------------------------------*/
        if ( ! ( temp -> lsm_stat | DCL_MNT ) )
        {
            temp -> lsm_stat |= DCL_OFFL;
        }
        temp -> lsm_sta2 &= ~DCL_DRMK;
        temp -> lsm_sta2 |= ( rsel & DCL_DRMK );

/*
         * If the LSM WAS Online then clean up act jobs
         *---------------------------------------------------*/
        if ( l_online )
        {
            loc_flag |= ( NEW_PATH | NEW_TRAN | NEW_DIST );
            al_chnge.change = ( SUB_LSM | SUB_PATH );
        }
        break;

case RCT_REDY:
        /*
         * LSM becomes ready for Host activity - make offline
         *---------------------------------------------------*/
        temp -> lsm_stat &= ~(DCL_ONLN | DCL_OFFP | DCL_MNT);
        temp -> lsm_stat |= ( DCL_RDY | DCL_OFFL );
        break;

case RCT_DROP:
        /*
         * LSM Door is open
```

```
Aug 18 1995 10:54:48                    al_infor.c                    Page 4

*---------------------------------------------------*/
        temp -> lsm_stat |= DCL_DROP;
        temp -> lsm_sta2 &= ~( DCL_DRAK | DCL_DRMK );
        temp -> lsm_sta2 |= DCL_NRDO;
        break;

case RCT_DRCL:
        /*
         * LSM Door is closed
         *---------------------------------------------------*/
        temp -> lsm_stat &= ~DCL_DROP;
        temp -> lsm_sta2 &= ~DCL_DRAK;
        break;

case RCT_DRAK:
        /*
         * LSM Door opening has been acknowledged
         *---------------------------------------------------*/
        temp -> lsm_sta2 |= DCL_DRAK;
        break;

case RCT_CTAC:
        /*
         * LSM catalog active - bump the count
         *---------------------------------------------------*/
        ++ ( temp -> cat_cnt );
        break;

case RCT_CTIN:
        /*
         * LSM catalog going inactive - drop the count by one
         * act as if a deallocation for vary off purposes
         *---------------------------------------------------*/
        if ( temp -> cat_cnt != 0 )
        {
            --( temp -> cat_cnt );
        }
        chg_type = RCT_DEAL;
        break;

default:
        /*
         * Illegal LSM Change
         *---------------------------------------------------*/
        loc_flag = BAD_RCHG;
    }
    break;

case RST_ARM:
        /*
         * Change to Arm status
         *---------------------------------------------------*/
        tmp_list = & al_wtarm[ rlsm ];
        if ( ( l_online ) && ( tmp_list -> first != NULL ) )
        {
            loc_flag |= NEW_TRAN;
        } register struct dcf_arm *temp = &( gl_dcnfg[ rlsm ].arm );

switch ( chg_type )
        {
        case RCT_DEAL:
            /*
             * Deallocate arm
             *-----------------------------------------------*/
```

Page 5:

```
                    al_infor.c temp -> arm_stat &= ~DCA_ALLC;
            al_chnge.change = ADD_ARM;
            break;
        case RCT_NOPR:
            /*--------------------------------------
             * Arm goes inoperative
             *------------------------------------*/
            temp -> arm_stat &= ~DCA_OPER;
            if ( l_online )
            {
                loc_flag |= (NEW_PATH | NEW_DIST);
                al_chnge.change = (SUB_LSH | SUB_PATH);
            }
            break;
        case RCT_OPER:
            /*--------------------------------------
             * Arm becomes operative
             *------------------------------------*/
            temp -> arm_stat |= DCA_OPER;
            if ( l_online )
            {
                loc_flag |= (NEW_PATH | NEW_DIST);
                al_chnge.change = ADD_PATH;
            }
            break;
        default:
            /*--------------------------------------
             * illegal arm change
             *------------------------------------*/
            loc_flag |= BAD_RCHG;
            break;
        }
        break;
    case RST_HAND:
        /*------------------------------------------
         * Change to the status of a hand
         *----------------------------------------*/
        tmp_list = & al_wthnd[ rlsm ];
        if(( l_online ) && ( tmp_list -> first != NULL ))
        {
            loc_flag |= NEW_TRAN;
        }
        {
            register struct dcf_hand *temp;

if ( rsel > 1 )
            {
                loc_flag = BAD_RCHG;
                break;
            }
            temp = &( gl_dcnfg[ rlsm ].hand[rsel] );
            al_chnge.main_id = rsel;
            switch ( chg_type )
            {
            case RCT_DEAL:
                /*--------------------------------------
                 * Hand deallocated (both hands if Powderhorn)
                 *------------------------------------*/
```

Page 6:

```
                    al_infor.c if ( cmg_get_lsm_type( rlsm ) == MT_POWDR )
                {
                    /*--------------------------------------
                     * If task has two hands, clear task info only
                     * (this, then, results in no resource change)
                     *------------------------------------*/
                    if ( lsmcfg->hand[0].hand_tsk ==
                         lsmcfg->hand[1].hand_tsk )
                    {
                        lsmcfg->hand[ rsel ].hand_tsk = 0;
                        loc_flag &= ~NEW_TRAN; /* undo prior flag */
                        break;
                    }
                    /*--------------------------------------
                     * Else, pre-clear redundant PH allocation
                     *------------------------------------*/
                }
                else
                {
                    lsmcfg->hand[ ! rsel ].hand_sta &= ~DCH_ALLC;
                }
                temp -> hand_sta &= ~DCH_ALLC;
                al_chnge.change = ADD_HAND;
                break;
            case RCT_NOPR:
                /*--------------------------------------
                 * Hand becomes inoperative
                 *------------------------------------*/
                temp -> hand_sta &= ~DCH_OPER;
                if ( l_online )
                {
                    temp2 = ( (rsel == HAND0) ? HAND1 : HAND0 );
                    if ( !( gl_dcnfg[ rlsm ].hand[ temp2 ].hand_sta &
                            DCH_OPER ))
                    {
                        al_chnge.change = (SUB_HAND | SUB_PATH);
                        loc_flag |= (NEW_PATH | NEW_DIST);
                    }
                }
                break;
            case RCT_OPER:
                /*--------------------------------------
                 * Hand becomes operative
                 *------------------------------------*/
                temp -> hand_sta |= DCH_OPER;
                if ( l_online )
                {
                    al_chnge.change = ADD_HAND;
                }
                break;
            case RCT_FULL:
                /*--------------------------------------
                 * Hand becomes full
                 *------------------------------------*/
                temp -> hand_sta |= DCH_FULL;
                loc_flag = 0;
                break;
            case RCT_EMTY:
                /*--------------------------------------
                 * Hand becomes empty
                 *------------------------------------*/
                temp -> hand_sta &= ~DCH_FULL;
```

```
            loc_flag = 0;
            break;
        default:
            /*-------------------------------
             * Illegal hand change
             *-------------------------------*/
            loc_flag = BAD_RCHG;
        }
        break;
    case RST_PTP:
        /*-----------------------------------
         * Change to status of a pass-thru port
         *-----------------------------------*/
        tmp_list = &_al_wtnch[ rlsm ];
        if ( l_online )
        {
            if ( tmp_list -> first != NULL )
            {
                loc_flag |= NEW_TRAN;
            }
        }
        {
            register struct dcf_ptp *temp =
                &( gl_dcnfg[ rlsm ].ptp[ rsel ] );
            optp = &( gl_dcnfg[ temp -> ptp_adj ].ptp[ temp -> ptp_adjp ] );

if ( ( rsel > MAXPTP ) || ( !( temp -> ptp_stat & DCP_EXST ) ) )
            {
                loc_flag = BAD_RCHG;
                break;
            } if ( al_cnect( rlsm )( temp -> ptp_adj ) == NOT_MSTR )
            {
                al_chnge.main_lsm = temp -> ptp_adj;
                al_chnge.send_lsm = rlsm;
                al_chnge.main_id = temp -> ptp_adjp;
            }
            else
            {
                al_chnge.mein_lsm = temp -> ptp_adj;
                al_chnge.main_lsm = rlsm;
                al_chnge.main_id = rsel;
            }
            switch ( chg_type )
            {
            case RCT_DEAL:
                /*------------------------------
                 * Deallocated PTP mechanism
                 *------------------------------*/
                temp -> ptp_stat &= ~DCP_ALLC;
                optp -> ptp_stat &= ~DCP_ALLC;
                al_chnge.change = ADD_PTP;
                break;
            case RCT_NOPR:
                /*------------------------------
                 * PTP becomes inoperative
                 *------------------------------*/
                temp -> ptp_stat &= ~DCP_OPER;
                optp -> ptp_stat &= ~DCP_OPER;
```

```
                if ( l_online )
                {
                    loc_flag |= (NEW_PATH | NEW_DIST);
                    al_chnge.change = (SUB_PTP | SUB_PATH);
                }
                break;
            case RCT_OPER:
                /*------------------------------
                 * PTP becomes operative
                 *------------------------------*/
                temp -> ptp_stat |= DCP_OPER;
                optp -> ptp_stat |= DCP_OPER;
                if ( l_online )
                {
                    loc_flag |= (NEW_PATH | NEW_DIST);
                    al_chnge.change = ADD_PATH;
                }
                break;
            default:
                /*------------------------------
                 * Illegal pass-thru port change
                 *------------------------------*/
                loc_flag = BAD_RCHG;
            }
        }
        break;
    case RST_PTPS:
        /*-----------------------------------
         * Change to a PTP slot
         *-----------------------------------*/
        loc_flag = NEW_PATH;
        {
            register struct dcf_ptp *temp;
            temp2 = rsel & 0x0F;   /* temp2 = PTP ID */
            temp1 = rsel >> 4;     /* temp3 = SLOT ID */ temp = &( gl_dcnfg[ rlsm ].ptp[ temp2 ] );
            optp = &( gl_dcnfg[ temp -> ptp_adj ].ptp[ temp -> ptp_adjp ] );

if ( ( temp2 > MAXPTP ) || ( !( temp -> ptp_stat & DCP_EXST ) ||
                 ( temp3 > MAXSLOT ) ) )
            {
                loc_flag = BAD_RCHG;
                break;
            }
            switch ( chg_type )
            {
            case RCT_DEAL:
                /*------------------------------
                 * slot becomes deallocated
                 *------------------------------*/
                temp -> slot[ temp3 ].slot_sta &= ~DCS_ALLC;
                optp -> slot[ temp3 ].slot_sta &= ~DCS_ALLC;
                if ( l_online )
                {
                    loc_flag = NEW_PATH;
                    al_chnge.change = ADD_SLOT;
                }
                break;
``` al_infor.c                                                                    Page 9

```
    case RCT_FULL:
        /*-----------------------------------------------------------------
         * Slot is full - In Transit Cartridge
         *---------------------------------------------------------------*/
        temp -> slot[ temp3 ].slot_sta |= DCS_FULL;
        optp -> slot[ temp3 ].slot_sta |= DCS_FULL;
        break;
    case RCT_EMTY:
        /*-----------------------------------------------------------------
         * slot becomes empty
         *---------------------------------------------------------------*/
        temp -> slot[ temp3 ].slot_sta &= ~DCS_FULL;
        optp -> slot[ temp3 ].slot_sta &= ~DCS_FULL;
        if ( ( l_online ) &&
             (!(temp -> slot[ temp3 ].slot_sta & DCS_ALLC)) )
            loc_flag = NEW_PATH;
            al_chnge.change = ADD_SLOT;
        break;
    default:
        /*-----------------------------------------------------------------
         * Illegal slot change
         *---------------------------------------------------------------*/
        loc_flag = BAD_RCHG;
    }
    break;
case RST_CAPR:
case RST_CAPH:
    /*---------------------------------------------------------------------
     * Change to CAP status (RESERVE) / or Host allegience
     *-------------------------------------------------------------------*/
    register struct dcf_cap *temp;
    temp = &( gl_dcnfg[ rlsm ].cap[ rsel ] );
    if ( rsel >= MAXCAP )
    {
        loc_flag = BAD_RCHG;
        break;
    }
    switch ( chg_type )
    {
    case RCT_DEAL:
        /*-----------------------------------------------------------------
         * CAP deallocated (no longer reserved )
         *---------------------------------------------------------------*/
        temp -> cap_stat &= ~DCC_ALLC;
        if ( res_chng -> rsc_typ == RST_CAPR )
            temp -> cap_stat &= ~( DCC_ENTR | DCC_EJCT );
        break;
    case RCT_OPER:
        /*-----------------------------------------------------------------
         * CAP no longer operative
         *---------------------------------------------------------------*/
        temp -> cap_stat |= DCC_OPER;
        break;
``` al_infor.c                                                                   Page 10

```
    case RCT_NOPR:
        /*-----------------------------------------------------------------
         * CAP becomes active
         *---------------------------------------------------------------*/
        temp -> cap_stat &= ~DCC_OPER;
        if ( l_online )
            loc_flag |= NEW_PATH;
        break;
    default:
        /*-----------------------------------------------------------------
         * Illegal CAP change
         *---------------------------------------------------------------*/
        loc_flag = BAD_RCHG;
    }
    break;
case RST_CAPN:
case RST_CAPJ:
case RST_CAPC:
case RST_CAPM:
    /*---------------------------------------------------------------------
     * Change to CAP (ENTER/EJECT)
     *-------------------------------------------------------------------*/
    register struct dcf_cap *temp;
    temp = &( gl_dcnfg[ rlsm ].cap[ rsel ] );
    if ( rsel >= MAXCAP )
    {
        loc_flag = BAD_RCHG;
        break;
    }
    switch( res_chng -> rsc_typ )
    {
    case RST_CAPN:
        temp -> cap_stat &= ~DCC_ENTR;
        break;
    case RST_CAPJ:
        temp -> cap_stat &= ~DCC_EJCT;
        break;
    case RST_CAPC:
        temp -> cap_stat &= ~DCC_CATL;
        break;
    case RST_CAPH:
        if ( temp -> cap_mcnt != 0 )
            --( temp -> cap_mcnt );
        if ( ( ( temp -> cap_mcnt ) == 0 )
            temp -> cap_stat &= ~DCC_MOTH;
    }
```

```
                                                                    Page 11
Aug 18 1995 10:54:48              al_infor.c break;
    default:
        /*-----------------------------------------------------
         * Illegal CAP change
         *---------------------------------------------------*/
        loc_flag |= BAD_RCHG;
    }
    break;

case RST_DRIV:
    /*-----------------------------------------------------
     * Change to drive status
     *---------------------------------------------------*/
    tmp_list = & al_wtdrv[ rlsm ];
    {
    register struct dcf_driv *temp;
    /*-----------------------------------------------------
     * Convert panel/drive to tape unit drive in 'rsel'
     *---------------------------------------------------*/
    if ( al_tape( &rsel, rlsm ) != RET_OK )
    {
        loc_flag |= BAD_RCHG;
        break;
    }
    al_chnge.main_id = rsel;
    temp2 = (rsel & PLC_TAPU) >> 2;  /* temp2 = Tape unit */
    temp3 = rsel & PLC_DRID;          /* temp3 = Tape drive */ temp = & gl_dcnfg[ rlsm ].tapu[ temp2 ].drive[ temp3 ];
    switch ( chg_type )
    {
    case RCT_DEAL:
        /*-----------------------------------------------------
         * Drive deallocated - see if anyone is waiting
         *---------------------------------------------------*/
        temp -> driv_sta &= ~DCD_ALLC;
        if ( ( l_online )
            && ( !( temp -> driv_sta & DCD_FULL )
            && ( tmp_list -> first != NULL ) ) )
        {
            al_chnge.change = ADD_DRIV;
            loc_flag |= NEW_PATH;
        }
        break;

case RCT_FULL:
        /*-----------------------------------------------------
         * Drive is filled
         *---------------------------------------------------*/
        temp -> driv_sta |= DCD_FULL;
        break;

case RCT_EMTY:
        /*-----------------------------------------------------
         * Drive emptied - see if anyone waiting to mount
         *---------------------------------------------------*/
        temp -> driv_sta &= ~DCD_FULL;
        break;
```

```
                                                                    Page 12
Aug 18 1995 10:54:48              al_infor.c case RCT_NOPR:
        /*-----------------------------------------------------
         * Drive no longer operative
         *---------------------------------------------------*/
        temp -> driv_sta &= ~DCD_OPER;
        if ( l_online )
        {
            if ( tmp_list -> first != NULL )
            {
                al_chnge.change = SUB_DRIV;
                loc_flag |= NEW_PATH;
            }
        }
        break;

case RCT_OPER:
        /*-----------------------------------------------------
         * Drive is now operative
         *---------------------------------------------------*/
        temp -> driv_sta |= DCD_OPER;
        break;

case RCT_COMM:
        /*-----------------------------------------------------
         * Drive is communicating
         *---------------------------------------------------*/
        temp -> driv_sta |= DCD_AVAL;
        break;

case RCT_NCOM:
        /*-----------------------------------------------------
         * Drive is not communicating
         *---------------------------------------------------*/
        temp -> driv_sta &= ~DCD_AVAL;
        break;

default:
        /*-----------------------------------------------------
         * Illegal drive change
         *---------------------------------------------------*/
        loc_flag |= BAD_RCHG;
    }
    break;

default:
    /*-----------------------------------------------------
     * Unknown Resource change type - log an error
     *---------------------------------------------------*/
    loc_flag = BAD_RCHG;
    log_user_lmu_error( ERR_BDRCHG );
} if (loc_flag & BAD_RCHG )
{
    /*-----------------------------------------------------
     * If the change type was bad flag an error
     *---------------------------------------------------*/
    al_bctrc( 'I', (struct alloc_req *) res_chng );
    log_user_lmu_error( ERR_BDRCHG );
}
else
{
    /*-----------------------------------------------------
     * If any recalculations are necessary do them
```

```
        if ( loc_flag & NEW_DIST )
        {
            al_fdist( );
        } if ( loc_flag & NEW_TRAN )
        {
            al_retrn( &al_chnge );
        } if ( loc_flag & NEW_PATH )
        {
            al_repth( &al_chnge );
        }
    }

/*------------------------------------------------------------------
    * If we deallocated anything from an LSM in Offline-Pending
    * check to see if we can go Offline
    ------------------------------------------------------------------*/
    if ( chg_type == RCT_DEAL )
    {
        register struct dcf_lsm *temp =
              &( gl_dcnfg[ res_chng -> rsc_lsm ].lsm );

if ( ( temp -> lsm_stat & DCL_OFFP )
           && ( qu_anyal( res_chng -> rsc_lsm, NO ) == NO ) )
        {
            /* ----- Nothing allocated - let's go offline ----- */
            temp -> lsm_stat |= DCL_OFFL;
            temp -> lsm_stat &= ~( DCL_OFFP | DCL_ONLN );
            al_rspnd( al_opnd[ res_chng -> rsc_lsm ], res_chng ->
                     rsc_lsm, PRV_ONL, 0, 0 );
        } if ( ( res_chng -> rsc_typ == RST_PTP ) || ( res_chng ->
                                          rsc_typ == RST_PTPS ) )
        {
            temp2 = ( res_chng -> rsc_sel & 0x0F );  /* temp2 = PTP ID */
            temp2 = gl_dcnfg[ res_chng -> rsc_lsm ].ptp[ temp2 ].ptp_adj;
            temp = &( gl_dcnfg[ temp2 ].lsm );  /* temp -> LSH adj*/ if ( ( temp -> lsm_stat & DCL_OFFP )  &&
               ( qu_anyal( temp2, NO ) == NO ) )
            {
                /* ----- Nothing allocated - let's go offline ----- */
                temp -> lsm_stat |= DCL_OFFL;
                temp -> lsm_stat &= ~(DCL_OFFP|DCL_ONLN);
                al_rspnd( al_opnd[ temp2 ], temp2, PRV_ONL, 0, 0 );
            }
        }
    }

/*------------------------------------------------------------------
    * Release the Information block
    ------------------------------------------------------------------*/
    sys_msg_release( (char *)res_chng );

/* ----- undefine the local constants ----- */
```

```
    */
#undef BAD_RCHNG
#undef NEW_TRAN
#undef NEW_PATH
#undef NEW_DIST
}
```

```
Aug 18 1995 10:54:48                    al_fstds.c                              Page 1 static char rcsid[]="$Header: /home/twolf/davet/alc/RCS/al_fstds.c,v 1.2 1993/02/23 1
7:49:42 asrond Exp $";  static al_fstds()
/*
/* FUNCTION NAME:     static al_fstds()
/*
/* FUNCTION TITLE:    Find LSM to LSM Static Distances
/*
/* FUNCTIONAL DESCRIPTION:
/*   The function is called to determine all LSM to LSM
/*   distances in terms of the minimum number of pass-thru
/*   ports it would be necessary for a cartridge to traverse to
/*   get from one LSM to the other. On completion, the table
/*   al_stdst[] has been completely filled in.
/*
/* OPERATIONAL DESCRIPTION:
/*   When this function is invoked it initially resets all
/*   entries in the al_stdst[] table to NOCNECT, indicating
/*   that there is no path from one LSM to the other. The
/*   al_stdst[] table consists of a distance entry for each
/*   possible pair of LSMs. The gl_dcnfg table is scanned. For
/*   each port which exists, the entry for the pair of LSMs
/*   sharing that port is set to 1. Next, successive passes are
/*   made adding the distance from LSM A to LSM B to the
/*   distance from LSM B to LSM C, if both these distances are
/*   known. This yields a distance from A to C. Several
/*   distances from one LSM to another may be found this way
/*   but the smallest is retained. Passes are made until no
/*   distance value has changed over an entire pass. At this
/*   point al_stdst[] is complete.
/*
/* PREREQUISITES:   is initialized
/*   - gl_dcnfg
/*
/* SPECIAL CONSIDERATIONS:
/*   (none)
/*
/*           TYPE    NAME            RANGE/DESCRIPTION
/*           ----    ----            -----------------
/* PARMS IN:         (none)
/* RET VALS: void    (none)
/* EXT VARS:         al_stdst[]      LSM to LSM distance table  (RW)
/*                   gl_dcnfg        ATHS configuration table    (R)
/* H/W REGS:         (none)
/* FUNCTNS:          (none)
/*
/* HISTORY:
/* 05/02/88   fgm   Prologue created
/* -/-/--     fgm   Prologue reviewed
/* 05/02/88   fgm   Code completed
/*
/*************** END OF PROLOGUE ********************************/
#include <com.h>
#include *alc.h*
#include <com_extern.h>
include <alc_extern.h> void al_fstds( void )
{
    UCHAR lsmx;             /* general LSM ID variable */
    UCHAR lsmy;             /* general LSM ID variable */
    UCHAR lsmz;             /* general LSM ID variable */
```

```
Aug 18 1995 10:54:48                    al_fstds.c                              Page 2

BOOLEAN change;              /* distance table change flag */
    register unsigned cnt1;      /* general count variable */
    register unsigned cnt2;      /* general count variable */
    struct dcf_ptp *cptp;        /* pointer to PTP descriptor */

/*-------------------------------------------------------------------
     * Set LSM to LSM distances to NOCNECT (can't get there from here)
     *-------------------------------------------------------------------*/
    for ( lsmx = 0; lsmx < MAXLSM ; ++lsmx )
    {
        for ( lsmy = 0; lsmy < MAXLSM ; ++lsmy )
            al_stdst[ lsmx ][ lsmy ] = (lsmx == lsmy) ? 0 : NO_CNECT;
    }

/*-------------------------------------------------------------------
     * Set distance to 1 for adjoining, online LSM pairs
     *-------------------------------------------------------------------*/
    for ( lsmx = 0; lsmx < MAXLSM ; ++lsmx )
    {
        if ( gl_dcnfg[ lsmx ].lsm.lsm_stat & DCL_EXST )
        {
            for ( cnt1 = 0; cnt1 < MAXPTP; ++cnt1 )
            {
                cptp = &( gl_dcnfg[ lsmx ].ptp[ cnt1 ] );
                if ( (cptp -> ptp_stat) & DCP_BOSS )
                {
                    al_stdst[ lsmx ][ cptp -> ptp_adj ] = 1;
                    al_stdst[ cptp -> ptp_adj ][ lsmx ] = 1;
                }
            }
        }
    }

/*-------------------------------------------------------------------
     * Cycle through pairs of LSM pairs to calculate new distances
     *-------------------------------------------------------------------*/
    change = TRUE;
    while ( change )
    {
        change = FALSE;
        for ( lsmx = 0; lsmx < MAXLSM; ++lsmx )
        {
            for ( lsmy = 0; lsmy < MAXLSM; ++lsmy )
            {
                if ( (cnt1 = al_stdst[ lsmx ][ lsmy ]) != NO_CNECT )
                {
                    for ( lsmz = 0; lsmz < MAXLSM; ++lsmz )
                    {
                        if ( (cnt2 = al_stdst[ lsmy ][ lsmz ]) != NO_CNECT )
                        {
                            if ( (cnt1 + cnt2) < al_stdst[ lsmx ][ lsmz ] )
                            {
                                al_stdst[ lsmx ][ lsmz ] =
                                    al_stdst[ lsmz ][ lsmx ] = cnt1 + cnt2;
                                change = TRUE;
                            }
                        }
                    }
                }
            }
        }
    }
}
```

```
return;
}
```

```
Aug 18 1995 10:54:48                    al_fdist.c                          Page 1 static char rcsid[]="$Header: /home/twolf/davet/alc/RCS/al_fdist.c,v 1.2 1993/02/23 1
7:49:39 asrond Exp $";
/* FUNCTION NAME:   static al_fdist()
** FUNCTION TITLE:  Find LSM to LSM Distances
**
** FUNCTIONAL DESCRIPTION:
**   The function is called to determine all LSM to LSM
**   distances in terms of the minimum number of pass-thru
**   ports it would be necessary for a cartridge to traverse to
**   get from one LSM to the other. On completion, the table
**   al_dists[] has been completely filled in.
**
** OPERATIONAL DESCRIPTION:
**   When this function is invoked it initially resets all
**   entries in the al_dists[] table to NOCNECT, indicating
**   that there is no path from one LSM to the other. The
**   al_dists[] table consists of a distance entry for each
**   possible pair of LSMs. The gl_dcnfg table is scanned.
**   For each port which exists and is functional the entry for
**   the pair of LSMs sharing that port is set to 1. Next,
**   successive passes are made adding the distance from LSM A
**   to LSM B to the distance from LSM B to LSM C, if both
**   these distances are known. This yields a distance from A
**   to C. Several distances from one LSM to another may be
**   found this way but the smallest is retained. Passes are
**   made until no distance value has changed over an entire
**   pass. At this point al_dists[] is complete.
**
** PREREQUISITES:
**   - gl_dcnfg is initialized
**
** SPECIAL CONSIDERATIONS:
**   (none)
**
**                TYPE    NAME            RANGE/DESCRIPTION
**                ----    ----            -----------------
** PARMS IN:      (none)
**
** RET VALS: void (none)
**
** EXT VARS:      al_dists[]              LSM to LSM distance table    (RW)
**                gl_dcnfg                ATHS configuration table     (R)
**
** H/W REGS:      (none)
**
** FUNCTNS:       (none)
**
** HISTORY:
**   07/16/85  fgm  Prologue created
**   07/23/85  fgm  Prologue reviewed
**   01/15/86  fgm  Code completed
**************************** END OF PROLOGUE *********************************/ include <com.h>
include "alc.h"
#include <ccm_extern.h>
include <alc_extern.h> void al_fdist( void )
{
    UCHAR lsmx;                  /* general LSM ID variable   */
    UCHAR lsmy;                  /* general LSM ID variable   */
    UCHAR lsmz;                  /* general LSM ID variable   */
    UCHAR cnt1;                  /* general count variable    */
```

```
Aug 18 1995 10:54:48                    al_fdist.c                          Page 2

UCHAR cnt2;                          /* general count variable        */
    BOOLEAN lsm_wrk[ MAXLSM ];           /* quick ref - LSM working       */
    int change;                          /* distance table change flag    */ struct dcf_ptp *cptp;                /* pointer to PTP descriptor     */
    /*-----------------------------------------------------------------------
    * Set LSM to LSM distances to NOCNECT (can't get there from here)
    * and set the LSM working array ( LSM is Online and Ready and
    * the arm is operational and at least one hand works )
    *-----------------------------------------------------------------------*/
    for ( lsmy = 0; lsmy < MAXLSM ; ++lsmy )
    {
        for ( lsmx = 0; lsmx < MAXLSM ; ++lsmx )
        {
            al_dists[ lsmx ][ lsmy ] = (lsmx == lsmy) ? 0 : NO_CNECT;
        }
        lsm_wrk[ lsmy ] =
            (( gl_dcnfg[lsmy].lsm.lsm_stat & (DCL_ONLN|DCL_RDY|DCL_OFFP)) ==
             ( DCL_ONLN | DCL_RDY ));

lsm_wrk[ lsmy ] = lsm_wrk[ lsmy ] &&
            (gl_dcnfg[ lsmy ].arm.arm_stat & DCA_OPER) &&
            ((gl_dcnfg[ lsmy ].hand[ HAND0 ].hand_sta & DCH_OPER) ||
             (gl_dcnfg[ lsmy ].hand[ HAND1 ].hand_sta & DCH_OPER) );
    }
    /*-----------------------------------------------------------------------
    * Set distance to 1 for adjoining, online LSM pairs
    *-----------------------------------------------------------------------*/
    for ( lsmy = 0; lsmy < MAXLSM ; ++lsmy )
    {
        if ( lsm_wrk[ lsmy ] )
        {
            for ( cnt1 = 0; cnt1 < MAXPTP; ++cnt1 )
            {
                cptp = &( gl_dcnfg[ lsmy ].ptp[ cnt1 ]);
                if ( ( ( cptp -> ptp_stat ) & ( DCP_BOSS | DCP_OPER ) ) ==
                     ( DCP_BOSS | DCP_OPER ) )
                {
                    if ( lsm_wrk[ cptp -> ptp_adj ] )
                    {
                        al_dists[ lsmx ][ cptp -> ptp_adj ][ lsmx ] = 1;
                        al_dists[ cptp -> ptp_adj ][ lsmx ] = 1;
                    }
                }
            }
        }
    }
    /*-----------------------------------------------------------------------
    * Cycle through pairs of LSM pairs to calculate new distances
    *-----------------------------------------------------------------------*/
    change = TRUE;
    while ( change )
    {
        change = FALSE;
        for ( lsmx = 0; lsmx < MAXLSM; ++lsmx )
            for ( lsmy = 0; lsmy < MAXLSM; ++lsmy )
            {
                if ( lsm_wrk[ lsmx ] )
                    for ( lsmy = 0; lsmy < MAXLSM; ++lsmy )
                    {
                        if ( (cnt1 = al_dists[ lsmx ][ lsmy ]) != NO_CNECT )
                            for ( lsmz = 0; lsmz < MAXLSM; ++lsmz )
                            {
                                cnt2 = al_dists[ lsmy ][ lsmz ];
```

```
Aug 18 1995 10:54:48          al_fdist.c                    Page 3 if (lsm_wrk[lsmz] && ( cnt2 != NO_CNECT ) )
          if ((cnt1 + cnt2) < al_dists[ lsmx ][ lsmz ])
          {
            al_dists( lsmx ) [ lsmz ] =
              al_dists[ lsmz ] [ lsmx ] = cnt1 + cnt2;
            change = TRUE;
          }
        }
      }
    }
  return;
}
```

```
Aug 18 1995 10:54:48                    al_enlst.c                              Page 1 static char rcsid[]="$Header: /home/twolf/davet/alc/RCS/al_enlst.c,v 1.4 1993/03/11 0
9:24:14 aarond Exp $";
/***********************        START OF PROLOGUE        **************************
 *
 *                      StorageTek SECRET
 *              Property of Storage Technology Corporation
 *              Do not copy or distribute unpublished work
 *
 *                         Copyright (1991)
 *                   Storage Technology Corporation
 *                        All Rights Reserved
 *
 * FUNCTION NAME:  (local)al_enlst()
 *
 * FUNCTIONAL DESCRIPTION:
 *
 *      This function accepts a pointer to a list, allocates a
 *      block of specified size and places it on the list. The
 *      parameter specifying the first data element is inserted in
 *      priority order on the list. Entries locate after the inserted
 *      entry are aged.
 *
 * RETURN VALUES:
 *      A pointer to the new entry.
 *
 *=================================================================================
 *
 * OPERATIONAL DESCRIPTION:
 *      This function accepts a pointer to a list and a partition ID.
 *      It allocates a block from the specified partition and links it
 *      on in order sequentially acording to priority.  Entries after
 *      the inserted entry are aged.
 *
 **********************        END OF PROLOGUE        *************************/ include "com.h"
include "alc.h"

#include "com_extern.h"
include "alc_extern.h"

struct COM_LINK *al_enlst(struct COM_LNK_LIST *list_ptr, /* pointer to linked list */
                int p_id, /* partition ID */
                struct alc_req *new_request, /* request to enqueue */
                enum alc_priority_computation compute_priority /* how to co
mpute priority */
                )
{
    struct COM_LINK *lptr;
    struct COM_LINK *temp_ptr;
    struct alc_req *request;                /* pointer to link */
    UCHAR t_priority,                       /* temporary pointer */
    UCHAR priority =                        /* temp request pointer */
        al_compute_new_priority ( new_request, compute_priority ) ;  /* temporary priority */
                                            /* priority of this request */
    /*                                       * priority of this request */
    /* Get a new link
     */
    com_gblock( p_id, (void **)&lptr );

/*
     * Add the new link to the list
     */
    if ( list_ptr->first == NULL )
```

```
Aug 18 1995 10:54:48                    al_enlst.c                              Page 2

{
        list_ptr->first = lptr;
        list_ptr->last  = lptr;
        lptr -> next_lnk = NULL;
    }
    else
    {
        /*-----------------------------------------------------------------------
         * We are going to enqueue this new request order of priority. The
         * highest priority is at the head of the list.
         *-----------------------------------------------------------------------*/
        /* If the first entry is the highest priority, then put it there
         *-----------------------------------------------------------------------*/
        request = (struct alc_req *)(list_ptr -> first -> lnk_data[0]);
        t_priority = al_compute_new_priority( request, compute_priority );

if ( t_priority < priority )
        {
            lptr->next_lnk = list_ptr->first;
            list_ptr->first = lptr;
            al_age ( lptr -> next_lnk ); /* age the rest of the requests */
        }
        else
        {
            /*
             * the new entry doesn't have highest priority;
             * walk down the list to find its home
             */
            temp_ptr = list_ptr -> first;

while ( temp_ptr->next_lnk != NULL )
            {
                request = (struct alc_req *)(temp_ptr -> next_lnk -> lnk_data[0]);
                if ( priority >
                    al_compute_new_priority( request, compute_priority ) )
                {
                    /*
                     * this request's priority is higher than the next
                     * therefore insert this request in the linked list
                     *-----------------------------------------------------------*/
                    lptr->next_lnk = temp_ptr -> next_lnk;
                    temp_ptr -> next_lnk = lptr;
                    al_age ( lptr -> next_lnk ); /* age the remaining (lower priori
ty) requests */
                    break;
                }
                temp_ptr = temp_ptr->next_lnk;
            } if (temp_ptr->next_lnk == NULL )
            {
                /*-------------------------------------------------------------
                 * this new request must have lower priority than the lowest existin
g,
                 * there's no need to age, as there's nothing lower
                 *-------------------------------------------------------------*/
                lptr -> next_lnk = NULL;
                list_ptr->last->next_lnk = lptr;
                list_ptr->last = lptr;
            }
        }
    }
    /*-----------------------------------------------------------------------
```

```
Aug 18 1995 10:54:48          al_enlst.c                    Page 3

* Put the first data element into the link
 *--------------------------------------------------------------*/
 lptr -> lnk_data[ REQUEST ] = (int) new_request;

/*--------------------------------------------------------------
 * Return the pointer to the new link
 *--------------------------------------------------------------*/
 return( lptr );
}
```

```
Aug 18 1995 10:54:48                    al_drop.c                                      Page 1 static char rcsid[]="$Header: /home/twolf/davet/alc/RCS/al_drop.c,v 1.2 1993/02/23 17
:49:31 asrond Exp $";
/* FUNCTION NAME:    static al_drop()
**
** FUNCTION TITLE:   Drop Allocated Resources for Request
**
** FUNCTIONAL DESCRIPTION:
**   This function accepts a pointer to an Allocation Request
**   and drops the allocations for any resources that may have
**   been released to it.
**
** OPERATIONAL DESCRIPTION:
**   This function accepts a request. It checks to see if any
**   of the requested resources may have been allocated. If any
**   resources have been allocated, those resources are
**   released.
**
** PREREQUISITES:
**   - a request has been received and partially processed
**
** SPECIAL CONSIDERATIONS:
**   (none)
**
**         TYPE       NAME           RANGE/DESCRIPTION
**         ----       ----           -----------------
** PARMS IN: struct  *request        the allocation request ptr
**         short     resrc0          resource to drop #0
**         short     resrc1          resource to drop #1
**         short     resrc2          resource to drop #2
**
** RET VALS: void    (none)
**
** EXT VARS:         (none)
**
** H/W REGS:         (none)
**
** FUNCTNS:          ul_rschg()      resource change - post to queue
**
** HISTORY:
** 03/31/86   fgm    Prologue created
** --/--/--   fgm    Prologue reviewed
** 03/31/86   fgm    Code completed
** 12/16/88   fgm    Change from al_retrn() to ul_rschg to avoid recursn
**************** END OF PROLOGUE ********************/
#include <com.h>
include "alc.h"
#include <utl_proto.h>
#include <com_extern.h>
include <alc_extern.h> void al_drop(struct alc_req *request, /* ptr to orig request */
             short resrc0,             /* rersource to drop */
             short resrc1,             /* resource to drop */
             short resrc2)             /* rersource to drop */
{
    UCHAR lsm;          /* id of primary LSM      */
    UCHAR lsm2;         /* id of secondary LSM    */
    UCHAR tmp;          /* counter variable       */
    UCHAR src_dst;      /* source/destination sel */
    UCHAR lsmx;         /* any LSM                */
    UCHAR cid;          /* CAP ID                 */
    UCHAR alc_msk;      /* allocation bit mask    */
```

```
Aug 18 1995 10:54:48                    al_drop.c                                      Page 2

UCHAR qual_sl;          /* qualifier selector     */

/*----------------------------------------------
 * Initialize local variables
 *----------------------------------------------*/
lsm  = ( request -> prim_lsm ) & LSM_MASK;
lsm2 = request -> qualif_0;
switch ( request -> req_typ )
{
case ARQ_SSWP:
case ARQ_PATH:
    /*-----------------------------------------------------------
     * De-allocate CAP or drive that may have been allocated
     *-----------------------------------------------------------*/
    for ( src_dst = 1; src_dst <= 2; ++src_dst )
    {
        if ( src_dst == 1 )
        {
            lsmx = lsm;
            alc_msk = PLC_ABEG;
            qual_sl = request -> qualif_1;
        }
        else
        {
            lsmx = lsm2;
            alc_msk = PLC_AEND;
            qual_sl = request -> qualif_2;
        }
        /*-------------------------------------------------------
         * If the resource has not been allocated then skip it
         *-------------------------------------------------------*/
        if ( ! ( request -> prim_lsm & alc_msk ) )
        {
            continue;
        }
        /*-------------------------------------------------------
         * see if CAP was allocated; if it was, drop it
         *-------------------------------------------------------*/
        if ((( qual_sl & PLC_MASK ) == PLC_CAP ) &&
            ( request -> prim_lsm & alc_msk ) )
        {
            cid = qual_sl & PLC_CPID;
            if ( ( !~(gl_dcnfg[ lsmx ].cap[ cid ].cap_mcnt)) == 0 )
            {
                gl_dcnfg[ lsmx ].cap[ cid ].cap_stat &= ~DCC_MOTN;
            }
            request -> prim_lsm &= ~alc_msk;
        }
        /*-------------------------------------------------------
         * Deallocate drive (if the tasks match)
         *-------------------------------------------------------*/
        if ((( qual_sl & PLC_MASK ) == PLC_DRIV ) &&
            ( request -> prim_lsm & alc_msk ) )
        {
            temp = ( qual_sl & PLC_TAPU ) >> 2;
            if ( ( gl_dcnfg[ lsmx ].tapu[ temp ].
                   drive[ qual_sl & PLC_DRID ].driv_tsk )
                 == request -> req_task )
            {
                gl_dcnfg[ lsmx ].tapu[ temp ].
                    drive[ qual_sl & PLC_DRID ].driv_sta &= ~DCD_ALLC;
                request -> prim_lsm &= ~alc_msk;
            }
        }
```

```
                                                                                       Page 3
Aug 18 1995 10:54:48              al_drop.c }
        return;

case ARQ_ARHD:
    case ARQ_AHPH:
    case ARQ_ARPH:
        /*---------------------------------------------------------------
         * De-allocate a hand that may have been allocated
         *-------------------------------------------------------------*/
        if ( resrc0 != NOT_ALLC )
        {
            ul_rschg( RCT_DEAL, RST_HAND, resrc0, lsm );
        }
        /*---------------------------------------------------------------
         * Release Pass-thru Port Mech that may have been allocated
         *-------------------------------------------------------------*/
        if ( resrc2 != NOT_ALLC )
        {
            ul_rschg( RCT_DEAL, RST_PTP, resrc2, resrc1 );
        }
        return;
        /*---------------------------------------------------------------
         * Not a request that might have allocated anything
         *-------------------------------------------------------------*/
    default:
        return;
    }
```

```
static char rcsid[]="$Header: /home/twolf/davet/alc/RCS/al_delst.c,v 1.3 1993/02/23 1
7:49:26 aarond Exp $";
/* FUNCTION NAME:   static al_delst()
**
** FUNCTION TITLE:  Take a Link Off a List
**
** FUNCTIONAL DESCRIPTION:
**   This function accepts a pointer to a list, and a pointer
**   to a link on that list and a pointer to the previous link
**   (NULL if link is first). It removes the specified link. A
**   partition ID also specifies how the link is to be
**   deallocated.
**
** OPERATIONAL DESCRIPTION:
**   This function accepts a pointer to a list and a pointer to
**   a link, a pointer to the previous link and a partition ID.
**   The link is removed from the list. The list made to be
**   correct. The link is deallocated.
**
** PREREQUISITES:
**   (none)
**
** SPECIAL CONSIDERATIONS:
**   (none)
**
**          TYPE     NAME        RANGE/DESCRIPTION
**          ----     ----        -----------------
** PARMS IN: struct  *list_ptr   pointer to a linked list
**           struct  *prev_ptr   pointer to previous link
**           struct  *link_ptr   pointer to link to be removed
**           int     p_id        partition ID
**
** RET VALS: void    (none)
**
** EXT VARS:         (none)
**
** H/W REGS:         (none)
**
** FUNCTNS:          (none)
**
** HISTORY:
** 01/07/86   fgm   Prologue created
** --/--/--   fgm   Prologue reviewed
** 01/20/86   fgm   Code completed
**
**************** END OF PROLOGUE ****************/
#include <com.h>
include "alc.h"
#include <com_extern.h>
include <alc_extern.h> void al_delst( struct COM_LNK_LIST *list_ptr, /* pointer to linked list */
               struct COM_LINK *prev_ptr, /* ptr to previous link */
               struct COM_LINK *link_ptr, /* pointer to link */
               int p_id )                 /* partition ID */
{
   /*--------------------------------------------------------
    * Remove the link from the forward chain
    *--------------------------------------------------------*/
   if ( prev_ptr == NULL )
   {
      list_ptr -> first = link_ptr -> next_lnk;
   }
   else
   {
      prev_ptr -> next_lnk = link_ptr -> next_lnk;
   }

/*--------------------------------------------------------
    * If link is the last on the chain, fix the 'last' pointer
    *--------------------------------------------------------*/
   if ( list_ptr -> last == link_ptr )
   {
      list_ptr -> last = prev_ptr;
   }

/*
    * Deallocate the link
    */
   com_rblock( p_id, link_ptr );

return;
}
```

```
Aug 18 1995 10:54:48                    al_deall.c                          Page 1 static char rcsid[]="$Header: /home/twolf/davet/alc/RCS/al_deall.c,v 1.2 1993/02/23 1
7:49:22 msrond Exp $";
/********************************************************************
*  FUNCTION NAME:    static al_deall()
*
*  FUNCTION TITLE:   Deallocate All LSM Resources
*
*  FUNCTIONAL DESCRIPTION:
*     This function accepts an LSM ID.  It deallocates all
*     resources for that LSM.
*
*  OPERATIONAL DESCRIPTION:
*     This function accepts an LSM ID.  It goes through the
*     description of that LSM in gl_dcnfg and deallocates all
*     resources for it.
*
*  PREREQUISITES:
*     - the allocation data structures are initialized
*
*  SPECIAL CONSIDERATIONS:
*     (none)
*
*                TYPE       NAME               RANGE/DESCRIPTION
*                ----       ----               -----------------
*  PARMS IN:     int        lsm                ID of LSM of interest
*
*  RET VALS: void           (none)
*
*  EXT VARS:     gl_dcnfg                      ATHS configuration
*
*  H/W REGS:                (none)
*
*  FUNCTNS:                 (none)
*
*  HISTORY:
*    03/28/86    fgm    Prologue created
*    --/--/--    fgm    Prologue reviewed
*    03/28/86    fgm    code completed
*
*********************** END OF PROLOGUE *****************************/
#include <com.h>
include "alc.h"
#include <com.extern.h>
include <alc.extern.h> void al_deall(
     UCHAR lsm)                      /* ID of LSM to deall     */
{
    register int count1;             /* counter variable       */
    register int count2;             /* counter variable       */
    struct dcf_ptp *ptp_ptr;         /* pointer to PTP descriptor */
    struct alr_disam *lsm_cnfg;      /* pointer to LSM config  */

/* Check that the LSM exists */
    lsm_cnfg = &( gl_dcnfg[ lsm ] );

if ( ! (lsm_cnfg -> lsm.lsm_stat & DCL_EXST ) )
    {
        return;
    }

/*----------------------------------------------------------------*/
    * Deallocate the arm
```

```
Aug 18 1995 10:54:48                    al_deall.c                          Page 2 lsm_cnfg -> arm.arm_stat &= ~DCA_ALLC;

/*----------------------------------------------------------------*/
    * Deallocate the hands
    *----------------------------------------------------------------*/
    for ( count1 = 0; count1 < MAXHAND; ++count1 )
    {
        lsm_cnfg -> hand[ count1 ].hand_sta &= ~DCH_ALLC;
    }

/*----------------------------------------------------------------*/
    * Deallocate the drives
    *----------------------------------------------------------------*/
    for ( count1 = 0; count1 < MAXTAPU; ++count1 )
    {
        if ( lsm_cnfg -> tapu[count1].tapu_pnl != DCT_NXST )
        {
            for ( count2 = 0; count2 < MAXPDRV; ++count2 )
            {
                lsm_cnfg -> tapu[ count1 ].drive[ count2 ].driv_sta &= ~DCD_ALLC;
            }
        }
        else
        {
            break;
        }
    }

/*----------------------------------------------------------------*/
    * Deallocate the CAP
    *----------------------------------------------------------------*/
    for ( count1 = 0; count1 < MAXCAP; ++count1 )
    {
        if ( lsm_cnfg -> cap[ count1 ].cap_stat & DCC_EXST )
        {
            lsm_cnfg -> cap[ count1 ].cap_stat &= ~DCC_ALLC;
        }
    }

/*----------------------------------------------------------------*/
    * Deallocate ALL pass thru ports and slots connected to this LSM
    *----------------------------------------------------------------*/
    for ( count1 = 0; count1 < MAXPTP; ++count1 )
    {
        if ( lsm_cnfg -> ptp[ count1 ].ptp_stat & DCP_EXST )
        {
            lsm_cnfg -> ptp[ count1 ].ptp_stat &= ~DCP_ALLC;
            ptp_ptr = &( gl_dcnfg[ lsm_cnfg->ptp[count1].ptp_adj1 ].
                         ptp[ lsm_cnfg->ptp[count1].ptp_adjp ]);

ptp_ptr -> ptp_stat &= ~DCP_ALLC;

for ( count2 = 0; count2 < MAXSLOT; ++count2 )
            {
                lsm_cnfg -> ptp[ count1 ].slot[ count2 ].slot_sta &=
                    ~( DCS_ALLC | DCS_PREA );
                ptp_ptr -> slot[ count2 ].slot_sta &= ~(DCS_ALLC|DCS_PREA);
            }
        }
        else
        {
            break;
        }
    }
```

```
/*----------------------------------------
 * Everything is now deallocated for this LSM
 *---------------------------------------*/
return;
}
```

```
static char rcsid[]="$Header: /home/twolf/davet/alc/RCS/al_aarm.c,v 1.2 1993/02/23 17
:48:09 marond Exp $";
/* FUNCTION NAME:   static al_aarm()

FUNCTION TITLE:  Allocate an Arm

FUNCTIONAL DESCRIPTION:
       This function on LSM ID and a task ID. It tries to
       allocate the arm in the specified LSM to the specified
       task. If it can be allocated, the arm is. If the arm is
       not functional a rejection is returned. If the arm is
       working but is currently in use, FAIL is returned.

OPERATIONAL DESCRIPTION:
       The gl_dcnfg table is read to check the availability of
       the arm. If it is available, it is allocated. If it is
       inoperative, a rejection ( R_ALARM ) is returned. If it is
       usable but currently in use FAIL is returned.

PREREQUISITES:
       - the gl_dcnfg    structure is initialized

SPECIAL CONSIDERATIONS:
       (none)

TYPE    NAME         RANGE/DESCRIPTION
                 ----    ----         -----------------
   PARMS IN:     int     lsm          LSM in which arm is located
                 short   t_id         ID of task making req RET VALS:     int     RET_OK       allocated
                 int     FAIL         not available
                 int     R_ALARM      not functional EXT_VARS:     gl_dcnfg             ATHS configuration table   (RW)

H/W REGS:     (none)

FUNCTNS:      (none)

HISTORY:
   07/10/85    fgm   Prologue created
   07/23/85    fgm   Prologue reviewed
   01/15/86    fgm   Code completed
*********************** END OF PROLOGUE *********************/
#include "com.h"
include "alc.h"
#include "com_extern.h"
include "alc_extern.h"

int al_aarm( UCHAR lsm,            /* LSM ID                        */
             UCHAR t_id )          /* ID of task req arm            */
{
    struct dcf_arm  *rarm;          /* pointer to arm descriptor    */
    UCHAR *rarmst;                  /* pointer to arm status        */

/*---------------------------------------------------------------
     * Initialize pointers into configuration table
     *--------------------------------------------------------------*/
    rarm = & ( gl_dcnfg[ lsm ].arm );
    rarmst = & ( rarm -> arm_stat );
```

```
    /*---------------------------------------------------------------
     * If the arm is not operating reject the request
     *--------------------------------------------------------------*/
    if ( ( ! (*rarmst & DCA_OPER ) )
    {
         return( R_ALARM );
    }

/*---------------------------------------------------------------
     * If the arm mechanism is allocated then return FAIL
     *--------------------------------------------------------------*/
    if ( *rarmst & DCA_ALLC )
    {
         return( FAIL );
    }

/*---------------------------------------------------------------
     * This arm may be allocated - allocate it
     *--------------------------------------------------------------*/
    *rarmst |= DCA_ALLC;
    rarm -> arm_tsk = t_id;

return ( RET_OK );
}
```

```
Aug 18 1995 10:54:48                    al_acap.c                                    Page 1 static char resid[]="$Header: /home/twolf/davet/alc/RCS/al_acap.c,v 1.5 1993/02/23 17
:40:30 aacond Exp $";
/* FUNCTION NAME:    static al_acap()

FUNCTION TITLE:   Allocate a CAP

FUNCTIONAL DESCRIPTION:
        This function accepts an LSM ID, a request type ( reserve,
        enter, eject or motion ) for the CAP, a task ID and a host
        ID. If the CAP is allocatable for the desired purpose it
        will be allocated and RET_OK is returned. If it cannot be
        allocated for any reason, a rejection code is returned.

OPERATIONAL DESCRIPTION:
        If CAP reserve is requested, gl_dcnfg   table is checked.
        A rejection is issued if the CAP is already allocated. If
        it is not allocated, the CAP reserve is granted to the
        requesting task and gl_dcnfg  is updated to show this and
        to identify the reserving host.

If a CAP Enter or Eject is requested, gl_dcnfg    is
        checked to make sure the requesting host has the CAP
        reserved and that no motion commands are currently active
        against that CAP. The gl_dcnfg   table is update to
        indicate that the CAP is Enter or Eject mode and to show
        the id of the task to which it is allocated.

If a motion request is made against a CAP (a path to or
        from the CAP is requested), gl_dcnfg  is checked to make
        sure the requesting host has reserved the CAP and that the
        CAP is not in either Enter or Eject mode. The count of
        motion commands against this CAP is incremented. No task
        id is stored since several motion commands may be active
        at any one time.

PREREQUISITES:
        - the queue al_wtpth     must have been initialized
        - the queue al_wtdrv     must have been initialized SPECIAL CONSIDERATIONS:
        (none)

TYPE    NAME      RANGE/DESCRIPTION
                 ----    ----      -----------------
   PARMS IN:     int     lsm       CAP LSM
                 int     cid       CAP ID
                 int     rqtype    CAP request type
                 int     t_id      ID of task making request
                 int     h_id      ID of host making request RET VALS:     int     RET_OK         allocated per request
                         R_ALNRSV       not reserved
                         R_ALARSV       already reserved
                         R_ALENTR       in ENTER
                         R_ALEJCT       in EJECT
                         R_ALMOTN       motion cmd active
                         R_ALOPEN       CAP open
                         R_ALOPER       not operable EXT VARS:     gl_dcnfg          ATHS configuration table  (RW)

H/W REGS:     (none)

FUNCTNS:      (none)
```

```
Aug 18 1995 10:54:48                    al_acap.c                                    Page 2

HISTORY:
        07/10/85    fgm    Prologue created
        07/23/85    fgm    Prologue reviewed
        01/15/86    fgm    Code completed
        11/06/90    fgm    Multi-CAP support
****************************  END OF PROLOGUE  *****************************/
#include <com.h>
include "alc.h"
#include <com_extern.h>
include <calc_extern.h> int al_acap(UCHAR lsm,
            enum alc_allocation_requests rqtype,   /* CAP request type */
            UCHAR  t_id,                           /* CAP ID */
            UCHAR *h_id,                           /* ID of task making request */
            int recov)                             /* ID of host with allocation */
                                                   /* recovery flag */
{
    struct alr_dlsm *rlsm;         /* pointer to LSM descriptor */
    struct dcf_cap  *rcap;         /* pointer to CAP descriptor */
    int rej_flag = RET_OK;         /* reject flag */
    int              scap;         /* CAP status */

/*----------------------------------------------------------------------------
 * Initialize pointers; set return value to default of RET_OK
 *--------------------------------------------------------------------------*/
    rlsm = & gl_dcnfgl[ lsm ];
    rcap = & ( rlsm -> cap[ cid ] );
    scap = rcap -> cap_stat;

/*
 * Unless this is a reserve, must be reserved, to the proper host
 */
if ( ( rqtype != ARQ_CAPR )
    && (!( ( scap & DCC_ALLC ) && ( rcap -> cap_host == *h_id ) ) ) )
{
    *h_id = rcap -> cap_host;
    return( R_ALNRSV );
}
/*----------------------------------------------------------------------------
 * Switch on the type of request
 *--------------------------------------------------------------------------*/
switch ( rqtype )
{
    case ARQ_CDRP:
    /*
     * Drop Host allegiance - OK if no motion or catalog
     */
    if ((! scap & ( DCC_MOTN | DCC_CATL )))
    {
        /*
         * No rejects - grant the specific request
         */
        ( rcap -> cap_stat ) &= ~DCC_ALLC;
    }
    /*
     * Set the appropriate rejection code
     */
    else
        rej_flag = FAIL;
```

```
                              al_acap.c                         Page 3
Aug 18 1995 10:54:48
         )
         break;

case ARQ_CAPR:
       /*-----------------------------------------------------------*
        * Reserve is granted if operational and not allocated
        *-----------------------------------------------------------*/
       if ( scap & DCC_OPER )
       {
           if ( ( !( scap & DCC_ALLC ) ) || ( recov == Q2_RCVR ) )
           {
               rcap -> cap_stat |= DCC_ALLC;
               rcap -> cap_tsk = t_id;
               rcap -> cap_host = *h_id;
               if ( recov != Q2_RCVR )
                   rcap -> cap_mcnt = 0;
           }
           else
           {
               rej_flag = R_ALRSV;
               *h_id = rcap -> cap_host;
           }
       }
       else
           rej_flag = R_ALCOPR;

break;

case ARQ_EJCT:
    case ARQ_ENTR:
    case ARQ_CREL:
       /*-----------------------------------------------------------*
        * Enter/Eject/Release only if not in Enter/Eject/Motion/Cat
        *-----------------------------------------------------------*/
       if (!( scap & ( DCC_ENTR | DCC_EJCT | DCC_MOTN | DCC_CATL )))
       {
           /*-------------------------------------------------------*
            * No rejects - grant the specific request
            *-------------------------------------------------------*/
           if ( rqtype == ARQ_ENTR )
               ( rcap -> cap_stat ) |= DCC_ENTR;
           else
           if ( rqtype == ARQ_EJCT )
               ( rcap -> cap_stat ) |= DCC_EJCT;
           else
           {
               ( rcap -> cap_stat ) &= ~DCC_ALLC;
               rcap -> cap_tsk = t_id;
               rcap -> cap_mcnt = 0;
           }
       }
       /*-----------------------------------------------------------*
        * Set the appropriate rejection code
        *-----------------------------------------------------------*/
       else
```

```
                              al_acap.c                         Page 4
Aug 18 1995 10:54:48
           (
               rej_flag = FAIL;
           )
           break;

case ARQ_PATH:
       /*-----------------------------------------------------------*
        * Motion request only if not in Enter/Eject/Catalog
        *-----------------------------------------------------------*/
       if ( !( ( rcap -> cap_stat & ( DCC_ENTR | DCC_EJCT | DCC_CATL ) ) ) )
       {
           /*-------------------------------------------------------*
            * Keep count of the number of active motions
            *-------------------------------------------------------*/
           if ( rcap -> cap_stat & DCC_MOTN )
               ++( rcap -> cap_mcnt );
           else
           {
               rcap -> cap_stat |= DCC_MOTN;
               rcap -> cap_mcnt = 1;
           }
       }
       else
           rej_flag = FAIL;

break;

case ARQ_CCAT:
       /*-----------------------------------------------------------*
        * Catalog request only if not in Enter/Eject/Motion
        *-----------------------------------------------------------*/
       if ( !( ( rcap -> cap_stat & ( DCC_ENTR | DCC_EJCT |
                                      DCC_MOTN ) ) ) )
       {
           /*-------------------------------------------------------*
            * Set CAP to catalog mode
            *-------------------------------------------------------*/
           rcap -> cap_stat |= DCC_CATL;
       }
       else
           rej_flag = FAIL;

break;

case ARQ_CLOK:
       /*-----------------------------------------------------------*
        * No further check - the host can lock at any time
        *-----------------------------------------------------------*/
       break;

default:
       /*-----------------------------------------------------------*
        * Unknown Request
        *-----------------------------------------------------------*/
       rej_flag = R_ALUKRN;
       break;

)                                           /* end of switch */
```

```
/*---------------------------------------------------------------
 * Break out the rejection reasons by the current CAP status
 *---------------------------------------------------------------*/
if ( rej_flag == FAIL )
{
    if ( scap & DCC_ENTR )
        rej_flag = R_ALENTR;
    if ( scap & DCC_EJCT )
        rej_flag = R_ALEJCT;
    if ( scap & DCC_MOIN )
        rej_flag = R_ALMOVE;
    if ( scap & DCC_CATL )
        rej_flag = R_ALCAT;
}
return( rej_flag );
}
```

```
Aug 18 1995 10:54:48                    al_adriv.c                              Page 1 static char rcsid[]="$Header: /home/twolf/davet/alc/RCS/al_adriv.c,v 1.2 1993/02/23 1
7:49:48 aaron Exp $";
/* FUNCTION NAME:    static al_adriv()                                          */
/*                                                                              */
/* FUNCTION TITLE:   Allocate a Tape Drive                                      */
/*                                                                              */
/* FUNCTIONAL DESCRIPTION:                                                      */
/*   This function accepts an LSM ID, a drive ID and a task ID.                 */
/*   It attempts to allocate the drive. The drive is allocated                  */
/*   if possible. If it cannot be currently allocated because                   */
/*   it is in use, FAIL is returned. If the request is rejected                 */
/*   for any reason rejection code is returned.                                 */
/*                                                                              */
/* OPERATIONAL DESCRIPTION:                                                     */
/*   The gl_dcnfg  table is read to check the availability of                   */
/*   the drive. If the drive is available, it is allocated. If                  */
/*   the drive is full then FAIL is returned. The queue must be                 */
/*   scanned to insure that there are no other requests for the                 */
/*   same drive in the queue. If there are, the new request is                  */
/*   rejected.                                                                  */
/*                                                                              */
/* PREREQUISITES:                                                               */
/*   - the gl_dcnfg  structure must be initialized                              */
/*                                                                              */
/* SPECIAL CONSIDERATIONS:                                                      */
/*   (none)                                                                     */
/*                                                                              */
/*            TYPE      NAME        RANGE/DESCRIPTION                           */
/*            ----      ----        -----------------                           */
/* PARMS IN:  int       lsm         Drive LSM ID                                */
/*            int       tu_id       tape unit ID                                */
/*            int       d_id        Drive ID                                    */
/*            int       t_id        ID of task making req                       */
/*            int       sswp_flg    swap to same drive flag                     */
/*            int       mnt_flg     drive-is-destination flag                   */
/*            int       retry       this is a retry (T/F)                       */
/*                                                                              */
/* RET VALS:  int       RET_OK      allocated                                   */
/*            int       FAIL        placed in the wait drive queue              */
/*            int       R_ALEXST    drive does not exist                        */
/*            int       R_ALOPER    drive is not operational                    */
/*            int       R_ALALLC    already allocated                           */
/*            int       R_ALOSRQ    outstanding request                         */
/*                                                                              */
/* EXT_VARS:  gl_dcnfg              ATHS configuration table       (RW)         */
/*                                                                              */
/* H/W REGS:  (none)                                                            */
/*                                                                              */
/* FUNCTNS:   (none)                                                            */
/*                                                                              */
/* HISTORY:                                                                     */
/*   07/10/85   fgm    Prologue created                                         */
/*   07/23/85   fgm    Prologue reviewed                                        */
/*   01/15/86   fgm    Code completed                                           */
/*   08/01/88   fgm    Added drive as source allocation (mnt_flg)               */
/*   09/22/88   fgm    Make allocation specific to mount/dismount               */
/***********************  END OF PROLOGUE  *********************************/ include <com.h>
include "alc.h"
#include <com_extern.h>
include <alc_extern.h> int al_adriv(UCHAR lsm,
             UCHAR tu_id,                   /* Drive LSM ID     */
                                            /* tape unit ID     */
```

```
Aug 18 1995 10:54:48                    al_adriv.c                              Page 2

UCHAR d_id,                    /* Drive ID                         */
             UCHAR t_id,                    /* ID of task req drive             */
             BOOLEAN sswp_flg,              /* self-swap flag (T/F)             */
             BOOLEAN mnt_flg,               /* drive-is-destination flag        */
             BOOLEAN retry)                 /* this is not the first try        */
{
    struct alr_dism *rlsm;                  /* pointer to LSM descriptor        */
    struct dcf_driv *rdrv;                  /* pointer to drive descript        */
    BOOLEAN que_flag;                       /* queue up a mount flag            */
    UCHAR sdrv;                             /* drive status                     */
    struct COM_LINK *lptr;                  /* pointer into link list           */

/*-----------------------------------------------------------------
     * Initialize pointers and return value; make sure drive exists
     *---------------------------------------------------------------*/
    rlsm = & gl_dcnfg[ lsm ];
    rdrv = & ( rlsm -> tapu[ tu_id ].drive[ d_id ] );
    sdrv = rdrv -> driv_sta;

if ( !( sdrv & DCD_EXST ) )
    {
        return( R_ALEXST );
    } if ( !( sdrv & DCD_OPER ) )
    {
        return( R_ALOPER );
    }

/*-----------------------------------------------------------------
     * If this is a Dismount or a Self-Swap then just....
     *---------------------------------------------------------------*/
    if ( ( !mnt_flg ) || ( sswp_flg ) )
    {
        /*-------------------------------------------------------------
         * Check to see if the drive is allocated
         *-----------------------------------------------------------*/
        if ( sdrv & DCD_ALLC )
        {
            return( R_ALALLC );
        }
    }
    /*-----------------------------------------------------------------
     * If this is a mount....
     *---------------------------------------------------------------*/
    else
    {
        /*-------------------------------------------------------------
         * Check to see if the drive is allocated
         *-----------------------------------------------------------*/
        que_flag = FALSE;

if ( sdrv & DCD_ALLC )
        {
            /* If it's allocated for a mount, that's not good.
             * But if there's a dismount then we can queue the mount
             */
            if ( sdrv & DCD_DMNT )
            {
                que_flag = TRUE;
            }
            else
            {
```

```
                return( R_ALALLC );
        }

/*-----------------------------------------------------------
         * If the drive isn't allocated but IS full then queue the
         * mount in case we have a dismount about to be done
         *-----------------------------------------------------------*/
        else
        {
            if ( sdrv & DCD_FULL )
            {
                que_flag = TRUE;
            }
        }

/*-----------------------------------------------------------
         * If we need to queue the mount, make sure no other task
         * is waiting for the drive
         *-----------------------------------------------------------*/
        if ( que_flag )
        {
            if ( retry )
            {
                return( FAIL );
            } lptr = al_wtdrv[ lsm ].first;
            while ( lptr != NULL )
            {
                if ( (((struct allc_req *)(lptr -> lnk_data[ 0 ])) ->
                       qualif_2 & ( PLC_TAPU | PLC_DRID ) ) ==
                      ((tu_id << 2 ) | d_id ) )
                {
                    /*-----------------------------------------------
                     * already spoken for - reject this request
                     *-----------------------------------------------*/
                    return( R_ALOSRQ );
                }
                lptr = lptr -> next_lnk;
            }

/*-----------------------------------------------------------
             * No one else is waiting - just set return code to FAIL
             * so we can queue the mount for the dismount
             *-----------------------------------------------------------*/
            return( FAIL );
        }

/*-----------------------------------------------------------
     * This drive can be allocated - do it - mark it as mount or
     * dismount  (note: Self-swap is considered a mount )
     *-----------------------------------------------------------*/
    rdrv -> driv_sta |= DCD_ALLC;
    rdrv -> driv_tsk  = t_id;
    if ( ( mnt_flg ) || ( sswp_flg ) )
    {
        rdrv -> driv_sta &= ~DCD_DMNT;
    }
    else
    {
        rdrv -> driv_sta |= DCD_DMNT;
    }
    return ( RET_OK );
```

```
Aug 18 1995 10:54:48                    al_age.c                                       Page 1
/*******************   START OF PROLOGUE   *****************************************
 *
 *                      StorageTek SECRET
 *              Property of Storage Technology Corporation
 *              Do not copy or distribute unpublished work
 *
 *                         Copyright (1991)
 *                   Storage Technology Corporation
 *                      All Rights Reserved
 *
 * FUNCTION NAME:  (local)al_age()
 *
 * FUNCTIONAL DESCRIPTION:
 *
 *      This function ages (increases priority) of all entries on the
 *      linked list.  Entries with minimum and maximum priorities are not
 *      aged, and an entry can never reach the maximum priority
 *
 * RETURN VALUES:
 *      none
 *================================================================================
 * OPERATIONAL DESCRIPTION:
 *
 *      This function checks
 *
 ******************   END OF PROLOGUE   ***************************************/ include "com.h"
include "alc.h"
#include "com_extern.h"
include "alc_extern.h"

void al_age ( struct COM_LINK *start )
{
    register struct COM_LINK *node = start;

while (node)
    {
        struct alc_req *request = ( ( struct alc_req *) node->lnk_data[REQUEST]);

(request -> age)++;

/*--------------------------------------------------------------
         * examine all nodes down list
         *--------------------------------------------------------------*/
        node = node -> next_lnk;
    }
}
```

```
Aug 18 1995 10:54:48                    al_ahand.c                           Page 1 static char rcsid[]="$Header: /home/twolf/davet/alc/RCS/al_ahand.c,v 1.4 1993/06/07 1
7:59:36 second Exp $";
/*
/* FUNCTION NAME:    static al_ahand()
/*
/* FUNCTION TITLE:   Allocate a Hand
/*
/* FUNCTIONAL DESCRIPTION:
/*   This function accepts an LSM ID, a task ID and a location
/*   in which to place the ID of the hand, if allocated. If the
/*   hand is allocated, RET_OK is returned. FAIL is returned if
/*   the hands are both currently in use. If neither hand is
/*   usable a reject code is returned.
/*
/* OPERATIONAL DESCRIPTION:
/*   The gl_dcnfg table is read to check the availability of
/*   a hand. If a hand is available, it is allocated. If both
/*   hands are inoperative, a rejection ( R_ALHAND ) is
/*   returned. If a hand is usable but neither hand is
/*   currently unused, FAIL is returned.
/*
/* PREREQUISITES:
/*   - the gl_dcnfg  structure is initialized
/*
/* SPECIAL CONSIDERATIONS:
/*   (none)
/*
/*               TYPE    NAME          RANGE/DESCRIPTION
/*               ----    ----          -----------------
/* PARMS IN:     int     lsm           hand LSM
/*               int     t_id          ID of task making req
/*               short   *ahand        ptr to allocated hand ID
/*
/* RET VALS:     int     RET_OK        allocated
/*               int     FAIL          no hand available
/*               int     R_ALHAND      no hand functional
/*
/* EXT_VARS:     gl_dcnfg              ATHS configuration table    (RW)
/*
/* H/W REGS:     (none)
/*
/* FUNCTNS:      (none)
/*
/* HISTORY:
/*   07/10/85    fgm  Prologue created
/*   07/23/85    fgm  Prologue reviewed
/*   01/15/86    fgm  Code completed
/*
/***************** END OF PROLOGUE ********************/
#include "com.h"
include "alc.h"
#include "com.extern.h"
#include "alc.extern.h"
#include "cmg_user.h"

al_ahand(
    UCHAR lsm,
    UCHAR t_id,
    UCHAR *ahand)
{
    struct alr_dlsm *rlsm =
        &gl_dcnfg[ lsm ];
    struct dcf_hand *rhand0 =
        &( rlsm -> hand[ 0 ] );
    struct dcf_hand *rhand1 =
        &( rlsm -> hand[ 1 ] );
```

```
Aug 18 1995 10:54:48                    al_ahand.c                           Page 2 register unsigned rcode = 0;        /* return code storage         */
    UCHAR thand = -1;                   /* temporary hand holder       */ define OP0 1                           /* bit for hand 0 operational  */
define OP1 2                           /* bit for hand 1 operational  */
#define AL0 4                           /* bit for hand 0 allocated    */
#define AL1 8                           /* bit for hand 1 allocated    */

/*-----------------------------------------------------------------------
 * Set bits for hands operational and/or allocated
 *----------------------------------------------------------------------*/
    if ( rhand0 -> hand_sta & DCH_OPER )
    {
        rcode |= OP0;
    }
    if ( rhand1 -> hand_sta & DCH_OPER )
    {
        rcode |= OP1;
    }
    if ( rhand0 -> hand_sta & DCH_ALLC )
    {
        rcode |= AL0;
    }
    if ( rhand1 -> hand_sta & DCH_ALLC )
    {
        rcode |= AL1;
    }
    switch ( rcode )
    {
        case 0:
        case AL0:
        case AL1:
        case AL0 | AL1:
            /*-----------------------------------------------------------
             * If neither hand is operational, reject the request
             *----------------------------------------------------------*/
            return ( R_ALHAND );

case OP0 | OP1:
            /*-----------------------------------------------------------
             * If both hands free, switch if count goes to 0
             *----------------------------------------------------------*/
            if ( gl_lhuct[ lsm ] == 0 )
            {
                if ( gl_hused[ lsm ] == HAND0 )
                {
                    thand = HAND1;
                }
                else
                {
                    thand = HAND0;
                }
                gl_lhuct[ lsm ] = MAX_HNDU;
            }
            /*-----------------------------------------------------------
             * if count is not zero, count down
             *----------------------------------------------------------*/
            else
            {
                thand = gl_hused[ lsm ];
                --gl_lhuct[ lsm ];
            }
            break;
```

```
static char rcsid[]="$Header: /home/twolf/davet/alc/RCS/al_ahand.c,v 1.4 1993/06/07 1
7:59:36 aarond Exp $";                static al_ahand()
/* FUNCTION NAME:      static al_ahand()
/* FUNCTION TITLE:     Allocate a Hand
/*
/* FUNCTIONAL DESCRIPTION:
/*      This function accepts an LSM ID, a task ID and a location
/*      in which to place the ID of the hand, if allocated. If the
/*      hand is allocated, RET_OK is returned. FAIL is returned if
/*      the hands are both currently in use. If neither hand is
/*      usable a reject code is returned.
/*
/* OPERATIONAL DESCRIPTION:
/*      The gl_dcnfg  table is read to check the availability of
/*      a hand. If a hand is available, it is allocated. If both
/*      hands are inoperative, a rejection ( R_ALHAND ) is
/*      returned. If a hand is usable but neither hand is
/*      currently unused, FAIL is returned.
/*
/* PREREQUISITES:
/*   - the gl_dcnfg    structure is initialized
/*
/* SPECIAL CONSIDERATIONS:
/*      (none)
/*
/*              TYPE    NAME        RANGE/DESCRIPTION
/*              ----    ----        -----------------
/* PARMS IN:    int     lsm         hand LSM
/*              int     t_id        ID of task making req
/*              short   *ahand      ptr to allocated hand ID
/*
/* RET VALS:    int     RET_OK      allocated
/*              int     FAIL        no hand available
/*              int     R_ALHAND    no hand functional
/*
/* EXT_VARS:            gl_dcnfg    ATMS configuration table    (RW)
/*
/* H/W REGS:            (none)
/*
/* FUNCTNS:             (none)
/*
/* HISTORY: 07/10/85 fgm  Prologue created
/*          07/23/85 fgm  Prologue reviewed
/*          01/15/86 fgm  Code completed
/*
/*************** END OF PROLOGUE *******************/
#include "com.h"
include "alc.h"
#include "com_extern.h"
include "alc_extern.h"
#include "cmg_user.h"

al_ahand(
    UCHAR   lsm,
    UCHAR   t_id,                       /* hand LSM ID          */
    UCHAR   *ahand)                     /* ID of task req hand  */
                                        /* place to put hand ID */
{
    struct alr_dlsm *rlsm =
        &gl_dcnfg[ lsm ];               /* pointer to LSM descriptor  */
    struct dcf_hand *rhand0 =
        &( rlsm -> hand[ 0 ] );         /* pointer to hand descript 0 */
    struct dcf_hand *rhand1 =
        &( rlsm -> hand[ 1 ] );         /* pointer to hand descript 1 */
```

```
    register unsigned rcode = 0;        /* return code storage        */
    UCHAR thand = -1;                   /* temporary hand holder      */ define OP0 1                           /* bit for hand 0 operational */
define OP1 2                           /* bit for hand 1 operational */
#define AL0 4                           /* bit for hand 0 allocated   */
#define AL1 8                           /* bit for hand 1 allocated   */

/*--------------------------------------------------------------------
 * Set bits for hands operational and/or allocated
 *------------------------------------------------------------------*/
    if ( rhand0 -> hand_sta & DCH_OPER )
        rcode |= OP0;

if ( rhand1 -> hand_sta & DCH_OPER )
        rcode |= OP1;

if ( rhand0 -> hand_sta & DCH_ALLC )
        rcode |= AL0;

if ( rhand1 -> hand_sta & DCH_ALLC )
        rcode |= AL1;

switch ( rcode )
    {
    case 0:
    case AL0:
    case AL1:
    case AL0 | AL1:
        /*--------------------------------------------------------------
         * if neither hand is operational, reject the request
         *------------------------------------------------------------*/
        return ( R_ALHAND );

case OP0 | OP1:
        /*--------------------------------------------------------------
         * If both hands free, switch if count goes to 0
         *------------------------------------------------------------*/
        if ( gl_lhuct[ lsm ] == 0 )
        {
            thand = HAND1;
        }
        else
        {
            thand = HAND0;
        }
        gl_lhuct[ lsm ] = MAX_HNDU;

/*--------------------------------------------------------------
         * if count is not zero, count down
         *------------------------------------------------------------*/
        else
        {
            thand = gl_hused[ lsm ];
            --gl_lhuct[ lsm ];
        } break;
```

```
Aug 18 1995 10:54:48                    al ahand.c                              Page 3 case OP0:
        case OP0 | OP1 | AL1:
        case OP0 | AL1:
            /*------------------------------------------------------------------*
             * If hand 0 is operational but not allocated, allocate it
             *------------------------------------------------------------------*/
            thand = HAND0;
            gl_lhuct[ lsm ] = MAX_HNDU;
            break;

case OP1:
        case OP1 | OP0 | AL0:
        case OP1 | AL0:
            /*------------------------------------------------------------------*
             * If hand 1 is operational but not allocated, allocate it
             *------------------------------------------------------------------*/
            thand = HAND1;
            gl_lhuct[ lsm ] = MAX_HNDU;
            break;

case OP1 | OP0 | AL0 | AL1:
            /*------------------------------------------------------------------*
             * Both hands operational & allocated...special case for PH
             * (for PH, since both hands are allocated simultaneously,
             * this check detects same task 2nd hand use--CATALOG only)
             *------------------------------------------------------------------*/
            if ( cmg_get_lsm_type( lsm ) == MT_POWDR &&
                 ( rhand0->hand_tsk == t_id || rhand1->hand_tsk == t_id ) )
            {
                thand = ( rhand0->hand_tsk == t_id ) ? HAND1 : HAND0 ;
                break;        /* return alternate hand */
            }
            /* if not powderhorn, fall thru... */
        default:
            /*------------------------------------------------------------------*
             * Otherwise we have operational hands but none available
             *------------------------------------------------------------------*/
            return( FAIL );
    }

/*--------------------------------------------------------------------------*
     * Allocate the selected hand or both if Powderhorn
     * (task id saved only for hand returned to requestor)
     *--------------------------------------------------------------------------*/
    if ( ( thand == HAND0 ) || ( cmg_get_lsm_type( lsm ) == MT_POWDR ) )
    {
        rhand0 -> hand_sta |= DCH_ALLC;
        rhand0 -> hand_tsk = ( thand == HAND0 ) ? t_id : 0;
    } if ( ( thand == HAND1 ) || ( cmg_get_lsm_type( lsm ) == MT_POWDR ) )
    {
        rhand1 -> hand_sta |= DCH_ALLC;
        rhand1 -> hand_tsk = ( thand == HAND1 ) ? t_id : 0;
    }

*ahand = thand;
    gl_hused[ lsm ] = thand;
    return( RET_OK );

#undef OP0
#undef OP1
#undef AL0
#undef AL1
}
```

```
Aug 18 1995 10:54:48                al_apmch.c                              Page 1 static char resid[]="$Header: /home/twolf/davet/alc/RCS/al_apmch.c,v 1.2 1993/02/23 1
7:49:08 asrond Exp $";
/* FUNCTION NAME:    static al_apmch()                                             */
/*                                                                                 */
/* FUNCTION TITLE:   Allocate a Port Mechanism                                     */
/*                                                                                 */
/* FUNCTIONAL DESCRIPTION:                                                         */
/*   This function accepts two LSM IDs, a task ID and pointers                     */
/*   to locations where the PTP mechanism master LSM ID and the                    */
/*   port ID are to be written. If the mechanism is allocated,                     */
/*   RET_OK is returned. If it is not operational, a reject is                     */
/*   returned. If the PTP is currently in use, FAIL is                             */
/*   returned.                                                                     */
/*                                                                                 */
/*   On a reject, the master LSM will be set to the LSM in                         */
/*   error.                                                                        */
/*                                                                                 */
/* OPERATIONAL DESCRIPTION:                                                        */
/*   The gl_dcnfg  table is read to check the availability of                      */
/*   the PTP. If it is available, it is allocated. If it is                        */
/*   inoperative, a rejection ( R_ALPUP ) is returned. If it is                    */
/*   usable but currently in use FAIL is returned.                                 */
/*                                                                                 */
/*   On a reject, the master LSM will be set to the LSM in                         */
/*   error.                                                                        */
/*                                                                                 */
/* PREREQUISITES:                                                                  */
/*   - the gl_dcnfg   structure is initialized                                     */
/*                                                                                 */
/* SPECIAL CONSIDERATIONS:                                                         */
/*   (none)                                                                        */
/*                                                                                 */
/*              TYPE    NAME           RANGE/DESCRIPTION                           */
/*              ----    ----           -----------------                           */
/* PARMS IN:    int     lsm0           PTP LSM 0                                   */
/*              int     lsm1           PTP LSM 1                                   */
/*              short   t_id           ID of task making req                       */
/*              short   *mlsm          ptr to master LSM for PTP                   */
/*              short   *mpid          ptr to master LSM's port ID                 */
/*                                                                                 */
/* RET VALS:    int     RET_OK         allocated                                   */
/*              int     FAIL           not available                               */
/*              int     R_ALPTP        not functional                              */
/*              int     R_ALNPTP       no such pass-thru port                      */
/*                                                                                 */
/* EXT_VARS:    gl_dcnfg               ATHS configuration table      (RW)          */
/*                                                                                 */
/* H/W REGS:    (none)                                                             */
/*                                                                                 */
/* FUNCTNS:     (none)                                                             */
/*                                                                                 */
/* HISTORY:                                                                        */
/*    07/10/85   fgm   Prologue created                                            */
/*    07/23/85   fgm   Prologue reviewed                                           */
/*    01/15/86   fgm   Code completed                                              */
/*********************  END OF PROLOGUE  *******************************/
#include <com.h>
include "alc.h"
#include <com_extern.h>
include <alc_extern.h> int  al_apmch(UCHAR lsm0,                /* PTP LSM 0                */
              UCHAR lsm1,                /* PTP LSM 1                */
              UCHAR t_id,                /* ID of task req PTP mech  */
```

```
Aug 18 1995 10:54:48                al_apmch.c                              Page 2

UCHAR *mlsm,               /* place to put master LSM ID */
              UCHAR *mpid)               /* place to put master port ID*/
{
    struct alr_dlsm  *rlsm;              /* pointer to LSM descriptor  */
    struct def_ptp   *rptp;              /* pointer to PTP descriptor  */
    struct def_ptp   *rptp1;             /* pointer to PTP descriptor  */
    UCHAR mastr;                         /* master LSM                 */
    UCHAR slave;                         /* slave LSM                  */
    UCHAR ptpid;                         /* PTP ID in master           */

/*-----------------------------------------------------------------*/
    /* Initialize pointers into configuration table                    */
    /*-----------------------------------------------------------------*/
    rlsm = & gl_dcnfg[ lsm0 ];
    rptp = NULL;

/*-----------------------------------------------------------------*/
    /* If these two LSMs are not connected reject the request          */
    /*-----------------------------------------------------------------*/
    if ( al_cnect[ lsm0 ][ lsm1 ] == NO_CNECT )
    {
        return( R_ALNPTP );
    }

/*-----------------------------------------------------------------*/
    /* Find the port that connects the two LSMs (set values for       */
    /* calling function )                                              */
    /*-----------------------------------------------------------------*/
    if ( al_cnect[ lsm0 ][ lsm1 ] == NOT_MSTR )
    {
        mastr = lsm1;
        slave = lsm0;
    }
    else
    {
        mastr = lsm0;
        slave = lsm1;
    }
    ptpid = al_cnect[ mastr ][ slave ];
    rptp = & ( gl_dcnfg[ mastr ].ptp[ ptpid ] );

*mlsm = mastr;
    *mpid = ptpid;

/*-----------------------------------------------------------------*/
    /* Make sure the master LSM is online and ready                    */
    /*-----------------------------------------------------------------*/
    rlsm = & gl_dcnfg[ mastr ];
    if ( ! ((rlsm -> lsm.lsm_stat) & DCL_RDY ) )
    {
        return( R_ALNRDY );
    } if ( ! ((rlsm -> lsm.lsm_stat) & DCL_ONLM ) )
    {
        return( R_ALOFF );
    }

/*-----------------------------------------------------------------*/
    /* If the PTP is not operating reject the request                  */
    /*-----------------------------------------------------------------*/
    if ( ! (rptp -> ptp_stat & DCP_OPER ) )
    {
        return( R_ALPTP );
    }
```

```
/*------------------------------------------------------------------
 * If the PTP mechanism is allocated the return FAIL
 *------------------------------------------------------------------*/
if ( rptp -> ptp_stat & DCP_ALLC )
{
    return( FAIL );
}

/*------------------------------------------------------------------
 * Allocate the PTP mechanism ( in both LSM descriptors )
 *------------------------------------------------------------------*/
rptp -> ptp_stat |= DCP_ALLC;
rptp -> ptp_tsk = t_id;

rptp1 = & ( gl_dcnfg[ slave ].ptp[ rptp -> ptp_adjp ] );
rptp1 -> ptp_stat |= DCP_ALLC;
rptp1 -> ptp_tsk = t_id;

return ( RET_OK );
}
```

```
Aug 18 1995 10:54:48                        al_bctrc.c                              Page 1 static char rcsid[]="$Header: /home/twolf/davet/alc/RCS/al_bctrc.c,v 1.3 1993/07/08 2
1:29:48 aarond Exp $";
/*****************     START OF PROLOGUE    *******************************************
*
*                          StorageTek SECRET
*                  Property of Storage Technology Corporation
*                  Do not copy or distribute unpublished work
*
*                              Copyright (1991)
*                       Storage Technology Corporation
*                             All Rights Reserved
*
* FUNCTION TITLE: Trace a Bad Communication
*
* FUNCTIONAL DESCRIPTION:
*       This function adds a bad communication entry to the bad
*       communication trace buffer.
*
* OPERATIONAL DESCRIPTION:
*       This function accepts an ID character and a pointer to
*       an allocation request or informational with a bad format.
*       The ID character and the contents of the request are
*       copied to the current buffer entry. The buffer pointer is
*       incremented by one (in a circular fashion). The buffers
*       contents are:
*
*        0    1    2    3    4    5    6 - 24
*       +----+----+-------------------+---------+
*       |ID1 |ID2 | package address   | package |
*       |    |    |                   | contents|
*       +----+----+-------------------+---------+
*
*        25   26   27   28   29   30   31
*       +-------------------+--------------------+
*       |       filler      |      timestamp     |
*       +-------------------+--------------------+
*
*       ID2
*       ---
*       B  R   Bad Request
*       B  I   Bad Informational
*
****************          END OF PROLOGUE       **************************************/
#include "com.h"
include "alc.h"
#include "com_extern.h"
include "alc_extern.h"

void al_bctrc( UCHAR ident2,      /* second identifier */
               struct alc_req *alreq ) /* pointer to request/response*/
{
    /*-----------------------------------------------------------------*
     * Put in the entry
     *-----------------------------------------------------------------*/
    al_trent( 'B', ident2, alreq, al_bcbuf, &al_bcptr, BCTRMAX );

return;
}
```

```
Aug 18 1995 10:54:48          al_compute_priority.c                   Page 1
/****************************   START OF PROLOGUE   *****************************

StorageTek SECRET
                Property of Storage Technology Corporation
                    Do not copy or distribute unpublished work Copyright (1991)
                        Storage Technology Corporation
                            All Rights Reserved FUNCTION NAME: (local)al_compute_new_priority()

FUNCTIONAL DESCRIPTION:

This function computes the new priority for a request based on an
    input function and a request. Requests at the special maximum
    and minimum priorities are not incremented. Normal priority
    requests are not allowed to increase to the special maximum
    priority.

RETURN VALUES:
    new priority

==============================================================================
 OPERATIONAL DESCRIPTION:

This function first checks that the current priority is not the
    special minimum or maximum. If it is not, the new priority is
    computed by doing a computation based on the passed computation
    type.

***************************   END OF PROLOGUE   ***************************/ include "com.h"
include "alc.h"
#include "log_user.h"

#include "com_extern.h"
include "alc_extern.h"

UCHAR al_compute_new_priority( struct alc_req *req,
                               enum alc_priority_computation computation_type)
{
    register UCHAR *priority = &( req->actual_priority );
    UCHAR priority_delta;
    UCHAR age;                    /* age of request */ if ( ( *priority != MAX_PRIORITY ) &&
         ( *priority != MIN_PRIORITY) )
    {
        age = req -> age;
        /*---------------------------------------------------------------
         * This request is not at a non aging min or max priority level.
         * Therefore, compute the new priority delta.
         *---------------------------------------------------------------*/
        switch ( computation_type )
        {
            case Alc_Arm_Priority:
                priority_delta = age;
                break;

case Alc_Hand_Priority:
                priority_delta = age;
```

```
Aug 18 1995 10:54:48          al_compute_priority.c                   Page 2
                break;

case Alc_Drive_Priority:
                priority_delta = age;
                break;

case Alc_Path_Priority:
                priority_delta = age;
                break;

case Alc_Mech_Priority:
                priority_delta = age;
                break;

case Alc_Generic_Priority:
                priority_delta = age;
                break;

default:
                log_user_lmu_error ( ERR_BAD_SWITCH );
                sys_fatal (ERR_FAULTY_DISPOSITION);
        }
        *priority = _min ( req->priority + priority_delta, MAX_NORMAL_PRIORITY );
    }
    return ( *priority );
}
```

We claim:

1. In a mass storage system an apparatus for moving storage objects in a multi-dimensional array of storage object locations in response to a plurality of requests requiring at least a first and second resource to transfer storage objects between locations, comprising:

first and second resources to transfer a storage object between locations;

means for assigning a priority to the requests;

means operable when the first resource becomes available for allocating the first resource to the highest priority request requiring the first resource;

means operable when the second resource becomes available for allocating the second resource to the highest priority request requiring the second resource; and means for executing the transfer after the first and second resources have been allocated to the request requiring the allocated first and second resources.

2. The apparatus of claim 1 further comprising means for increasing the priority of a request requiring a resource when the resource is allocated to another request.

3. The apparatus of claim 1 further comprising:

a queue; and means for entering in the queue higher priority requests in front of lower priority requests; and wherein the allocating means includes means operable when one of the resources becomes available for scanning the queue from the front to the back and allocating the available resource to the first request in the queue requiring the available resource.

4. The apparatus of claim 3, the entering means comprising:

means for receiving one or more new requests to transfer an object; and means for entering new requests in the queue such that higher priority requests are entered in front of lower priority requests.

5. The apparatus of claim 4 further comprising means operable when a new request is entered in the queue for increasing the priority of a request in the queue with a priority lower than the newly entered request.

6. The apparatus of claim 1 further comprising:

a queue for each of the resources; and means for entering in the queue for one of the resources higher priority requests requiring the resource in front of lower priority requests requiring the resource; and wherein the allocating means includes means operable when one of the resources becomes available for scanning the queue for the resource from the front to the back and allocating the available resource to the first request in the queue requiring the available resource.

7. The apparatus of claim 6, the entering means comprising:

means for receiving one or more new requests requiring said resource to transfer an object; and means for entering new requests requiring said resource in the queue such that higher priority requests are entered in front of lower priority requests.

8. The apparatus of claim 6 further comprising means operable when a new request is entered in the queue for increasing the priority of a request in the queue with a priority lower than the newly entered request.

9. The apparatus of claim 1 wherein said storage object is a magnetic storage object.

10. The apparatus of claim 1 wherein said storage object is a magnetic tape cartridge.

11. In a mass storage system a method of moving storage objects in a multi-dimensional array of storage object locations with two or more resources for transferring the storage objects between locations in response to a plurality of requests requiring at least a first and second resource to transfer a storage object between locations, comprising the steps of:

assigning a priority to the requests;

allocating the first resource, when it becomes available, to the highest priority request requiring the first resource;

allocating the second resource, when it becomes available, to the highest priority request requiring the second resource; and executing the transfer after the first and second resources have been allocated to the request requiring the allocated first and second resources.

12. The method of claim 11 further comprising the step of increasing the priority of a request requiring a resource when the resource is allocated to another request.

13. The method of claim 11 further comprising the steps of:

entering in a queue higher priority requests in front of lower priority requests;

scanning the queue when one of the resources becomes available from the front to the back; and allocating the available resource to the first request in the queue requiring the available resource.

14. In a mass storage system an apparatus for moving storage objects in a multi-dimensional array of storage object locations in response to a plurality of requests to transfer storage objects between locations, each request requiring two or more resources to accomplish the transfer, comprising:

one or more first resources to transfer storage objects between locations;

one or more second resources to transfer storage objects between locations;

assigning means for assigning a priority to a request which requires a first and second resource;

a first allocating means operable when a first resource becomes available for allocating the available first resource to the highest priority request requiring the available first resource;

a second allocating means operable when a second resource becomes available for allocating the available second resource to the highest priority request requiring the available second resource; and executing means for executing the transfer after the first and second resources have been allocated to the request requiring the allocated first and second resources.

15. The apparatus of claim 14 further comprising:

a first queue for requests requiring one of the first resources;

a second queue for requests requiring one of the second resources;

a first entering means for entering in the first queue higher priority requests requiring one of the first resources in front of lower priority requests in the first queue;

a second entering means for entering in the second queue higher priority requests requiring one of the second resources in front of lower priority requests in the second queue;

wherein the first allocating means includes means operable when a first resource becomes available for scanning the first queue and allocating the available resource to the highest priority request in the first queue requiring the available first resource; and wherein the second allocating means includes means operable when a second resource becomes available for scanning the second queue and allocating the available resource to the highest priority request in the second queue requiring the available second resource.

16. The apparatus of claim 15 further comprising:

a first increasing priority means operable when a new request is entered in the first queue for increasing the priority of requests in the first queue having a priority lower than the newly entered request; and a second increasing priority means operable when a new request is entered in the second queue for increasing the priority of requests in the second queue having a priority lower than the newly entered request.

17. The apparatus of claim 15 further comprising;

a first increasing priority means operable when a resource is allocated to a request for increasing the priority of requests in the first queue having a priority lower than the request that was allocated the resource; and a second increasing priority means operable when a resource is allocated to a request for increasing the priority of requests in the second queue having a priority lower than the request that was allocated the resource.

18. The apparatus of claim 14 further comprising:

a first queue for each of the first resources;

a second queue for each of the second resources;

entering means for entering in a queue for a particular resource higher priority requests requiring the particular resource in front of lower priority requests requiring the particular resource;

wherein the first allocating means includes means operable when a first resource becomes available for allocating the available first resource to the first request in the queue for the available first resource; and wherein the second allocating means includes means operable when a second resource becomes available for allocating the available second resource to the first request in the queue for the available second resource.

* * * * *